United States Patent
Un et al.

(10) Patent No.: US 7,639,712 B2
(45) Date of Patent: Dec. 29, 2009

(54) LOW-LEVEL MEDIA ACCESS LAYER PROCESSORS WITH EXTENSION BUSES TO HIGH-LEVEL MEDIA ACCESS LAYERS FOR NETWORK COMMUNICATIONS

(75) Inventors: Mehmet Un, Santa Clara, CA (US); Kartik Raju, Santa Clara, CA (US)

(73) Assignee: Fujitsu Limited, Kawasaki (JP)

( * ) Notice: Subject to any disclaimer, the term of this patent is extended or adjusted under 35 U.S.C. 154(b) by 735 days.

(21) Appl. No.: 11/326,711

(22) Filed: Jan. 6, 2006

(65) Prior Publication Data
US 2007/0162610 A1    Jul. 12, 2007

(51) Int. Cl.
H04J 3/16 (2006.01)
(52) U.S. Cl. ........................ 370/469; 370/230; 370/349; 370/392; 370/394; 370/395.42
(58) Field of Classification Search ................. 370/469, 370/363, 230, 349, 252, 394, 392, 395.42
See application file for complete search history.

(56) References Cited

U.S. PATENT DOCUMENTS

| | | | |
|---|---|---|---|
| 5,603,041 | A | 2/1997 | Carpenter et al. |
| 5,689,659 | A | 11/1997 | Tietjen et al. |
| 5,919,254 | A | 7/1999 | Pawlowski et al. |
| 6,223,237 | B1 | 4/2001 | McDermid |
| 6,611,515 | B1 * | 8/2003 | Balachandran et al. ...... 370/349 |
| 6,629,185 | B1 | 9/2003 | Silver et al. |
| 6,708,272 | B1 * | 3/2004 | McCown et al. ............ 713/151 |
| 7,266,087 | B2 * | 9/2007 | Wahl .......................... 370/252 |
| 7,339,921 | B2 * | 3/2008 | Kim et al. ................... 370/349 |
| 2002/0021698 | A1 * | 2/2002 | Lee et al. .................... 370/394 |

(Continued)

FOREIGN PATENT DOCUMENTS

EP    1610522 A1 * 12/2005

OTHER PUBLICATIONS

"1-Gigabit Ethernet Media Access Controller (MAC) with Network Management," Product Brochure, Jul. 2001, 1 page, Sierra Research and Technology, Inc., Westlake Village, CA, USA.

(Continued)

*Primary Examiner*—Ricky Ngo
*Assistant Examiner*—Dewanda Samuel
(74) *Attorney, Agent, or Firm*—Baker Botts L.L.P.

(57) ABSTRACT

A MAC unit processes the flow of data a first processor and a physical-layer control unit of a network component. The first processor processes the data flow between a higher protocol-layer unit and the MAC and assigns connection identifiers to each outgoing MAC protocol-data unit. The MAC unit includes a connection port adapted to couple to the first processor and a second processor that receives outgoing MAC protocol-data units generated by the first processor and generates outgoing FEC blocks therefrom for outputting to the input port of the physical-layer control unit. The second processor having an output port to provide outgoing FEC blocks to the physical-layer control unit and an input port to receive incoming FEC blocks from the physical-layer control unit. The second processor is adapted to generate incoming MAC protocol-data units from incoming FEC blocks received at its input port and to output them on the connection port.

44 Claims, 16 Drawing Sheets

U.S. PATENT DOCUMENTS

| | | | |
|---|---|---|---|
| 2004/0156385 A1* | 8/2004 | Fischer et al. | 370/438 |
| 2005/0195821 A1* | 9/2005 | Yun et al. | 370/392 |
| 2006/0218332 A1 | 9/2006 | Boudreau | |
| 2007/0070905 A1* | 3/2007 | Oliver et al. | 370/235 |
| 2007/0162610 A1* | 7/2007 | Un et al. | 709/230 |

OTHER PUBLICATIONS

"100/10-Mbit/s Ethernet Stand-alone MAC with Optional Network Services," Product Brochure, Jul. 2001, 1 page, Sierra Research and Technology, Inc., Westlake Village, CA, USA.

"PCI-Based 100/10-Mbit/s Ethernet Controller with Optional Network Services," Product Brochure, Jul. 2001, 1 page, Sierra Research and Technology, Inc., Westlake Village, CA, USA.

"Customizing a Soft Microprocessor Core," White Paper, Year 2002, 3 pages, month unknown, ARC International, www.arc.com, San Jose, CA, USA.

Ekland, et al., "IEEE Standard 802.16: A Technical Overview of the WirelessMAN™ Air Interface for Broadband Wireless Access," IEEE Communications Magazine, Jun. 2002, pp. 98-107, IEEE, New York, NY, USA.

"The ARCtangent™-A4 Processor," Year 2003, Product Brochure, month unknown, 4 pages, ARC International, www.arc.com, San Jose, CA, USA.

"WiMAX Technology and Deployment for Last-Mile Wireless Broadband and Backhaul Applications," White Paper, Aug. 2004, 10 pages, Fujitsu Microelectronics America, Inc., http://us.fujitsu.com/micro/WiMAX, San Jose, CA, USA.

George Wu, "WiMAX Deployment: Fujitsu Perspective," Conference Presentation at the MIT-CommTech Series: WiMAX, The Great Wireless Hope held in Palo Alto, CA, Sep. 21, 2004, 18 pages, Fujitsu Microelectronics America, Inc., http://us.fujitsu.com/micro/WiMAX, San Jose, CA, USA.

Reza Golshan, "WiMAX Overview," Conference Presentation at the MIT-CommTech Series: WiMAX, The Great Wireless Hope held in Palo Alto, CA, Sep. 21, 2004, 23 pages, Fujitsu Microelectronics America, Inc., http://us.fujitsu.com/micro/WiMAX, San Jose, CA, USA.

Reza Golshan, "Technical Update: Examining the Reality of WiMAX as a Global Standard," Conference Presentation at Emerging Broadband Wireless Technologies Summit held in San Jose, CA, Sep. 28, 2004, 13 pages, Fujitsu Microelectronics America, Inc., http://us.fujitsu.com/micro/WiMAX, San Jose, CA, USA.

"IEEE Standard 802.16™-2004 Part 16: Air Interface for Fixed Broadband Wireless Access Systems," IEEE Standard 802.16, Oct. 1, 2004, 893 pages, IEEE, New York, NY, USA.

George Wu, "WiMAX Technology and Deployment: Fujitsu Perspective," Conference Presentation at the ITAA Web Cast held in Washington, D.C., Oct. 19, 2004, 31 pages, Fujitsu Microelectronics America, Inc., http://us.fujitsu.com/micro/WiMAX, San Jose, CA, USA.

"RF Spectrum Utilization in WiMAX," White Paper, Nov. 2004, 9 pages, Fujitsu Microelectronics America, Inc., http://us.fujitsu.com/micro/WiMAX, San Jose, CA, USA.

Keith Horn, "Designing for Development," Conference Presentation at the Wireless Broadband Forum held in Cambridge, UK, Nov. 15, 2004, 15 pages, Fujitsu Microelectronics America, Inc., http://us.fujitsu.com/micro/WiMAX, San Jose, CA, USA.

George Wu, "WiMAX Deployment—Fujitsu Perspective," Conference Presentation on Wireless Expo, Virtual Tradeshow (www.wirelessexpo.net), Nov. 17, 2004, 18 pages, Fujitsu Microelectronics America, Inc., http://us.fujitsu.com/micro/WiMAX, San Jose, CA, USA.

"ARChitect™ Processor Configurator: The Power of Configurable Processing At Your Fingertips," White Paper, Year 2005, 9 pages, month unknown, ARC International, www.arc.com, San Jose, CA, USA.

Reza Golshan and Roger Bertschmann, "Semiconductor Integration Considerations for Broadband Wireless Access (BWA): Chip Marketing Sizing & Business Implications," Conference Presentation at WCA's International Symposium & Business Expo, Jan. 13, 2005, 13 pages, Fujitsu Microelectronics America, Inc., http://us.fujitsu.com/micro/WiMAX, San Jose, CA, USA.

George Wu, "Unleash WiMAX," Fujitsu WiMAX SoC Webcast, Mar. 3, 2005, 21 pages, Fujitsu Microelectronics America, Inc., http://us.fujitsu.com/micro/WiMAX, San Jose, CA, USA.

Keith Horn, "Keynote: WiMAX—Promise of Quantum Leap in Broadband Wireless Communications," Conference Presentation at Broadband Wireless World held in Las Vegas, NV, Apr. 21, 2005, 19 pages, Fujitsu Microelectronics America, Inc., http://us.fujitsu.com/micro/WiMAX, San Jose, CA, USA.

"MB87M3400, The Fujitsu WiMAX 802.16-2004 SoC," Fact Sheet, Apr. 21, 2005, 2 pages, Fujitsu Microelectronics America, Inc., http://us.fujitsu.com/micro/WiMAX, San Jose, CA, USA.

"MB87M3400, The Fujitsu WiMAX 802.16-2004 SoC," Product Brief, Apr. 21, 2005, 8 pages, Fujitsu Microelectronics America, Inc., http://us.fujitsu.com/micro/WiMAX, San Jose, CA, USA.

"Unleash WiMAX," Conference Presentation at Broadband Wireless World held in Las Vegas, NV, Apr. 21, 2005, 6 pages, Fujitsu Microelectronics America, Inc., San Jose, CA, USA.

"FujitsuFocus Spring/Summer 2005," Newsletter, after Apr. 21, 2005, 3 pages, Fujitsu Microelectronics America, Inc., http://us.fujitsu.com/micro/WiMAX, San Jose, CA, USA.

George Wu, "WiMAX, Logan and the Future of Broadband Wireless Networking," Conference Presentation at Terabeam Wireless Press Conference, Supercomm 2005, Jun. 7, 2005, 22 pages, Fujitsu Microelectronics America, Inc., http://us.fujitsu.com/micro/WiMAX, San Jose, CA, USA.

George Wu, "WiMAX—Promise of Quantum Leap in Broadband Wireless Communications," Conference Presentation at ITAA Conference held in Washington, D.C., Jun. 29, 2005, 27 pages, Fujitsu Microelectronics America, Inc., http://us.fujitsu.com/micro/WiMAX, San Jose, CA, USA.

"Design of a Multi-Sector Base Station Using the Fujitsu WiMAX SoC," Application Note, Oct. 2005, 6 pages, Fujitsu Microelectronics America, Inc., http://us.fujitsu.com/micro/WiMAX, San Jose, CA, USA.

Keith Horn, "The Semiconductor Technology Fuels WiMAX Success: Providing WiMAX System Solutions Utilizing the New IDM Business Model," Conference Presentation at Global WiMAX Summit held in Beijing, China, Nov. 10, 2005, 27 pages, Fujitsu Microelectronics America, Inc., http://us.fujitsu.com/micro/WiMAX, San Jose, CA, USA.

* cited by examiner

*(TDD Mode)*

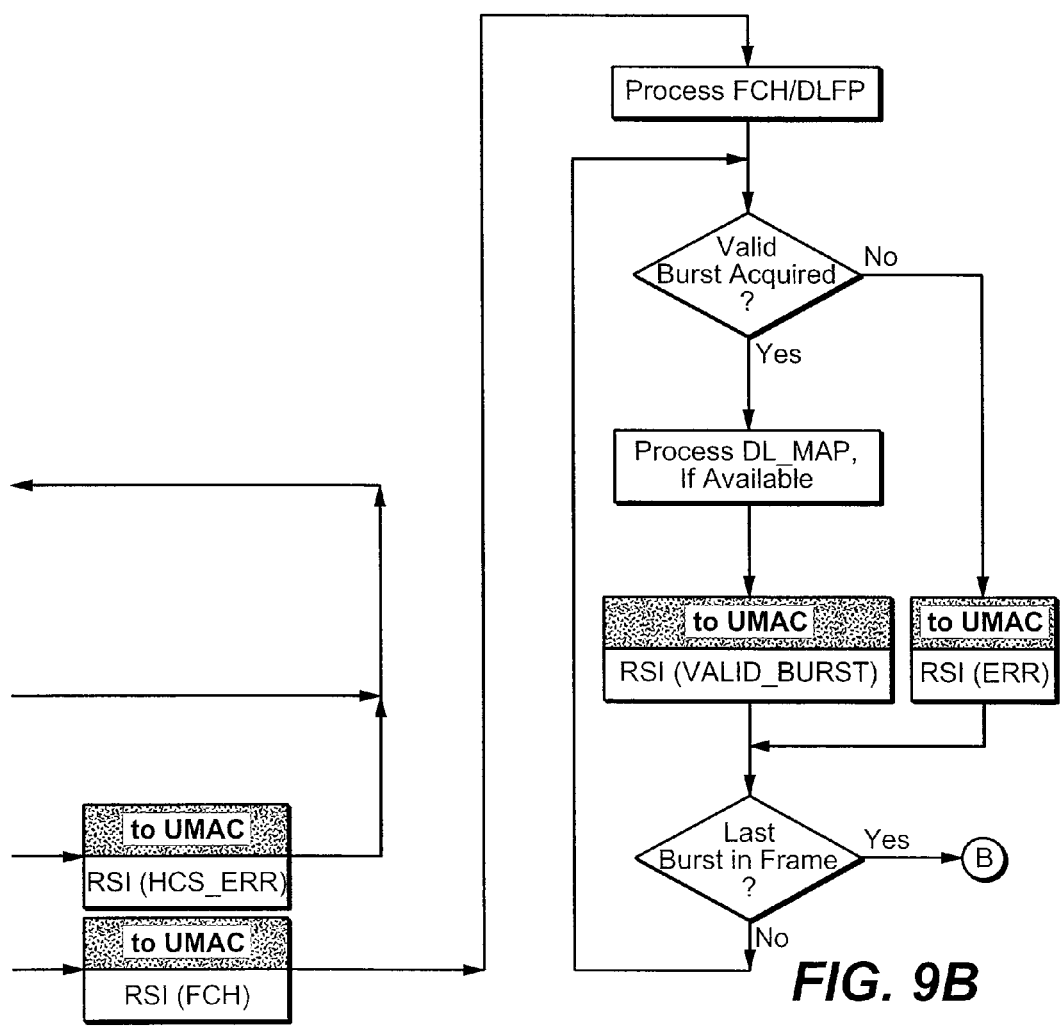

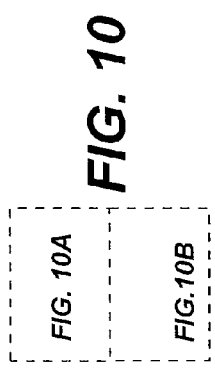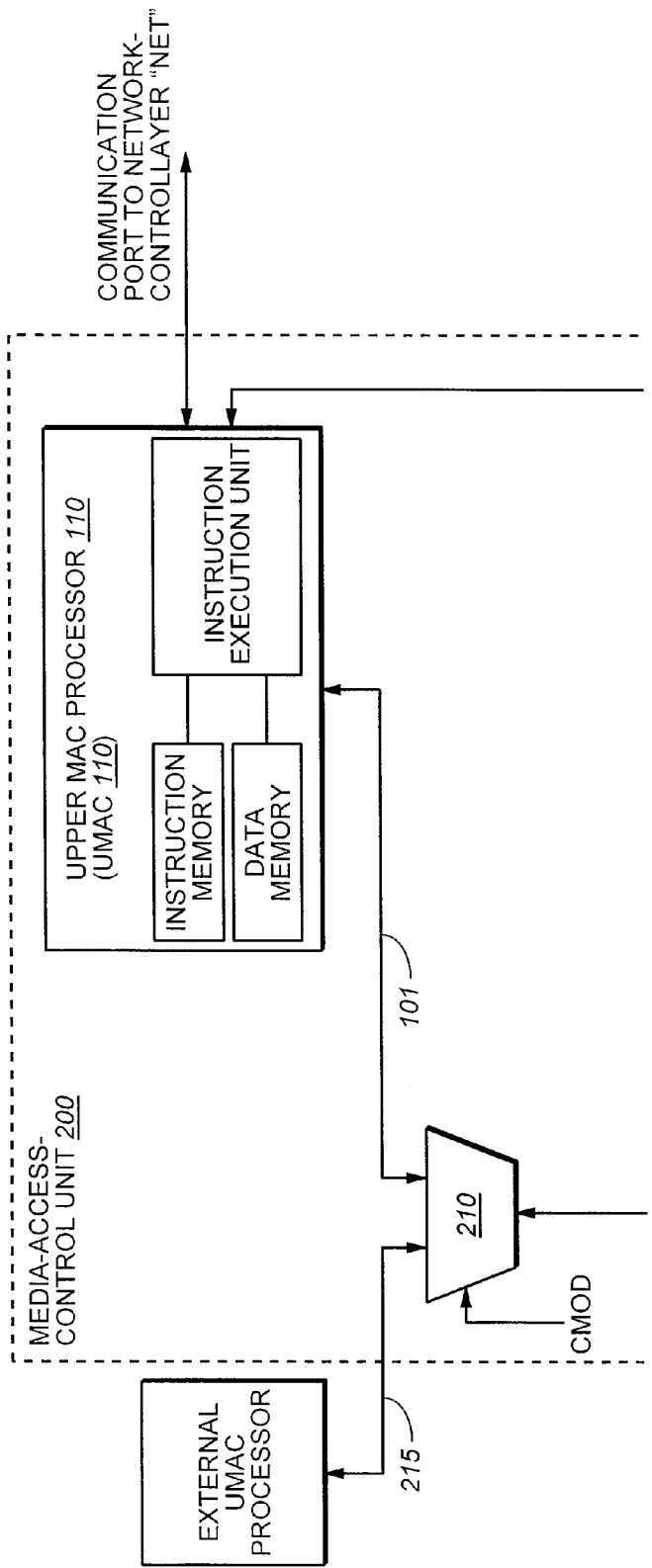
FIG. 10
FIG. 10A

LOW-LEVEL MEDIA ACCESS LAYER PROCESSORS WITH EXTENSION BUSES TO HIGH-LEVEL MEDIA ACCESS LAYERS FOR NETWORK COMMUNICATIONS

FIELD OF THE INVENTION

The present invention relates to processors and methods for implementing the media-access control layer of a network communications device, and more particularly for network communication devices operating according the IEEE 802.16 Wireless Standard.

BACKGROUND OF THE INVENTION

In the network communications field, information is generally conveyed from one station to another in the form of packets. The sending station parses the information to be sent in a series of packets, each with an identification header, and sends them to the destination station, which reassembles original information from the packets. There are many tasks that are performed at each station to facilitate the handling of the packets. Generally established network communication standards divide the tasks into several protocol layers (generally around seven). The bottommost protocol layer is often called the "physical layer" or "PHY layer," and it is responsible for physically transmitting the packets and receiving the packets by way of a communications medium, which may be a fiber-optic connection, a wired connection, a wireless connection, or any combination of these connections as well as other types of connections. The PHY layer works with data organized in protocol data units (PDUs) called "forward-error correction blocks" or FEC blocks. The format of the data bits that appear on the communications media is generated from FEC blocks processed by the PHY layers on the network. The PHY layer is typically implemented in hardware while the protocol layers above it are often implemented in software running on a processor that sends and receives data and commands to the physical layer.

Typical layers immediately above the physical layer are called the link layer and media access layer, depending upon particular communication sub-fields. These layers perform many time critical tasks and often handle packet traffic from several different applications running on the station that they support. At the same time, packet communication networks are being asked to carry more data faster, and to provide more functionality. To complicate matters, the processes that the link layer and media access layer carry out are often governed by industry standards that are subject to change and revision. As part of making their invention, the inventors have recognized that the above trends are moving toward creating bottlenecks in the software and hardware, and there will be a need in the art to address these pending bottlenecks with the flexibility to adapt to changes in industry standards.

SUMMARY OF THE INVENTION

To address the above problems, the present application discloses several related groups of inventions. A first group of inventions of the present application encompasses a media-access control unit that processes the flow of data between a higher protocol-layer unit and a physical-layer control unit of a network communications component. The physical-layer control unit interfaces with a communications medium and has an input port to receive data in the form of forward-error correction blocks to be transmitted to the communications medium and an output port to provide data in the form of forward-error correction blocks that have been received from the communications medium. An exemplary media-access control unit according to the first group of inventions comprises a first processor (called "UMAC" for short in the specification) that receives high-level data units from the higher protocol-layer unit and generates outgoing media-access-control (MAC) protocol-data units therefrom. The first processor assigns connection identifiers to each outgoing MAC protocol-data unit. It has an instruction execution unit, an instruction memory, and a data memory. The exemplary media-access control unit further comprises a second processor (called "LMAC" for short in the specification) that receives outgoing MAC protocol-data units generated by the first processor and generates outgoing FEC blocks therefrom for outputting to the input port of the physical-layer control unit. The second processor has an instruction execution unit, an instruction memory, a data memory, an output port to provide outgoing FEC blocks to the physical-layer control unit, and an input port to receive incoming FEC blocks from the physical-layer control unit. In further embodiments, the physical-layer control unit has an interrupt signal to indicate the presence of incoming FEC blocks for the second processor, and the second processor further comprises an interrupt input port to receive the interrupt signal, to which it is responsive. The second processor generates incoming MAC protocol-data units from the incoming FEC blocks and passes them to the first processor.

Additional inventions of the present application are directed efficient handling of messages between network processors, such as the first and second processors described above, efficient handling of data, downlink maps, connection identifiers, and encryption keys in processors that implement media-access layers, efficient updating of DIUC codes, efficient filtering of MAC PDUs based on connection identifiers, efficient generation of CRC and HCS values, efficient payload encryption and decryption.

Yet more inventions of the present application are directed to enabling a low-level media access layer processors to be selectively coupled between two or more high-level media access processors by way of extension buses.

Still more inventions of the present application are directed to methods of efficiently synchronizing subscriber stations to communications networks.

Accordingly, it is an objective of one or more of the inventions disclosed herein to increase the efficiency of processors that implement media access control layers.

It is yet another objective of one or more of the inventions disclosed herein to increase the overall efficiency processing packet traffic in communications networks.

It is yet another objective of one or more of the inventions disclosed herein to increase provide a media-access control unit on a single integrated chip that has the flexibility to be used in both base stations and subscriber stations.

These and other objects of the present invention will become apparent to those skilled in the art from the following detailed description of the invention, the accompanying drawings, and the appended claims.

DETAILED DESCRIPTION OF THE INVENTION

In the following description, numerous specific details are set forth to provide a more thorough description of the specific embodiments of the inventions. It is apparent, however, that the inventions may be practiced without all the specific details given below. In other instances, well known features have not been described in detail so as not to obscure the inventions.

Figure 1:
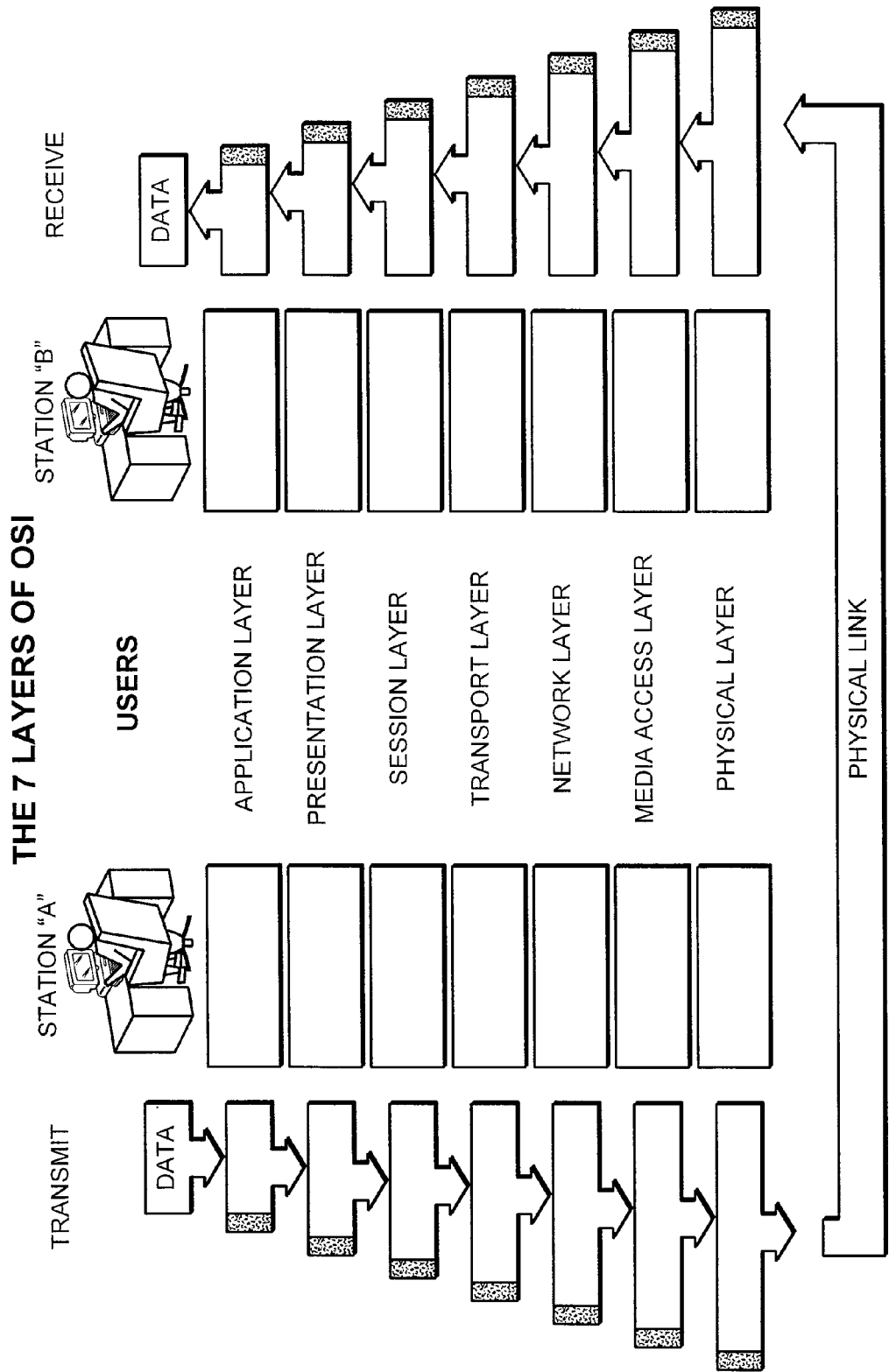
FIG. 1 is a diagram illustrating the Open Systems Interconnection Reference Model according to the prior art.

OSI Model. Many communication networks are organized along the Open Systems Interconnection Reference Model (OSI Model or OSI Reference Model), which was developed as part of the Open Systems Interconnect initiative. The OSI Network Model is a seven-layer framework for organizing communications and computer network protocols. FIG. 1 illustrates the OSI model as applied to a communication connection between two computer stations, with station "A" sending information to station "B." A "communication connection" is a unidirectional flow of information from one station to another; one or more communication connections from one station to another may be conveyed by a "communication channel" between the stations. The information in the communication connection is passed as a data unit from one protocol layer to the next, starting at the top with the application layer in station "A," proceeding down to the bottom at the physical layer, where the data unit is physically transmitted over a communications medium to another physical layer located at a network node that serves station "B." From there, the data unit is passed up the hierarchy to the application layer that serves station "B." (Data units sent from station "B" to station "A" go through the same layers, but in the reverse order and through a different communication connection.) Each protocol layer has specific tasks to perform, which as a whole help to provide reliable and error-free communications between the stations. As each layer receives a data unit from the layer above, it adds further information to the data unit as needed to carry out its tasks, and, when needed, also reformats the data unit. This action, which is illustrated at the left side of FIG. 1, is often called "wrapping," and results in the physical size of the data unit increasing as it progresses down the stack of layers, and decreasing as it progresses up the stack of layers. In some cases, two or more data units may be combined together in the wrapping process. The form of a data unit that is worked on at a specific level is called a "protocol data unit," or PDU, for the layer. More formally, a PDU is the form of the data unit that is exchanged between peer protocol layers located on separate network nodes (e.g., two MAC layers on two separate computer stations). As the data unit moves between layers, it undergoes conversion from one type of PDU to another type of PDU. The conversion of the data from one PDU type to another is typically done by the protocol layer that is receiving the data when the data is going down the protocol stack, and by the protocol layer that is transmitting the data when the data is going up the protocol stack. (As will be seen below, exemplary embodiments of the present invention depart from this convention in that portions of the conversions between the MAC and PHY layers are done in the MAC layer.) Most of the functionality in the OSI model exists in many communications systems, although two or three OSI layers may be incorporated into one layer.

The Media-Access Control and Physical Protocol Layers. The inventions of the present application mainly pertain to the three lowest protocol layers of the OSI reference model: the network layer, the media-access control layer (MAC layer), and the physical layer (PHY layer), with emphasis primarily on the MAC and PHY layers. A PDU for the network layer is called a network PDU, and a PDU for the MAC layer is called a MAC PDU. A PDU for the physical layer comprises one or more preambles and a plurality of modulation symbols that carry forward-error correction blocks (FEC blocks). The preambles and modulation symbols are intended to be captured and demodulated by the receiving PHY layers on the network. Thus, the data bits that appear on the communication medium are generated from FEC blocks by the PHY layers on the network. These data bits can be conveyed over the physical communications medium in a number of forms, such as discrete voltage levels or as complex signal modulations, called modulation symbols, with common examples being BPSK, QPSK, QAM16, and QAM64. One such modulation symbol typically conveys several data bits. The network layer transmits the data between the parties (e.g., computer stations) in packets. It provides packet routing and forwarding by creating logical paths between nodes (choosing the best path for a packet). It also handles addressing and works to control packet congestion on the network. A widely used network layer protocol is the Internet Protocol (IP) layer. The MAC layer receives network PDUs from the network layer and converts them to outgoing MAC PDUs, and organizes the outgoing MAC PDUs (which carry the data packets) into frames, as described below. It also assigns connection identifiers (CIDs) to each outgoing MAC PDU to associate it to one of the MAC-level connections that are active on the network, and provides one or more error-free communication connections between two parties (each party usually being based at a respective network node) with basic flow control and frame synchronization, and with error detection (e.g. CRC). The MAC layer also manages connections established between parties, determines which incoming MAC PDUs are intended for its node by looking at the CIDs, filters out packet traffic that is not intended for its node (by looking at the CID), and conveys the incoming MAC PDUs intended for its node to the network layer.

Management of Data Transmission on the Network. In a typical point-to-multipoint (PMP) network, such as a local-area network or a wide-area network, there is a single base station (BS) that manages the flow of data packets to and from a plurality of subscriber stations (SS). Communications between any two subscriber stations are typically routed through the base station, and communications from subscriber stations to points outside of the network are typically routed through a gateway coupled to the base station, where the gateway is coupled to a larger network, such as an Internet backbone. Any number of communication channels may be established amongst the stations, as determined by the needs of the users served by the stations, with each communication channel conveying one or more MAC-level connections. For example, several application programs being run by a user at a subscriber station may establish a number of communication channels between themselves and a base station, with the communication channels conveying several MAC-level connections. Examples of such application programs are internet browsers and word editing programs used to edit documents kept at a central file server at the base station. In many network communication standards, such as the IEEE 802.16 Wireless Standard, a "downlink" channel is established to convey data from the base station to a subscriber station, and an "uplink" channel is established to convey data from the subscriber station to the base station. The flow of data in each channel is unidirectional. In general, each such channel is dedicated to a particular application program running on the subscriber station or the base station, or to a particular set of application programs running on both stations; and each such channel can convey the MAC PDUs of one or more MAC-level connections. To manage the packet traffic between the base station and each of the subscriber stations, the base station establishes a repeating frame of physical time slots, or "physical slots" (PS) for short, with each physical slot having room for an integer number of modulation symbols. Each modulation symbol conveys an FEC block, which in turn conveys one or more MAC PDUs, or portions thereof. The time duration of a frame typically ranges between 2 milliseconds and 20 milliseconds.

Figure 2:
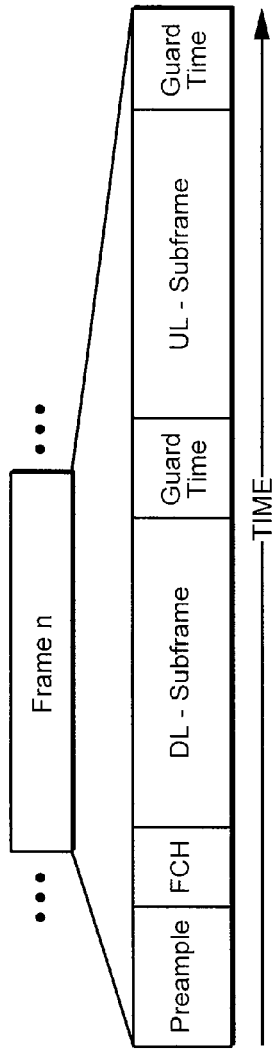
FIG. 2 is a general schematic diagram of a network communications frame according to the prior art.

Frame Structure. In many network communication standards, such as the IEEE 802.16 Wireless Standard, a portion of the frame known as the "downlink sub-frame" ("DL sub-frame") conveys the data bits of the downlink MAC-level connections, and another portion of the frame known as the "uplink sub-frame" ("UL sub-frame") conveys the data bits of the uplink MAC-level connections. This is illustrated in FIG. 2 for a case where the sub-frames are transmitted on the same frequency (or frequencies in the case of some modulation schemes), and are time-division multiplexed. This arrangement of sub-frames is called Time Division Duplexing (TDD). In other implementations, which are called Frequency Division Duplexing arrangements, the uplink sub-frames and the downlink sub-frames are transmitted on separate frequencies (or separate sets of frequencies in the case of some modulation schemes), with the downlink sub-frames following one another in time, and with the uplink sub-frames following one another in time. Each frame also has a frame control header (FCH) that is located at the start of each frame after a preamble message generated by the PHY layer, and that indicates the starting locations of the sub-frames. The positions of the MAC PDUs for a particular connection can vary from frame to frame, but can always be identified by the connection identifier (CID). In addition, there are guard times after each sub-frame to avoid conflicts in transmissions, and to give the base station and subscriber stations time to ramp up or ramp down their transmission carrier signals, as the case may be.

The IEEE 802.16 Wireless Standard allows the modulation symbols of a frame to be transmitted by several different modulation methods. Each modulation method has an intrinsic degree of robustness (e.g., immunity to noise sources and reception distance) and an intrinsic data-carrying capacity (e.g., number of bits communicated per second), each of which are generally inversely related. For example, the BPSK modulation method has high robustness but low data-carrying capacity, while the QAM64 modulation method has low robustness but high data-carrying capacity. In general, a more robust modulation method is needed as the distance between the base station and the subscriber station increases, and as the weather becomes more inclement. The MAC layer of a base station can dynamically maximize the bandwidth for a particular communication connection by having the connection's MAC PDUs transmitted with the modulation method having the highest data-carrying capacity and the lowest robustness that still maintains data integrity for the given environmental conditions. By doing this for all of the connections it handles, the MAC layer of a base station can maximize the bandwidth of the frames. In this regard, it is advantageous for a MAC layer of a base station to use different modulation methods during a frame and to group the MAC PDUs such that all the MAC PDUs to be sent for a frame with a particular modulation method are transmitted in the same transmission burst (i.e., during a common time duration). However, the subscriber stations will need notice of the upcoming bursts of a frame and the modulation methods that will be used for each upcoming burst. To accomplish this, the frame control header is transmitted in the most robust modulation method (BPSK) and it contains a downlink frame prefix (DLFP) that provides an indication of the modulation formats for the first four bursts following the FCH, and an indication of the starting time or burst length of each of the bursts. If a downlink sub-frame has more than four bursts after the FCH, then the first burst after the FCH comprises a downlink map ("DL map") that contains this information for the remaining bursts in the downlink sub-frame. The first burst after the FCH is also transmitted in one of the more robust modulation methods, and comprises an uplink map ("UL map"). The downlink map contains data indicating the number of subsequent transmission bursts, an indication of the physical slot (PS) at which each additional transmission burst begins, and the modulation method used to generate the transmission burst. The relative positions of the FCH (DLFP) and the first downlink burst (DL Burst #1) in the downlink sub-frame are illustrated at 12 in FIG. 3. Each subscriber station reads the DLFP and the DL map to determine when and how to demodulate subsequent bursts, and reads the UL map to determine when it can send its data to the base station.

In the above way, a near-infinite sequence of frames is provided to convey the data bits of the MAC-level connections between the base station and the subscriber stations. In general, the MAC layer of the base station organizes the sequence of frames, including generating the content of the frame control headers (FCHs), DLFPs, DL maps and UL maps, and the PHY layer of the base station implements the FCHs, DL maps, UL maps, and MAC PDUs in FEC blocks for transmission onto the communications medium.

Figure 4:
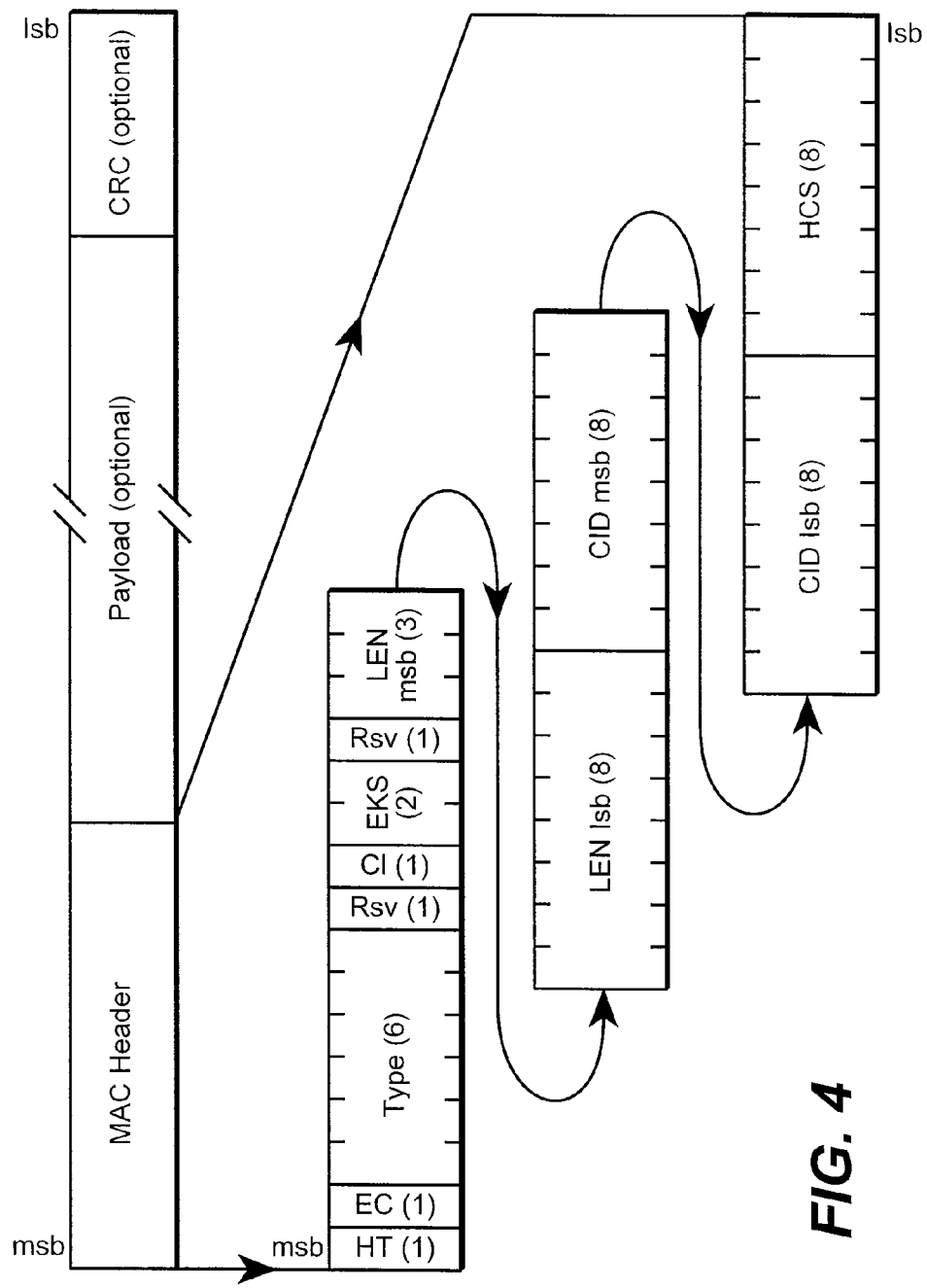
FIG. 4 is a detailed schematic diagram of a media-access-control (MAC) protocol-data unit (PDU) according to the prior art.

MAC PDU Structure. As illustrated in FIG. 4, a MAC PDU comprises a MAC header, an optional payload, and a cyclic-redundancy-check value at the end. The MAC header may have two types, a generic MAC header to indicate that the PDU is carrying a MAC management message or regular data traffic, or a bandwidth request header used by a subscriber station to request more bandwidth. The MAC header is six bytes long, and comprises the following fields for generic MAC headers:

(1) a 1-bit message-type field (HT) to indicate the type of MAC header, (2) a 1-bit encryption-control field (EC) to indicate whether the MAC PDU is encrypted, (3) a 6-bit type field (Type) to indicate the type of MAC message, (4) two reserved bits (Rsv) reserved for future possible use, (5) a 1-bit CRC-indicator field (CI) to indicate whether the PDU has a cyclic-redundancy check value, (6) a 2-bit encryption-key-sequence field (EKS) to provide an index to the traffic encryption key (TEK) and an initialization vector used to encrypt the payload if encryption has been done (as indicated by the EC field), (7) an 11-bit length field (LEN) to indicate the length of the MAC PDU, including payload and CRC (if present), in bytes, (8) a 16-bit connection-identifier field (CID) for other MAC layers to use in identifying the connection to which the MAC PDU belongs, (9) an 8-bit header-check sequence field (HCS) used to detect errors in the header.

The downlink connections between a base station and subscriber station may be conveyed in one or more downlink channels established between the two stations, where a channel may comprise a single frequency, a frequency band, or a set of distinct frequencies. The uplink connections may be similarly conveyed in one or more uplink channels. A downlink channel and uplink channel may share the same frequency, frequency band, or set of distinct frequencies, with the downlink data and uplink data being time-division multiplexed (TDD mode), or they may be separated in the frequency domain (FDD mode). The inventions of the present application may be explained and understood using the case where a single channel between the base station and the subscriber stations is used to convey the data in a time-division multiplexed manner (TDD mode), and the inventions of the present application may be readily extended without undue experimentation to implementations where multiple channels are used. In addition, various data structures used in the IEEE 802.16 Wireless Standard to construct the frames and to communicate messages between stations include data fields to select and distinguish among the channels, and one of ordinary skill in the art may consult the 802.16 standard for those implementation details. The inventions of the present application do not pertain to selection of multiple channels per se, and thus the description of multiple channels is minimized in the present application so as to not obscure the inventions. In addition, various data structures in the IEEE standard include MAC addresses for the base station and subscriber stations of a particular network so as to distinguish between multiple networks or to facilitate the establishment of some types of mesh networks. The inventions of the present application do not pertain to these features per se, and thus the description of multiple networks and support for them is minimized in the present application so as to not obscure the inventions. One of ordinary skill in the art may consult the IEEE 802.16 Wireless Standard for those implementation details, which is available from the IEEE and other providers of standards ("802.16 IEEE Standard for Local and Metropolitan Area Networks, Part 16: Air Interface for Fixed Broadband Wireless Access Systems"), the contents of which are incorporated herewith by reference.

Figure 5:
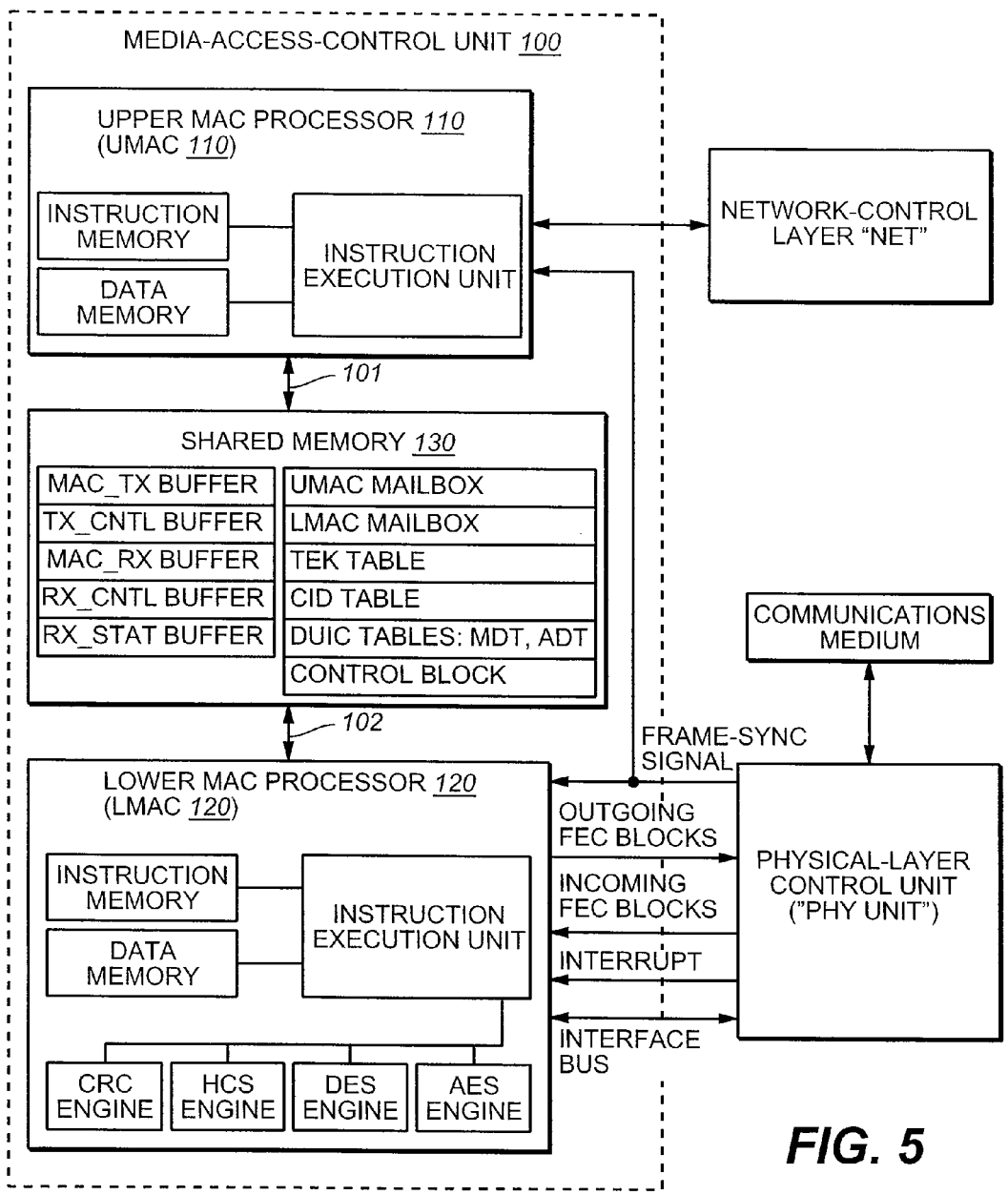
FIG. 5 shows an exemplary embodiment of a media-access control unit according to an invention of the present application.

General Overview. FIG. 5 shows an exemplary embodiment of a media-access control unit 100, herein referred to as MAC unit 100, according to the present invention. One instance of control unit 100 may be used to implement the MAC layer of a base station, and one or more additional instances of control unit 100 may be used to implement the MAC layers of one or more corresponding subscriber stations. MAC unit 100 processes the flow of data between a network-control layer "NET" and a physical-layer control unit of a network communications component. Network-control layer NET implements a network protocol-layer unit for the communications component (e.g., base station or subscriber station), which is a higher protocol layer than the physical layer, or the MAC layer. The physical-layer control unit, herein referred to as the "PHY Unit," interfaces with a communications medium and has an input port to receive data in the form of FEC blocks to be transmitted to the communications medium and an output port to provide data in the form of FEC blocks that have been received from the communications medium. MAC unit 100 comprises a first processor 110, called the Upper-MAC processor 110 or the UMAC 110, that receives high-level data units from the network-control layer NET and generates outgoing MAC protocol-data units therefrom. In addition, UMAC 110 assigns connection identifiers (CIDs) to each outgoing MAC protocol-data unit and schedules the transmission of the MAC PDUs in the frames. UMAC 110 has an instruction execution unit, an instruction memory, a data memory, sets of instructions that direct its operation (stored in the instruction memory), and a bus port for coupling to the network-control layer NET. Any type of bus may be used to couple UMAC 110 with the network-control layer NET, and the selection thereof is not part of the present inventions and is not critical to the implementation thereof.

MAC unit 100 further comprises a second processor 120, called the LMAC processor 120 or LMAC 120, that receives outgoing MAC protocol-data units generated by UMAC 110, and generates outgoing FEC blocks from the outgoing MAC PDUs for outputting to the input port of the PHY Unit. LMAC 120 has an instruction execution unit, an instruction memory, a data memory, an output port to provide outgoing FEC blocks to the physical-layer control unit, an input port to receive incoming FEC blocks from the physical-layer control unit, and sets of instructions that direct its operation (stored in the instruction memory). LMAC 120 also generates incoming MAC PDUs from the incoming FEC blocks received at its input port. For this, the PHY unit provides an interrupt signal to indicate the presence of incoming FEC blocks for LMAC 120, and LMAC 120 comprises an input port to receive the interrupt signal. LMAC 120 then passes a relevant one of the incoming MAC PDUs to UMAC 110, the relevant ones being those MAC PDUs that are intended for the MAC-layer connections being handled by MAC unit 100, as may be ascertained from the CID in the MAC PDU. LMAC 120 is readily implemented as an event-driven scheduler. In preferred embodiments, LMAC 120 further comprises several task-specific engines, with each engine comprising a state machine, data paths, and registers appropriate to its tasks.

Specifically, LMAC 120 preferably has a CRC engine that computes the cyclic-redundancy-check values of the MAC PDUs, an HCS engine that computes the header-check sequences of the MAC-PDU headers, a DES engine to encrypt or decrypt the payloads of MAC-PDUs according to the Data Encryption Standard for those MAC-PDUs requiring encryption or decryption, and an AES engine to encrypt or decrypt the payloads of MAC-PDUs according to the Advanced Encryption Standard for those MAC-PDUs requiring encryption or decryption. The DES and AES engines also preferably implement the block cipher modes of these encryption standards (e.g., DES-CCM and AES-CCM).

Figure 7:
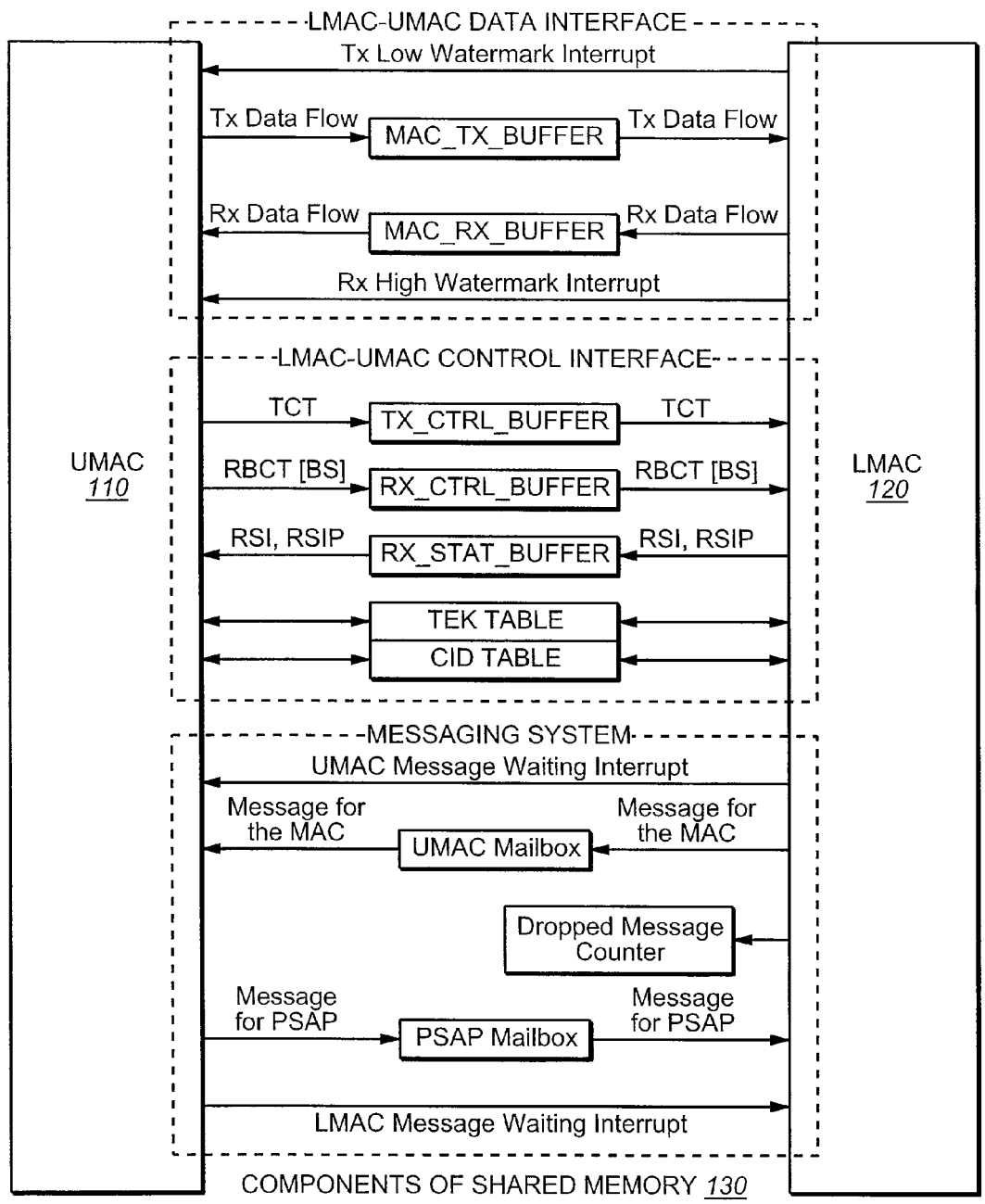
FIG. 7 is a schematic diagram showing the LMAC-UMAC data interface, LMAC-UMAC control interface, and the LMAC-UMAC Messaging System of the exemplary embodiment shown in FIG. 5 according to an invention of the present application.

UMAC 110 and LMAC 120 communicate with one another and exchange MAC PDUs with one another by way of a plurality of buffers, mailboxes, and tables contained in a shared memory 130. The components of memory 130 can be implemented as separate memory devices, or as partitions in one or more memory devices. In either case, each of the components is preferably accessible to UMAC 110 by a first bus 101, and to LMAC 120 by a second bus 102, with shared memory 130 having a dual-port architecture, and with each of UMAC 110, LMAC 120, and shared memory 130 having corresponding bus ports. Shared memory 130 may be incorporated as part of media-access control unit 100, or may be separated therefrom and coupled to UMAC 110 and LMAC 120. In each case, the partitioning and accessing of the memory is collectively done by processors 110 and 120. Sets of instructions on each of UMAC 110 and LMAC 120 direct their respective processors to convey information and data to and from several of the components of shared memory 130. These sets of instructions include three groups of instructions that convey data to and from the components of shared memory 130, with portions of each group running on UMAC 110 and LMAC 120. Referring to FIG. 7, the first group of instructions is part of the LMAC-UMAC Data Interface, and it directs the processors to convey MAC PDUs to and from components MAC_TX BUFFER and MAC_RX BUFFER of shared memory 130. The second group of instructions is part of the LMAC-UMAC Control Interface, and it directs the processors to exchange information on how the MAC PDUs are processed during the transmission and reception steps by way of buffers TX_CTRL BUFFER, RX_CTRL BUFFER, and RX_STAT BUFFER. The third group of instructions is part of the LMAC-UMAC Messaging System, and it directs the processors to communicate directives and configuration information by way of the UMAC and LMAC mailboxes.

UMAC 110 and LMAC 120 are preferably integrated together on a common integrated circuit chip (e.g., system on a chip), with the further integration of shared memory 130 as an option. In a further embodiment described below, connections may be provided for an externally implemented UMAC processor, and LMAC 120 may be configured to multiplex between an on-chip version of UMAC 110 and the connections to an external version of UMAC 110. LMAC 120 has three operating modes that are relevant to the discussions of the present invention: Idle Mode, Run Mode, and Scan Mode. In the idle mode, LMAC 120 does initialization tasks and waits for instructions from UMAC 110. Scan Mode is used in the case where MAC unit 100 is serving as a subscriber station. In Scan Mode, LMAC 120 synchronizes itself and the physical-layer control unit to the broadcast signals and frames of the base station. In Run Mode, LMAC 120 transfers data between UMAC 110 and the physical control unit. A more detailed discussion of these modes is provided after the components of shared memory 130 are described, and after various features of LMAC 120 and UMAC 110 are described.

An overview of the functions of each of the components of shared memory 130 and the related actions performed by the sets of instructions of UMAC 110 and LMAC 120 are discussed next, with a more detailed description of the components provided below. In view of the description of the present inventions herein, one of ordinary skill in the art will be able to readily implement the sets of instructions to provide the described actions in any desired computer language without undue experimentation. In addition, one of ordinary skill in the art will be able to readily implement additional sets of instructions to perform the functions described in the IEEE 802.16 Wireless Standard beyond that needed for the present inventions or that which is described herein. In addition, novices to this field can find tutorial information about the IEEE Wireless Standard on the Internet to help them in implementing the present invention without undue experimentation.

Figure 6:
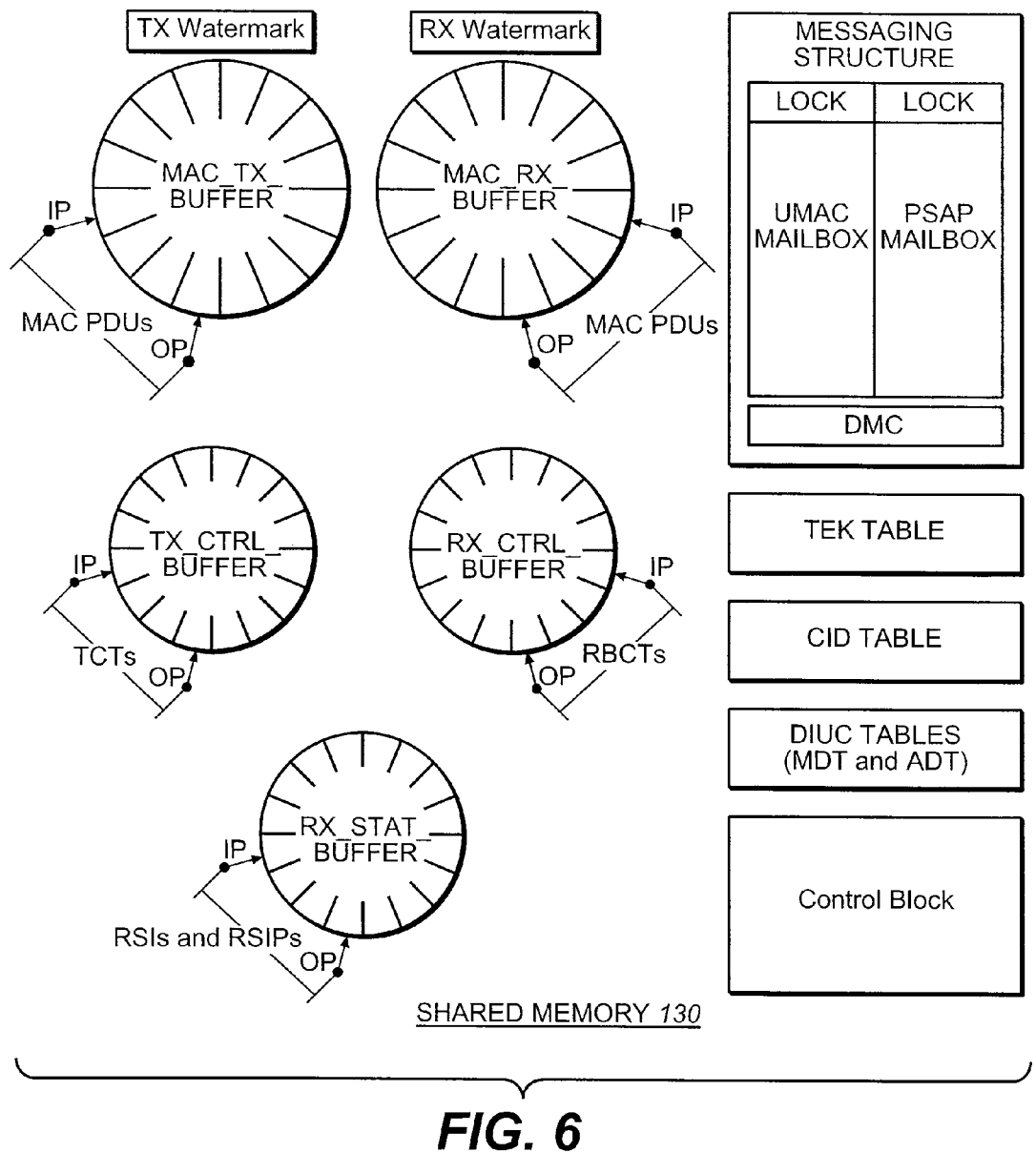
FIG. 6 shows a more detailed view of the shared memory of the exemplary embodiment shown in FIG. 5 according to an invention of the present application.

We refer to FIGS. 5-7 for the next several paragraphs of description. During Run Mode, and for both base-station and subscriber-station operations, outgoing MAC PDUs are stored in the MAC_TX BUFFER by UMAC 110, and retrieved therefrom by LMAC 120. Information on how the MAC PDUs are to be transmitted in outgoing bursts is stored in TX_CTRL BUFFER by UMAC 110, and retrieved therefrom by LMAC 120. For base-station operations, information on how the incoming bursts of incoming MAC PDUs are to be received and demodulated is stored in RX_CTRL BUFFER by UMAC 110, and retrieved therefrom by LMAC 120. (For subscriber-station operations, UMAC 110 is not involved in these tasks since LMAC 120 handles the reception of bursts automatically based on information received in the DLFP and the DL_MAP.) For both base-station and subscriber-station operations, incoming MAC PDUs are stored in the MAC_RX BUFFER by LMAC 120, and retrieved therefrom by UMAC 110. Information on how each incoming burst was received and demodulated is stored in RX_STAT BUFFER by LMAC 120, and optionally retrieved therefrom by UMAC 110 (however, for strict compliance with the IEEE Wireless Standard in most cases, UMAC 110 would have to receive and process this information). The traffic encryption keys for the MAC PDUs of encrypted connections are stored in the TEK TABLE by UMAC 110, and read therefrom by LMAC 120 as needed. The connection identifiers (CIDs) for all the connections being handled by media access control unit 100 for its station are stored in the CID memory by UMAC 110, and read therefrom by LMAC 120. Each downlink burst and each uplink burst can be transmitted according to a number of "burst profiles," with each burst profile comprising a modulation method and a set of configuration parameters for generating the FEC blocks. With each DL-map and downlink frame prefix (DLFP) received from the base station, a subscriber station receives a Downlink Interval Usage Code (DIUC) for each burst in the rest of the downlink sub-frame. The DIUCs are used to configure the PHY unit of the subscriber station to demodulate the downlink bursts and to decode the associated FEC blocks. During Idle, Scan, and Run modes of operation, non-traffic communications (all communications except for passing MAC PDUs) are provided by way of the UMAC MAILBOX and the LMAC MAILBOX. Finally, various pointers, interrupt signals, and flags are stored in the CONTROL BLOCK. A more detailed view of shared memory 130 is provided in FIG. 6, which will be referred to in the following detailed description of the components. After that, a more detailed description of some features of UMAC 110 and LMAC 120 will be given.

The MAC_TX BUFFER is a transmission buffer that stores outgoing MAC PDUs. UMAC 110 fills (writes) this buffer with MAC PDUs at its pace, and LMAC 120 empties (reads) MAC PDUs from the buffer at its pace. The MAC_TX BUFFER preferably comprises a circular buffer having a fixed number of words, an input pointer IP that indicates the next memory location (i.e., address of next memory word) for the UMAC to store an outgoing MAC PDU, and an output pointer OP that indicates the next memory location for the LMAC to read an outgoing MAC PDU. The pointers IP and OP for this buffer can be located in the control block. Upon startup, the pointers IP and OP are set to the same memory location. UMAC 110 places an outgoing MAC PDU at the location indicated by pointer IP, and increments the value of the pointer by the number of words needed to store the MAC PDU (i.e., the length of the PDU rounded up to the next word boundary). LMAC 120 reads an outgoing MAC PDU starting at the location indicated by pointer OP only if the value of OP is different from the value of IP. The length of the MAC PDU is ascertained by LMAC 120 from the length field of the MAC's header (see FIG. 4), and from this LMAC 120 determines how many word locations to read, reads them, and updates the value of output pointer OP to the next word boundary that will occur after the MAC PDU is read. In preferred embodiments, LMAC 120 generates a low-TX-watermark signal indicating that the data size of the MAC PDUs in the MAC_TX BUFFER is below a designated amount, which can be varied during operation by UMAC 110 through the mailboxes described below in greater detail. UMAC 110 preferably treats the low-TX-watermark signal as an interrupt signal, and preferably responds to it by storing additional outgoing MAC protocol-data units in the MAC_TX BUFFER, if available. The low-TX-watermark signal can take the form of a bit flag that is stored in the control block, with UMAC 110 periodically monitoring the flag's value. FIG. 7 is a schematic illustration of the flow of outgoing MAC PDUs through the MAC_TX BUFFER, as well as the flow of incoming MAC PDUs through the MAC_RX BUFFER, which is discussed next.

The MAC_RX BUFFER is a reception buffer that stores incoming MAC PDUs. LMAC 120 fills (writes) this buffer with MAC PDUs at its pace, and UMAC 110 empties (reads) MAC PDUs from the buffer at its pace. The MAC_RX BUFFER preferably comprises a circular buffer having a fixed number of words, an input pointer IP that indicates the next memory location (i.e., address of the next memory word) for LMAC 120 to store an incoming MAC PDU, and an output pointer OP that indicates the next memory location for UMAC 110 to read an incoming MAC PDU. The pointers IP and OP for this buffer can be located in the control block. Upon startup, the pointers IP and OP are set to the same memory location. LMAC 120 places an incoming MAC PDU at the location indicated by pointer IP, and increments the value of the pointer by the number of words needed to store the MAC PDU (i.e., the length of the PDU rounded up to the next word boundary). UMAC 110 reads incoming MAC PDUs starting at the location indicated by pointer OP only if the value of OP is different from the value of IP. The length of the MAC PDU is ascertained by UMAC 110 from the length field of the MAC's header, and from this UMAC 110 determines how many word locations to read, reads them, and updates the value of output pointer OP to the next word boundary that occurs after the last MAC PDU is read. In preferred embodiments, LMAC 120 generates a high-RX-watermark signal indicating that the data size of the MAC PDUs in the MAC_RX BUFFER is above a designated amount, which can be varied during operation by UMAC 110 through a command message passed to LMAC 120 via the LMAC mailbox, which is described below. UMAC 110 preferably treats the high-RX-watermark signal as an interrupt signal, and preferably responds to it by emptying (reading) incoming MAC protocol-data units from the MAC_RX BUFFER. If the MAC_RX BUFFER is about to overflow during the regular running mode of media-access control unit 100 because UMAC 110 has not emptied the buffer in a timely manner, LMAC 120 will not overwrite the buffer, but will cease data transfer and generate an exception message through the messaging system (described below) to indicate an overrun condition to UMAC 110. The high-RX-watermark signal can take the form of a bit flag that is stored in the control block, with UMAC 110 periodically monitoring the flag's value.

TX_CTRL BUFFER. For each downlink (DL) sub-frame, UMAC 110 groups the outgoing MAC PDUs for that sub-frame so that outgoing MAC PDUs with the same modulation method are transmitted in one or more bursts having the same burst profile. (As indicated above, the modulation method, and thus the burst profile, for an outgoing MAC PDU will generally depend upon the subscriber station to which the PDU is being sent.) UMAC 110 assembles a group of outgoing MAC PDUs to be sent in a common burst, stores those PDUs in the MAC_TX BUFFER, and then stores a corresponding transmission Burst Control Tag (TCT) in the TX_CTRL BUFFER. The TCT has a fixed number of words (i.e., is a fixed size), and specifies the transmission modulation method and transmission time for the burst that will transmit the stored outgoing MAC PDUs, as well as an indication of which MAC PDUs in the MAC_TX BUFFER to use for transmission. (The latter indication can be done in a number of ways, and one simple way is for the indication to provide the number of bytes stored in the MAC_TX BUFFER.) The TX_CTRL BUFFER preferably comprises a circular buffer having a fixed number of words, an input pointer IP that indicates the next memory location (i.e., address of the next memory word) for UMAC 110 to store a TCT for an outgoing burst, and an output pointer OP that indicates the next memory location for LMAC 120 to read a TCT for an outgoing burst. The pointers IP and OP for this buffer can be located in the control block. Upon startup, the pointers IP and OP are set to the same memory location. UMAC 110 places the TCT at the location indicated by pointer IP, and increments the value of the pointer by a number equal to the fixed size (in words) of the TCT. LMAC 120 reads a TCT for an outgoing burst starting at the location indicated by pointer OP only if the value of OP is different from the value of IP. LMAC 120 does this for each outgoing burst that it processes. An exemplary TCT includes the following fields: (1) an 11-bit field providing the transmission start time of the outgoing burst, given as the symbol number at which the transmission burst is required to start; (2) a 3-bit field providing a modulation code to indicate the type of modulation to be used for the burst; (3) an 18-bit field to indicate the total number of bytes to be transmitted in the burst (which enables LMAC 120 to read the correct number of MAC PDUs from the MAC_TX BUFFER for the burst); (4) a 24-bit field to provide a frame sequence number indicating which frame the burst belongs to (which enables LMAC 120 to ensure proper sequencing of the MAC PDUs); (5) a 4-bit field to indicate the type of burst (FCH burst, MAC-PDU burst, non-MAC PDU burst); (6) parameters for FEC-block encoding, and (7) various secondary parameters useful to the PHY-layer control unit, such as parameters for antenna selection, scrambling format, and preamble and midamble formats.

An exemplary sequence of actions for assembling MAC PDUs for transmission by the base station is now described. Prior to the start of each frame, the base-station UMAC 110 increments its frame sequence number, decides which MAC PDUs to send in the DL sub-frame based on the outgoing data packets that have been provided to it by the network-control layer NET and the levels of service required for the data packets, groups the outgoing MAC PDUs into outgoing burst groups, and assigns burst start times for the outgoing burst groups. It also decides how much uplink time to allocate to each subscriber station, and assigns burst start times for the subscriber-station bursts. From all of this, UMAC 110 generates the FCH, with the FCH's downlink frame prefix (DLFP) providing information on how the first number of bursts (up to four) that will follow the FCH burst of the downlink sub-frame are to be transmitted. UMAC 110 loads the FCH into the MAC_TX BUFFER and thereafter stores a TCT for the FCH in the TX_CTRL BUFFER, with the TCT having its 4-bit burst-type field set to indicate "FCH burst," which lets LMAC 120 know that the data for the FCH is to be specially processed (e.g., not sent as a regular MAC PDU). UMAC 110 also generates a DL-Map if it has more than four downlink bursts that follow the FCH burst for the downlink sub-frame, and also generates a UL-Map. The DL- and UL-Maps are in the form of MAC PDU messages. UMAC 110 stores them in the MAC_TX BUFFER, along with any other messages that need to go in the first burst after the FCH burst. It then generates a TCT for these PDUs, with an indication in the TCT that they are to be transmitted as the first burst following the FCH burst and with the TCT's 4-bit burst-type field set to indicate "MAC-PDU burst." UMAC 110 thereafter stores the TCT for the first burst in the TX_CTRL BUFFER. Then, for each remaining outgoing burst group, the base-station UMAC 110 generates the TCT for the group, stores the outgoing MAC PDUs of the group into the MAC_TX BUFFER, and thereafter stores the TCT for the burst group in the TX_CTRL BUFFER. The TCT for these bursts has its 4-bit burst-type field set to indicate "MAC-PDU burst." The base-station LMAC 120 thereafter reads each of the above TCTs from the TX_CTRL BUFFER, determines the number of outgoing MAC PDUs to read for the burst from the MAC_TX BUFFER from the field that indicates the number of bytes in the burst, ascertains the burst type for the burst (i.e., whether it is an FCH burst or MAC-PDU burst or other type of burst), and generates corresponding outgoing FEC blocks based on the modulation method, burst type, burst start time, and other parameters indicated in the TCT.

An exemplary sequence of actions for assembling MAC PDUs for transmission by a subscriber station is implemented somewhat differently, but has some of the above actions. For example, the UMAC for the subscriber station does not need to maintain a frame sequence number or generate FCHs, UL-maps, and DL-maps. Like the UMAC of the base station, the subscriber station UMAC 110 decides which MAC PDUs to send in the UL sub-frame based on the outgoing data packets that have been provided to it by the station's network-control layer NET and the associated levels of service for the data packets, and groups the outgoing MAC PDUs into one or more outgoing burst groups. Then, by the time the subscriber station has received and processed the downlink sub-frame, the subscriber-station UMAC 110 determines from the received UL-map which physical slot(s) it is to use to transmit its one or more burst(s) for the uplink sub-frame and the corresponding modulation method(s). Then, prior to the start of the uplink sub-frame, and for each outgoing burst group, the subscriber-station UMAC 110 generates the TCT for the group, stores the outgoing MAC PDUs of the group into the MAC_TX BUFFER, and thereafter stores the TCT for the burst group in the TX_CTRL BUFFER. The subscriber-station LMAC 120 thereafter reads the TCT from the TC_CTRL BUFFER, determines the number of outgoing MAC PDUs to read from the MAC_TX BUFFER from the field that indicates the number of bytes in the burst, and generates corresponding outgoing FEC blocks based on the modulation method, burst start time, burst type, and other parameters indicated in the TCT. For completeness, we note that a subscriber station must usually first request a bandwidth allocation from the base station before the base station can grant any transmission opportunities (via the UL-Map) to the subscriber station. The present inventions do not pertain directly to the actions involved in seeking bandwidth allocations and granting bandwidth allocations. Information on this can be found in the IEEE 802.16 Wireless Standard and at various websites on the Internet.

RX_CTRL BUFFER. For base-station operations, a Receive Burst Control Tag (RBCT) is passed to LMAC 120 by UMAC 110 through the RX_CTRL BUFFER for each uplink burst that UMAC 110 expects to receive during the uplink sub-frame. An exemplary RBCT includes the following fields: (1) an 11-bit field providing the transmission start time, given as the symbol number at which the burst is expected; (2) a 3-bit field providing a modulation code to indicate the type of modulation of the expected burst; (3) an 18-bit field to indicate the total number of symbols in the expected burst; (4) a 24-bit field to provide a frame sequence number indicating which frame the expected burst belongs to (this enables LMAC 120 to ensure proper sequencing of the MAC PDUs); (5) parameters for the FEC-block encoding, and (6) various secondary parameters useful to the PHY-layer control unit, such as parameters for antenna selection, scrambling format, and preamble and midamble formats. In preferred embodiments, the RBCT further comprises an indication of the connection identifiers (CIDs) of the MAC PDUs that are to be in the expected burst. This indication may be provided in many ways, and a preferred way is for the RBCT to provide an index (e.g., address location) to a section of the CID table that has these CIDs. This speeds up the CID lookup process in LMAC 120 when the CID Table is very large in the base station. This can be efficiently done by organizing the CID table such that CIDs assigned to a particular subscriber station reside together as a contiguous group of CIDs. The RBCT preferably has a fixed size (e.g., 4 or 5 words), but may have a variable length, such as may be the case when the RBCT includes the actual CIDs of the MAC PDUs in the expected burst rather than an index. In the latter case, it is preferred that the RBCT include a field that indicates the size of the RBCT so that LMAC 120 can determine its size.

As indicated above, the base-station UMAC 110 generates an RBCT for each uplink burst that it expects to receive in the uplink sub-frame, with the RBCTs being stored in the RX_CTRL BUFFER. This buffer preferably comprises a circular buffer having a fixed number of words, an input pointer IP that indicates the next memory location (i.e., address of the next memory word) for UMAC 110 to store an RBCT for an expected incoming burst, and an output pointer OP that indicates the next memory location for LMAC 120 to read an RBCT for an expected incoming burst. The pointers IP and OP for this buffer can be located in the control block. Upon startup, the pointers IP and OP are set to the same memory location. UMAC 110 places the RBCT at the location indicated by pointer IP, and increments the value of the pointer by a number equal to the fixed size (in words) of the RBCT. LMAC 120 reads an RBCT for an expected incoming burst starting at the location indicated by pointer OP only if the value of OP is different from the value of IP. LMAC 120 does this for each expected incoming burst for each uplink sub-frame. The frame sequence numbers in the RBCTs can be used by LMAC 120 to correlate the expected incoming bursts with the incoming uplink sub-frames. As another way, LMAC 120 can presume that all RBCTs that it reads are for the upcoming or current uplink sub-frame, and UMAC 110 can defer storing the RBCTs for an uplink sub-frame until after the prior uplink sub-frame has finished. To facilitate this, UMAC 110 can receive and monitor a frame-synchronization signal generated by the PHY unit (shown as FRAME-SYNC SIGNAL in FIG. 5). This signal provides a pulse at the start of each frame. The signal is also provided to LMAC 120 to assist it in generating the FEC blocks. In preferred embodiments, the timing of this pulse is programmable, and can be set by UMAC 110 to compensate for the various overhead tasks that it performs.

The RBCTs are not used by the subscriber stations. Instead, the LMACs of the subscriber stations obtain the information needed to demodulate the bursts of the downlink sub-frames from the DLFP contents (which are carried by the FCH bursts) and the DL maps at the beginnings of the downlink sub-frames.

The RX_STAT BUFFER holds information that LMAC 120 generates about the incoming bursts that it receives and about the incoming MAC PDUs that it processes. This information can be used by UMAC 110, as needed, such as to determine the quality of reception and whether there was an error during the burst acquisition. For each received burst, LMAC 120 generates a Received Burst Status Block (RSI) that indicates whether the burst was received and, if so, the length of the received burst (as measured in symbols) and an indication of whether any errors were encountered in the received data. The RSI also preferably has one or more measures of the strength of the signals present in the received modulation symbols and the degree of interference noise, and one or more measures of the degree to which the PHY layer was able to lock onto the burst's preamble. The RSI also preferably has an indication of whether the received burst is carrying ordinary MAC PDUs, an FCH burst, or a MAC-level management message between stations. The RSI may also have the starting location in the MAC_RX BUFFER for the MAC PDUs that were conveyed by the burst. The RSI has a fixed length, usually several words in length. For each received burst that is intended for the station, LMAC 120 can be configured by UMAC 110 to generate a Received MAC PDU Status Block (RSIP) that indicates the length of the PDU (in bytes). The RSIP has a fixed length, and can be as short as one word.

LMAC 120 places an RSI in the RX_STAT BUFFER for each burst that it receives, and if further configured, it places an RSIP in the RX_STAT BUFFER for each of the burst's MAC PDUs that is safely received and that has a CID in the CID table. In order for UMAC 110 to distinguish between RSIs and RSIPs, the first word of each RSI and RSIP has an identification field (located at the same bit locations in the RSI and RSIP) that indicates whether the word is the start of an RSI or an RSIP. The RX_STAT BUFFER preferably comprises a circular buffer having a fixed number of words, an input pointer IP that indicates the next memory location (i.e., address of the next memory word) for LMAC 120 to store an RSI or RSIP, and an output pointer OP that indicates the next memory location for UMAC 110 to read an RSI or RSIP. The pointers IP and OP for this buffer can be located in the control block. Upon startup, the pointers IP and OP are set to the same memory location. LMAC 120 places an RSI or RSIP at the location indicated by pointer IP, and increments the value of the pointer by the number of words in the RSI or RSIP, as the case may be. When the values of OP and IP are different, UMAC 110 reads the first word at the location indicated by pointer OP and looks at the RSI/RSIP identification field to determine whether an RSI or RSIP is present at the output of the buffer. It then reads any remaining words of the RSI or RSIP, and updates the value of output pointer OP by the total number of words read.

The Connection Identifier (CID) Table in memory 130 comprises a plurality of CID entries, each of which has a connection identifier (CID), a traffic-encryption field (TEF) and one or more flags associated with the CID to support various functions. If a connection has its MAC PDUs encrypted, then the traffic-encryption field for the connection's CID entry will have the index to the encryption key in the TEK table for the connection. (The TEK table is described below.) The CID table memory is initialized and updated by UMAC 110 to reflect changes in connections and their encryption status. When updating the CID table, UMAC 110 locks the table by using a CID table lock semaphore in the control block. Both base-station and subscriber-station LMACs may use the CID table memory to find the TEK keys for incoming MAC PDUs. Exemplary implementations of the CID table memory have 1024 CID entries.

Each subscriber-station LMAC 120 checks the CID of an incoming MAC PDU against the CID entries stored in the CID table memory to determine if the MAC PDU is intended for the subscriber station. The subscriber-station LMAC 120 is generally configured to pass only those incoming MAC PDUs to the UMAC when the PDU's CID is found in the subscriber station's CID table. This filtering based on CIDs reduces the burden on the subscriber station's UMAC 110. The LMAC 120 may be configured to drop an incoming MAC PDU if, at the time of an attempted CID search, the CID table is found to be locked by the UMAC 110. In the base station, it is advantageous to arrange the CID entries associated with a subscriber station together as a contiguous group in the table, with the memory location of the first CID entry in the group serving as the index to the group, or "group CID index." Thus, when the base-station LMAC processes the incoming MAC PDUs conveyed in an uplink burst from the subscriber station, it can begin its search in the CID table at the group CID index assigned to the subscriber station, rather than at the beginning of the table. This grouping increases the LMAC's efficiency in processing and decrypting the incoming MAC PDUs of the uplink bursts from the subscriber stations. As indicated above, the group CID index can be provided in the RBCT tag that the base-station UMAC 110 stores in the RX_CTRL BUFFER for each expected incoming burst.

For subscriber station applications, it would be useful to group the CIDs for a particular subscriber station such that there is a common bit pattern in the CIDs (such as having the same eight most significant bits being the same for all of the CIDs of a subscriber station). In this way, LMAC 120 can look at just the first byte of the CID of an incoming MAC PDU to determine if it belongs to the subscriber station. Assigning the CIDs to the subscriber stations would be left to the base station to do, but the CID table of MAC Unit 100 can be augmented to support this strategy. Specifically, we allow for the possibility that the base station will allocate CIDs such that the CIDs of each subscriber station share a common bit pattern in a preset group of the CID's bits (such as the most significant byte), and that the base station will inform each subscriber station of its assigned bit pattern, and that each subscriber station will store its assigned bit pattern as a "CID mask." Alternatively, UMAC 110 can scan the CID table and find the common pattern. The CID of an incoming MAC PDU may then be ANDed with subscriber-station's CID mask to see if there is a match. If not, the MAC PDU is discarded. If there is a match, the table is further searched if there is a need to obtain the TEK entry. After that, the MAC PDU is sent to UMAC 110.

To support the concept of CID masking, the CID table can be augmented to include a flag indicating whether an entry of the Table is a regular CID (with possible associated TEK entry) or a CID mask. The bits of the CID entry that are normally used to store the CID are instead used to store the CID mask. The CID mask is placed at the start of the CID table, and LMAC 110 searches this entry first to first test the incoming CID against all of its CID masks. We also allow for the possibility that the base station can assign multiple CID masks to a subscriber station. In this case, all of the CID masks are stored at the start of the CID table. We also allow for the possibility that the base station will assign CID masks that have variable lengths and variable positions. For this, the data bits of the CID entry normally used to store the index to the TEK table may instead be used to indicate the number of bits in the CID mask, and location of the CID mask. Finally, we also allow for the case where UMAC 110 can scan through the CID table to find common bit patterns among the CID entries, and thereafter construct a list of CID masks itself and place them at the start of the CID table.

Traffic Encryption Key (TEK) Table Memory. The MAC PDUs for a given connection may be encrypted using AES (Advanced Encryption Standard) or DES (Data Encryption Standard). The decision of whether to encrypt a connection is passed to media-access control unit 100 by the network-control layer NET, along with the selected encryption standard, key, and any initialization vector. The TEK Table memory holds Traffic Encryption Keys (TEKs) for the connections and is maintained by UMAC 110. For the AES standard, the TEK is 16 bytes long; for the DES standard, the TEK and an initialization vector occupy 16 bytes in total. To facilitate implementations of the IEEE 802.16 Wireless Standard, the TEK table memory is arranged to allow two TEKs to be grouped together, the pair being called a "TEK entry." (This standard allows a base station to establish a security association between a subscriber station that may be used by one or more downlink connections and one or more uplink connections, where one of the two keys of the TEK entry is primarily used to encrypt downlink traffic and the other is primarily used to encrypt uplink traffic; more on this is provided in the next paragraph.) A key index (e.g., memory address) is provided for each TEK entry of the table memory; it is a pointer (i.e., address) to the memory location of the TEK entry, and is generally less than a byte in length. The small size of the key index enables UMAC 110 to readily pass it to LMAC 120, which can then retrieve the TEK entry with the key index. As described below in greater detail, for transmitting an outgoing MAC PDU, UMAC 110 can pass a key index for the outgoing PDU to LMAC 120 in the HCS field of the PDU (see FIG. 4 for the location of the HCS field). The HCS field is unused at the time, and this inventive feature saves LMAC 120 from reading the CID from the MAC header and thereafter searching through the CID table in order to retrieve the corresponding TEK entry from the TEK table, and thereby reduces LMAC 120's overhead for transmission operations. When receiving an incoming MAC PDU, LMAC 120 can obtain the key index for the PDU by way of the CID found in the PDU and the CID table, and then look up the TEK entry using the key index. In other words, LMAC 120 reads the CID of the incoming MAC PDU, looks up the key index for that CID in the CID table, and then looks up the TEK entry corresponding to the key index. Depending upon the EKS encryption field of the MAC-PDU header (see FIG. 4), LMAC 120 uses either the first or the second TEK of the TEK entry, as described in the IEEE 802.16 Wireless Standard. It is the responsibility of UMAC 110 to update the TEK table memory in a timely manner and to maintain the correlation between the TEK table memory and the CID table memory (discussed below). It is also the responsibility of UMAC 110 to timely update the first and second TEKs of an entry. Exemplary implementations of the TEK table memory have 128 TEK entries, which can be represented by the 7-bits of the key index passed in the HCS field.

The EKS (Encryption Key Sequence) field in an ordinary MAC PDU header indicates which TEK of the TEK entry is going to be used for encryption or decryption of that particular MAC PDU. The EKS field can assume values from 0 to 3, inclusive. If the EKS field is 0 or 2, the first TEK of the TEK entry is employed. If the EKS field is 1 or 3, the second TEK is employed. The IEEE 802.16 Wireless Standard defines four possible values for the EKS field but mandates the use of only 2 TEKs per connection. This is the reason for the above rotation scheme. It is possible that a maximum of four TEKs can be used for a connection. In this case, UMAC 110 can update the first TEK after EKS has become 1 and before it becomes 2, and can update the second TEK after EKS has become 3 and before it becomes 4.

DIUC Table Memory. As indicated above, each downlink burst and each uplink burst can be transmitted according to a number of "burst profiles," with each burst profile comprising a modulation method and a set of configuration parameters for generating the FEC blocks. With each DLFP (in the FCH) and each DL-map (if present) in the initial bursts of a downlink sub-frame, the base station sends a 4-bit Downlink Interval Usage Code (DIUC) for each remaining burst in the downlink sub-frame. Each station maintains a correspondence between each DIUC in use and the burst profile currently assigned to it. The assignment of burst profiles to the DIUC codes is managed by the base station, and is periodically communicated to the subscriber stations in a Downlink Channel Descriptor (DCD) message, along with a corresponding 8-bit DCD count in the DCD message. The DCD count that is placed in a DCD message is incremented by one with respect to the DCD count that was in the prior DCD message (and changes from 255 to zero when a DCD count of 255 is incremented). For each frame, the base station also transmits within the DL-map the DCD count that corresponds to the DIUC assignments that it will use to transmit the bursts of the frame's downlink sub-frame. In response to receiving a DCD message, the subscriber stations update their assignments of burst profiles to DIUC codes after the base station changes over to the new DUIC assignments, which can be detected by looking for a change in the DCD count in the DL-map. To facilitate a changeover, the base station transmits a new DCD message, but continues to use the prior DIUC assignments and prior DCD count in the DL-map for a preset duration known as the DCD transition interval (which can be 2 or more frames) after the new DCD message. Then, the base station switches to the new DIUC assignments and provides the new DCD count in the DL-map.

To facilitate the changeover for subscriber stations in a manner that prevents an update error, MAC unit 100 comprises two DIUC tables in shared memory 130 to store the assignments of burst profiles: a Main DIUC Table (MDT) and an Alternate DIUC Table (ADT). Each table can include the DCD count on which it is based. The subscriber-station LMAC 120 always uses the MDT, while the ADT is used to process updates that are sent in DCD messages from the base station. Specifically, the subscriber-station UMAC 110 immediately updates the ADT (i.e., before the DCD count is changed in the DL-maps) whenever it receives a DCD message from the base station. The exact time point that the base station transitioned to the new assignments of burst profiles to DIUCs does not need to be known by the UMAC 110. The subscriber-station LMAC 120 monitors the value of the DCD count provided in the DL-maps, and starts using the updated assignment of burst profiles to DIUCs by copying the contents of the ADT onto the MDT when it detects a change in the DCD count provided in the DL-map. The copying is done as soon as the DL-map is decoded and before the start of the next burst in the downlink sub-frame. From this point on, the ADT is free to be updated by the subscriber-station UMAC 110 in response to the next DCD message from the base station. It is the responsibility of the subscriber-station UMAC 110 to keep the ADT updated based on DCD messages from the base station. During startup, the subscriber-station LMAC 120 preferably initializes both the MDT and ADT tables with default values suggested by the IEEE 802.16 standard. Employing the alternate DUIC table (ADT) according to this invention of the present application ensures a smooth transition of the DIUC information and prevents possible data loss due to a DCD update.

The UMAC/LMAC MESSAGING SYSTEM handles the non-traffic communications between the UMAC and LMAC processors, including exceptions and configuration directives. The messaging system comprises a UMAC mailbox to store messages for the UMAC processor that are sent by the LMAC processor, an LMAC mailbox to store messages for the LMAC processor that are sent by the UMAC processor, a UMAC-message-waiting signal that signals to the UMAC that its assigned mailbox has a message, and an LMAC-message-waiting signal that signals to the LMAC that its assigned mailbox has a message (FIG. 7). Each mailbox comprises a plurality of memory words, with an exemplary mailbox having enough memory words for one message. An exemplary message comprises a message header, which conveys an identification of the memory, and a payload of data related to the purpose of the message, if needed. In constructed embodiments, the message header comprises a word, and the payload comprises four words. One byte of the message header is used as a class field to indicate the class of the message, which is useful for grouping messages according to function or control level, and another byte is used as an identifier field to indicate the identity of the message. Some messages require that a response message be generated by the receiver and sent back to the originator. For this, the message header includes a 1-bit field (the Response Bit) to indicate that the message is a response message. When a receiver has to respond to a message, it copies the original message header to a new message header for the response message, changes the 1-bit field from 0 to 1 to indicate that the message is a response message, loads any needed data into the payload section of the new message, and thereafter sends the new message to the originator. Thus, the response message that gets sent back contains the class and identity fields of the original message so that the originator can easily correlate the response message to its initial message and use the data in the payload of the response message to address the issue that initiated the need for the original message. Sometimes a receiver may receive a message from the originator that is invalid or irrelevant. In this case, it is useful for the receiver to send the message back to the originator with an indication that the message is either invalid or irrelevant. For this, the message header has a 1-bit field (Invalid bit) to indicate that the message is being returned to the originator for being invalid or irrelevant. When a receiver receives an invalid or irrelevant message, it copies the original message header to a new message header, changes the 1-bit field (Invalid bit) from 0 to 1 to indicate that the received message was invalid or irrelevant, optionally copies the payload of the original message to the payload of the new message, and thereafter sends the new message to the originator. Thus, the originator receives back its original message as being marked invalid or irrelevant, with the class and identity fields of the original message so that it can readily determine which of its messages was not processed by the receiver.

In preferred embodiments, a mailbox-locking mechanism is used for handshaking between the message originator and the receiver. For any message, a receiver mailbox is always locked by the originator and unlocked by the receiver, and the receiver always unlocks its mailbox after reading the message in its mailbox. The lock indicators are shown in FIG. 6 in the boxes marked "LOCK," and each lock indicator may be implemented with a little as one bit of memory storage, but is generally implemented as a word to facilitate fast address accessing. In either case, a value of "0" may be used to indicated an unlocked state, and a value of "1" may be used to indicate a locked state. The lock indicators may be stored with the mailboxes, or may be placed in the control block. Before sending a message, the originator first checks the receiver's mailbox lock indicator. If the receiver's mailbox is unlocked, which indicates that the receiver has read the previous message and is free to receive a new message, the originator writes its message to the receiver's mailbox, sets the lock indicator to indicate that the mailbox is locked, and activates the appropriate message-waiting signal (either the UMAC-message-waiting signal or the LMAC-message-waiting signal). If, instead, the lock indicator shows that the receiver's mailbox is locked, which means that the receiver has not yet read the previous message, the originator discards its message and takes other action, if needed. (The other action may include resending the message after a period of time.) This ensures that the message waiting in the mailbox is never overridden by another message. When a receiver sends a response message back to the originator, it first checks the originator's mailbox lock indicator. If the originator's mailbox is unlocked, the receiver writes the response message to the originator's mailbox, sets the lock indicator to indicate that the mailbox is locked, and activates the appropriate message-waiting signal (either the UMAC-message-waiting signal or the LMAC-message-waiting signal). If, instead, the lock indicator shows that the originator's mailbox is locked, the receiver discards its message and takes other action, which may include resending the response message after a period of time.

When LMAC 120 discards a message because the UMAC mailbox is locked, LMAC 120 increments a counter called the Dropped Message Counter, which is shown as box DMC in FIG. 6. If UMAC 110 cannot empty its mailbox fast enough, it can check the DMC counter to see if any messages from LMAC 120 have been lost. In order to minimize the number of dropped response messages, the originator (e.g., UMAC 110) can first check its mailbox and clear it, if full, before sending its message to the receiver (e.g., LMAC 120). In preferred embodiments, there is no message queuing and only one message per direction can exist at a given time. Each message also receives a response message indicating that another message may be sent.

Control Block. All of the buffer pointers (IP and OP pointers) and mailbox lock indicators are preferably implemented in the control block, which is preferably constructed to provide fast and direct access to both UMAC 110 and LMAC 120. Having described the components of shared memory 130 (FIGS. 5 and 6) and how UMAC 110 and LMAC 120 interact with the components via their instruction sets, we now turn to describing inventive features of UMAC 110 and LMAC 120.

LMAC Generation of HCS Values We now discuss various features of UMAC 110 and LMAC 120. Referring to FIG. 4, when UMAC 110 passes outgoing MAC PDUs to LMAC 120, it passes them without computed HCS values, and without computed CRC values. The HCS (header check sequence) is an eight-bit field used to detect errors in the MAC header, and the CRC (cyclic-redundancy check value) is a four-byte field used to detect simple errors in the MAC PDU. LMAC 120 then calculates the HCS value based on the first five bytes of the outgoing MAC header, and inserts the result into the HCS field, which is the sixth and last byte of the MAC header. In preferred embodiments, LMAC 120 passes the first five bytes of the MAC header to its HCS engine, which computes the HCS and returns it to LMAC 120. Various network standards define how the HCS is to be computed. It is within the ability of one of ordinary skill in the art to construct an HCS engine to compute the HCS value, or to construct a set of instructions that direct LMAC 120 to compute it itself, such as when LMAC is implemented by a microprocessor or equivalent. Because the HCS computation is relatively compact, an exemplary HCS engine may be implemented as a state machine with a plurality of storage latches, and with a data path to accept the first five bytes of the MAC header and to provide the computed HCS values. The IEEE 802.16 Wireless Standard defines the computation for the HCS value, and one of ordinary skill in the art is directed to the Standard for specific information. As a general overview, the Standard specifies the HCS value as the remainder of the division (Modulo 2) by the generator polynomial $g(D)= D^8+D^2+D+1$ of the polynomial $D^8$ multiplied by the content of the header excluding the HCS field.

LMAC Generation of CRC Values. After LMAC 120 computes the HCS value and inserts it into the outgoing MAC header, LMAC 120 looks at the CI bit (FIG. 4) of the MAC header to ascertain whether a cyclic-redundancy-check (CRC) value is to be computed for the outgoing MAC PDU. The CRC value is based on the completed MAC header and the payload of the outgoing MAC PDU, if present. If the CI bit is set, LMAC 120 computes the CRC and inserts the result into the CRC field of the outgoing MAC PDU, which is the last four bytes of the PDU, and which may be initially passed to LMAC 120 by UMAC 110 in blank form. In preferred embodiments, LMAC 120 passes the header and any payload of the outgoing MAC PDU to its CRC engine, which computes the CRC and returns it to LMAC 120. Various network standards define how the CRC is to be computed. It is within the ability of one of ordinary skill in the art to construct a CRC engine to compute the CRC value, or to construct a set of instructions that direct LMAC 120 to compute it itself, such as when LMAC is implemented by a microprocessor or equivalent. Because the CRC computation is relatively compact, an exemplary CRC engine may be implemented as a state machine with a plurality of storage latches, and with a data path to accept the bytes of the MAC header and payload in serial form and to provide the computed CRC values. The IEEE 802.16 Wireless Standard defines the computation for the CRC value, and one of ordinary skill in the art is directed to the standard for specific information.

Passing of Encryption Keys As mentioned above, UMAC 110 passes an outgoing MAC PDU to LMAC 120 without a computed HCS value. When the payload of an outgoing MAC PDU does not require encryption, the HCS may be left blank. When the payload of an outgoing MAC PDU does require encryption, UMAC 110 preferably places an encryption-type value and a key index in the HCS field, and sets the EC bit (FIG. 4) of the PDU's header. The encryption-type value is preferably 1 bit in length and specifies whether DES or AES encryption is to be used (e.g., 0 for DES and 1 for AES, or vice versa). The key index, which is preferably 7 bits in length, provides the address location in the TEK table memory (in shared memory 130 shown in FIG. 5) to the TEK entry that is to be used to encrypt the outgoing MAC PDU. The organization and management of the TEK table was described above. LMAC 120 first looks at the EC bit of the MAC header to determine if the outgoing MAC PDU requires encryption. If so, it then reads the encryption-type value and key index from the HCS field and temporarily saves them while it computes the header's HCS value and inserts it into the last byte of the MAC header. Then, LMAC 120 encrypts the payload of the outgoing MAC PDU according to the selected encryption type and TEK entry indicated by the key. Various network standards define how the payload is to be encrypted, and whether a message-integrity code (MIC), also called message-authentication code (MAC) is to be computed. The computation of such message integrity/authentication codes is generally based upon both the payload and the header. In preferred embodiments, LMAC 120 passes the header and payload of the outgoing MAC PDU to its DES engine or AES engine, depending upon the encryption-type value. The selected encryption engine returns an encrypted payload and a message integrity/authentication code (if required by the Standard) to LMAC 120. Once the payload has been encrypted, any message integrity/authentication code is added to the encrypted payload, and LMAC 120 then proceeds to compute the CRC (if required) using the MAC header and the encrypted payload. In view of the present disclosure, it is within the ability of one of ordinary skill in the art to construct respective sets of instructions that direct UMAC 110 and LMAC 120 to perform the above tasks.

It is also within the ability of one of ordinary skill in the art to construct a DES engine and an AES engine to encrypt a variable-length payload and to generate a message integrity/authentication code, or to construct a set of instructions that direct LMAC 120 to do these tasks itself, such as when LMAC is implemented by a microprocessor or equivalent. The encryption engines may be implemented as state machines or equivalents thereof, with a data path to accept the bytes of the MAC header and payload in serial form, and to provide the encrypted payload and message integrity/authentication code. The IEEE 802.16 Wireless Standard specifies details of the encryption, and one of ordinary skill in the art is directed to the standard for specific information. In addition, one of ordinary skill in the art may find hardware implementations of DES and AES engines on the Internet at www.opencores.org, and similar open-hardware sites.

CID Filtering in Subscriber Stations. When receiving a MAC PDU, the LMAC 120 for a subscriber station first checks the connection identifier in the CID field of the MAC PDU header to determine if the MAC PDU is intended for the subscriber station. For this, it compares the PDU's CID against the CIDs stored in the CID table memory and only sends the incoming MAC protocol-data unit to the first processor when it finds the communication identifier in the storage memory. If the CID is not found in the table memory, no further processing is done on that particular MAC PDU and the PDU is discarded. The LMAC 120 in a base station does not normally perform CID filtering. In view of the present disclosure, it is within the ability of one of ordinary skill in the art to construct a set of instructions that direct LMAC 120 to perform the above tasks.

DL-MAP Parsing in Subscriber Stations. LMAC 120 handles the task of reading the DL-Map (if present) from the first burst following the FCH burst of a downlink sub-frame to ascertain the information needed to demodulate the remaining bursts in the downlink sub-frame. For this, it scans the incoming FEC blocks to identify the frame header and downlink map of each incoming frame, and it obtains therefrom the start times and modulation formats (i.e., DUIC codes) of the one or more remaining bursts in the incoming frame. Then, before each remaining incoming burst is to start, LMAC 120 outputs commands on an interface bus coupled between itself and the physical-layer control unit to instruct the physical-layer control unit regarding when (start time) and how (modulation format) to demodulate the next incoming burst. As an option, LMAC 120 may convey the DL-Map to UMAC 110 by placing the MAC PDU for it in the MAC_RX BUFFER. (In any event, it always passes up the UL-map and any other messages following it.) If a downlink frame does not contain a DL-Map, LMAC 120 then identifies the DLFP from the incoming FEC block, and obtains therefrom the start times and modulation formats (i.e., DUIC codes) of the one or more remaining bursts. LMAC 120 then instructs the physical-layer control unit in the manner described above. In view of the present disclosure, it is within the ability of one of ordinary skill in the art to construct a set of instructions that direct LMAC 120 to perform the above tasks.

Figure 8:
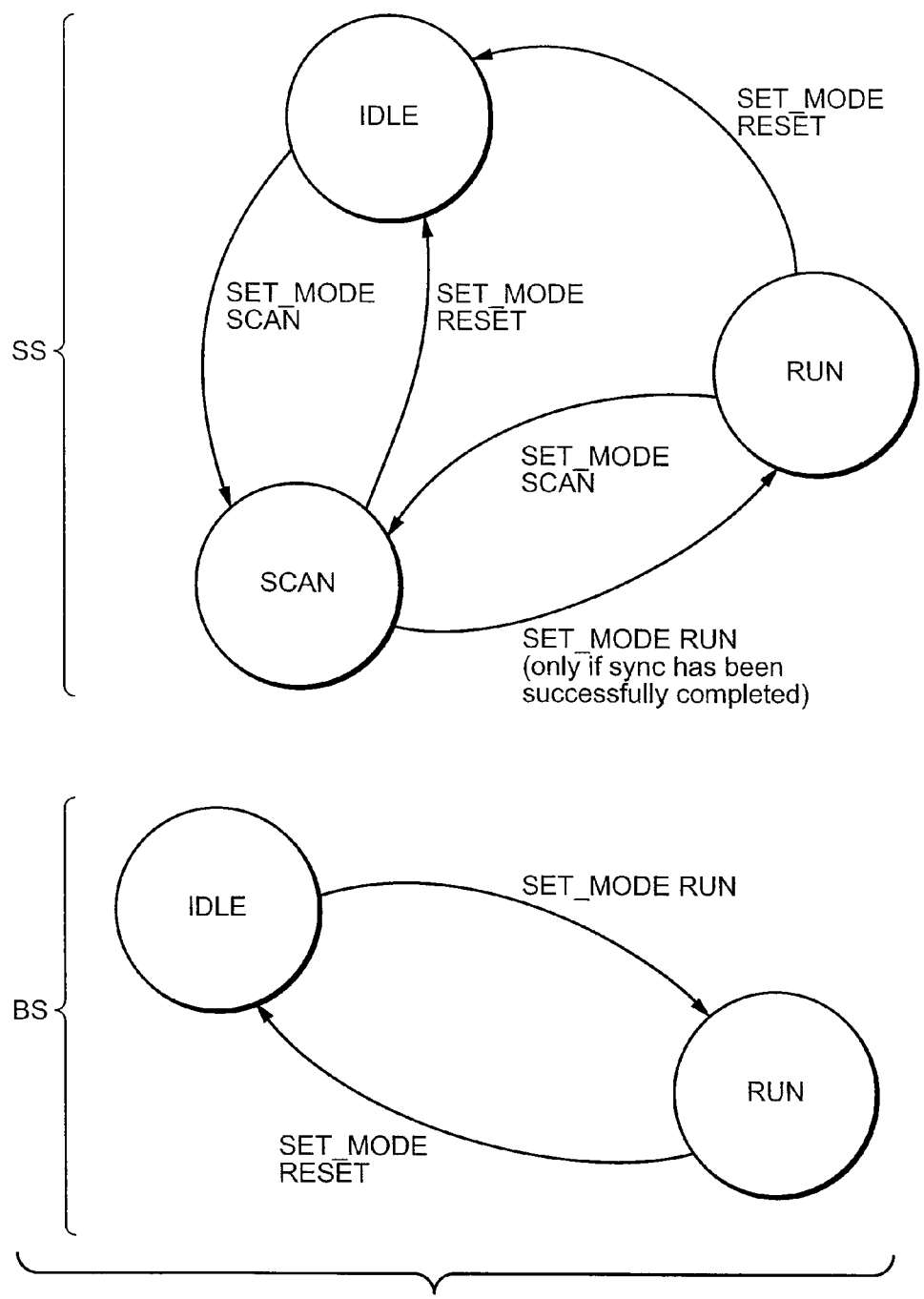
FIG. 8 illustrates exemplary operating modes of the preferred embodiments of LMAC processor for both subscriber-station and base station operations according to the present invention.

Operating Modes of UMAC 110 and LMAC 120. As indicated above, preferred embodiments of LMAC 120 include the following three operating modes: "Idle Mode," "Scan Mode," and "Run Mode." FIG. 8 illustrates these operating modes of the preferred embodiments of LMAC 120 for both subscriber-station and base station operations, and the allowable transitions between modes. The Idle mode is the first mode automatically entered right after the startup. Upon boot-up, LMAC 120 clears and initializes all data structures, IPs, and OPs, LMAC 120 sends a hardware-reset signal to the physical-layer control unit, sends a "READY" message indicating the arrival at the Idle mode to UMAC 110 through the messaging system, which was described above. It then waits in the Idle mode until it receives an instruction to enter either the Scan Mode or the Run Mode. UMAC 110 should write all watermark levels and configuration words after receiving the READY message from LMAC 120. In the Idle mode, LMAC 120 does not pass traffic, it only processes messages sent by UMAC 110 through the messaging system. For subscriber-station applications, UMAC 110 sends a "SET_MODE SCAN" message to LMAC 120 to start LMAC 120 in the Scan Mode. For base station applications, UMAC 110 sends a "SET_MODE RUN" message to LMAC 120 to start LMAC 120 in the Run Mode. In subscriber-station applications, before sending the "SET_MODE RUN" message, UMAC 110 must first determine from the RSI status messages sent by LMAC 120 whether LMAC 120 and the physical control unit have successfully synchronized to the base station's frame transmissions.

The Scan Mode for LMAC 120 is used only in subscriber-station implementations, and it provides an initial synchronization to a base station. Before UMAC 110 instructs LMAC 120 to enter the Scan Mode, it preferably initializes various parameters related to the acquisition of the transmission frames from the base station, such as the cyclic-prefix (CP) length, the frame length, etc., if known, via messages sent through the messaging system. This information may be stored in the control block of shared memory 130 or other locations within the memory, and UMAC 110 may update the memory directly or instruction LMAC 120 to do so through instruction messages. In the SCAN mode, LMAC 120 makes an attempt to locate and synchronize with an incoming service signal using the physical-layer control unit. In Scan Mode, LMAC 120 typically determines the correct cyclic prefix length used in the frame (if not known), and acquires the Frame Control Header (FCH) and other relevant bursts based on this FCH, and passes all relevant data to UMAC 110 along with status information, allowing UMAC 110 to judge whether or not to move to the Run Mode. If the correct cyclic prefix length for the particular installation is known, UMAC 110 can pass this information to LMAC 120 using the "SET-CPLEN" message, before starting the Scan Mode. In this case, the hunt for the cyclic prefix length will be shortened and the system start-up time may be reduced. (The cyclic prefix and the hunting process are described in greater detail below.) The frame length can also be initialized by UMAC 110, if known, using the SET_FRLEN message. Otherwise, the exemplary LMAC 120 starts with the maximum frame length allowed under the networking standard, and UMAC 110 can eventually discover the correct frame length by processing the DCD message that are periodically broadcasted by the base station and passed to it by LMAC 120. (Starting with the maximum frame length ensures that LMAC 120 will receive everything in one single frame. Once the frame length is discovered by UMAC 110 from a DCD message, it sends the correct frame length to LMAC 120 so that it can receive all of the frames in succession, without skipping over any frames.) In preferred embodiments, during Scan Mode, LMAC 120 continuously sends all relevant data and status information to UMAC 110, to support the initial network entry process running on the UMAC 110. UMAC 110 will also be able to determine the correct frame length, if not already known, and pass it to LMAC 120 using the SET_FRLEN message. When synchronization is achieved and all the relevant information is gathered, UMAC 110 sends a SET_MODE RUN message and LMAC will then move on to the Run Mode. (Finally, we note that in Scan Mode of a subscriber station, this high-RX-watermark signal interrupt is preferably used to urge UMAC 110 to read RSIs from the RX_STAT_BUFFER.)

Figure 9A:
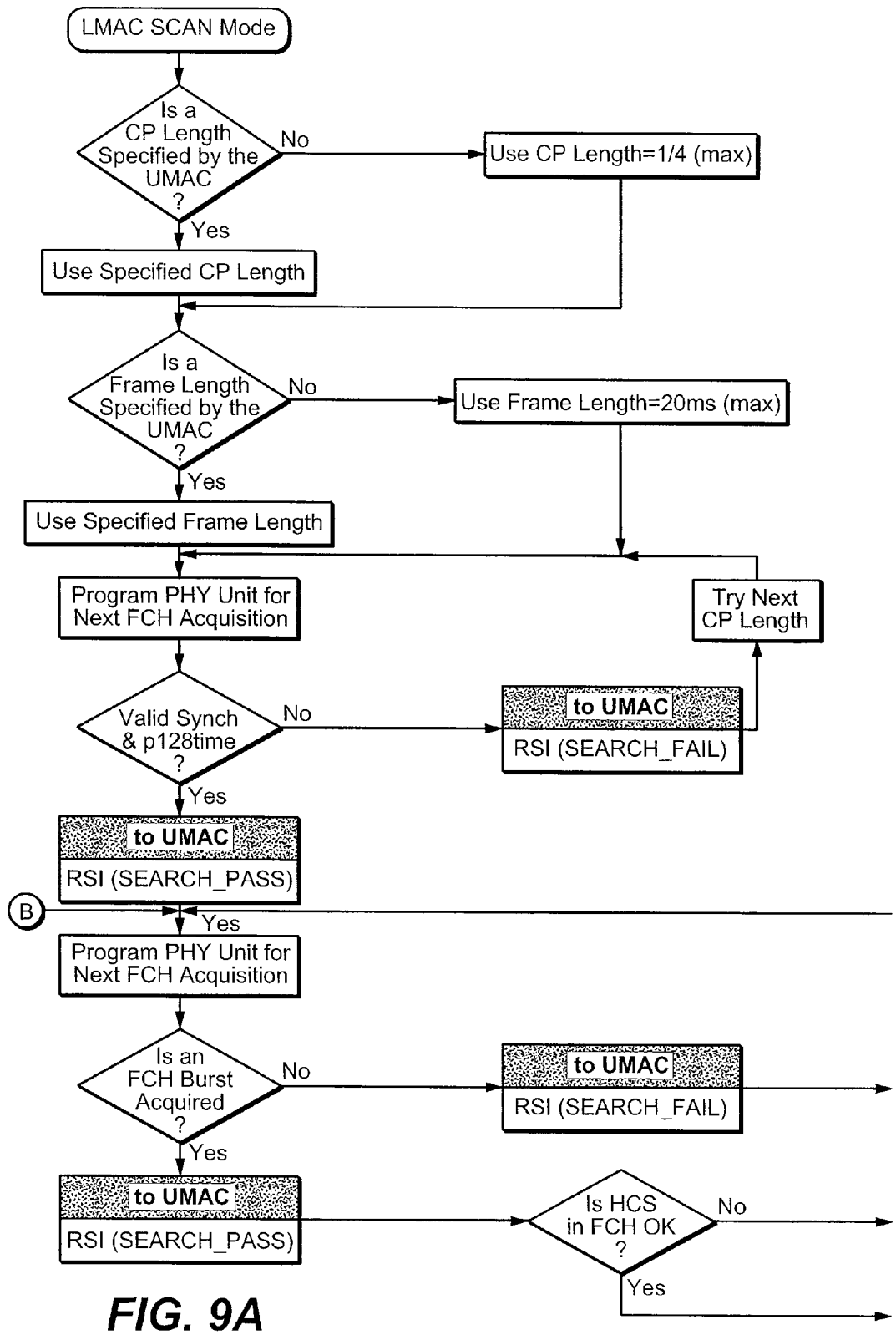
FIG. 9 is a flow chart of exemplary tasks for the Scan Mode performed in an exemplary order according to the present invention.

To complete the description of the Scan Mode, FIG. 9 shows a flowchart of exemplary tasks for the Scan Mode done in an exemplary order. The flowchart is self-explanatory to one of ordinary skill in the networking art, and a detailed discussion thereof is not needed to make and use the present inventions described herein. Note that this flowchart does not necessarily depict the easiest or the most efficient way to implement the SCAN mode. Other implementations may vary in one or more respects, such as by combining some of the processing loops. In the Scan Mode, LMAC 120 can also ascertain the base station identifier (BSID) from the frame control header burst, and pass this information to UMAC 110 to verify that MAC Unit 100 has connected to the correct base station. As another approach, UMAC 110 may pass the BSID of the base station to LMAC 120 so that LMAC 120 checks the BSID ascertained from the frame control header bursts to ensure that it synchronizes to the desired base station.

In the Run Mode, LMAC 120 transfers traffic between UMAC 110 and the physical layer control unit, as already discussed above. LMAC 120 is placed in this mode by a SET_MODE RUN message from UMAC 110, as discussed above. The RUN mode can be terminated by UMAC 110 by a mode change message (SET_MODE RESET or SET_MODE IDLE), either putting LMAC 120 into the Idle mode [for both BS and SS applications] or the Scan mode [for SS applications] again.

In view of the above disclosure, it is within the ability of one of ordinary skill in the networking art to construct sets of instructions that direct LMAC 120 to perform its above exemplary tasks in the above modes of operation, and to construct sets of instructions that direct UMAC 110 to perform its above exemplary tasks in the above modes of operations.

Methods of Synchronizing a Subscriber Station in Scan Mode. Every subscriber station (SS) needs to tune in and listen to the frames broadcast by the base station (BS) during the regular operation of the network. By going through the Scan Mode, which is a special mode designed to simplify the network entry process, the subscriber station subscriber station ensures that the base-station signal has been located and frame control headers have been successfully received and locked onto, prior to starting the processing of regular data traffic (e.g., Run Mode). Among the additional tasks performed during the Scan Mode are identifying the cyclic-prefix (CP) length and the frame length, if not already known. The cyclic-prefix length and frame length are two important capacities, which must be known before any regular operation can occur. The cyclic prefix is a special portion at the beginning of an OFDM symbol, and is added mainly to improve the immunity of the OFDM signal to multipath signals. The cyclic-prefix length defines the length of the cyclic prefix portion of an ordinary OFDM symbol in terms of number of clock cycles of the sampling clock (also called digitizing clock) that it spans, in other words, the cyclic-prefix length is the number of "samples" that the cyclic-prefix spans in the OFDM symbol. An OFDM symbol comprises the cyclic prefix and 256 samples of data. The IEEE Std 802.16-2004 defines four possible values for cyclic-prefix length. These are 8, 16, 32 and 64 samples. As a result, an OFDM symbol could have a total of 264, 272, 288 or 320 samples, depending on the cyclic-prefix length in use. The cyclic-prefix length is a constant number chosen per deployment and never changes in time.

The frame length is a measure of the time duration of one single frame broadcast by the base station. The IEEE 802.16-2004 Wireless Standard defines several standard frame lengths ranging from 2.5 ms to 20 ms. The base station broadcasts a frame control header (FCH) burst at regular intervals, marking the beginning of every frame. It is essential for the LMAC (or MAC in general) to know the cyclic-prefix length to be able to program the PHY unit in order to strip the cyclic prefix from the incoming OFDM symbols. It is also essential for the LMAC (or MAC in general) to know the frame length to be able to program the PHY unit so as to receive FCH bursts at the regular intervals and all other bursts contained in the rest of each frame.

If the UMAC 110 has the knowledge of cyclic-prefix length and the frame length used in that particular deployment, then it sets these values by sending "SET_CPLEN" and "SET_FRLEN" messages to LMAC 120. This will help shorten the time that LMAC 120 spends in the Scan Mode. The cyclic-prefix length can be surmised from the base station's signal by an exemplary method for the LMAC Scan Mode described below. In this case, UMAC 110 doesn't have to set the cyclic-prefix length as it will automatically be found by LMAC 120. If not known, the frame length can only be extracted from a DCD message broadcast by the base station. Processing the DCD message is one of UMAC 110 responsibilities, and it preferably sends the correct frame length, once it's known, by sending a "SET_FRLEN" message to LMAC 110 to ensure correct operation.

Referring to FIG. 9, we now describe an exemplary method for the LMAC Scan Mode. As a first step, assuming that the frame length and the cyclic-prefix length are not known, the method starts with the maximum frame length, which is 20 ms, and the longest cyclic-prefix length, which is 64 samples.

The IEEE Std 802.16-2004 mandates that the transmission of an FCH burst must be preceded by a long preamble. As the next step, the method programs the PHY unit to look for a long preamble. A long preamble occupies two OFDM symbols. The PHY unit is designed in such a way that it will detect a long preamble even with an incorrect setting of cyclic-prefix length. If the acquisition of a long preamble fails, the method repeats this step until a long preamble is successfully acquired. The successful acquisition of a long preamble is called "synchronization," or "synch" for short.

As the next step, if the acquisition of a long preamble is successful, the method reads a parameter from the PHY unit called the p128-time value. The p128-time value gives the location of a matched filter maximum hit of the preamble; that is to say, the p 128-time gives the number of samples measured from the start of the OFDM symbol (in which the preamble was found) to the sample location in the symbol where the start of the preamble was found. The matched filter is implemented as a part of PHY unit, and is 64 taps long. It is matched to the first 64 samples of the repeating 128 samples in the preamble. Therefore, there could be a hit on either one of the two 128-sample long sequences that make up the long preamble. The expected value of p128-time value is therefore either (CP_Length+64) or (CP_Length+64+128). In practice, there is no way to know which point (+64 or +64+128) has matched in the filter. The exemplary method, as can be implemented by LMAC 110, uses the closest point for comparison. In other words, if the assumed cyclic-prefix length is 8, then the method compares the p128-Time value with 72 (which is 8+64) or 200 (which is 8+64+128). If either comparison holds true, then the method (and LMAC 110) infers that the cyclic-prefix length was indeed 8. If neither comparison yields true, then the method uses the next cyclic-prefix length and iterates the above process on more time. When all the cyclic-prefix lengths (i.e. 8, 16, 32 and 64) were tried and no match has been found, the whole process is repeated starting from a cyclic-prefix length of 8 and working upwards through 16 and 32 until a preset time out period elapses. When testing for match conditions, the following tolerance windows may be used: −3 samples to +4 samples when the test CP length is 8, −3 to +8 samples when the test CP length is 16, −7 to +16 samples when the test CP length is 32, and −15 to +32 samples when the test CP length is 64.

The cyclic-prefix length has now been determined. As the next step, the method determines the frame duration. This is contained in the frame duration code in the DCD which is transmitted periodically by the base station. If the current downlink sub-frame does not contain the DCD then a new search is initiated for the next frame. The process continues until a DCD message is found. LMAC 120 does not process DCD message but it passes it on to the UMAC 120, which then processes it to extract the frame length. DCD processing has not been shown in the Scan Mode flowchart of FIG. 9, since the figure only shows the process as relevant to LMAC 120.

Figure 10B:
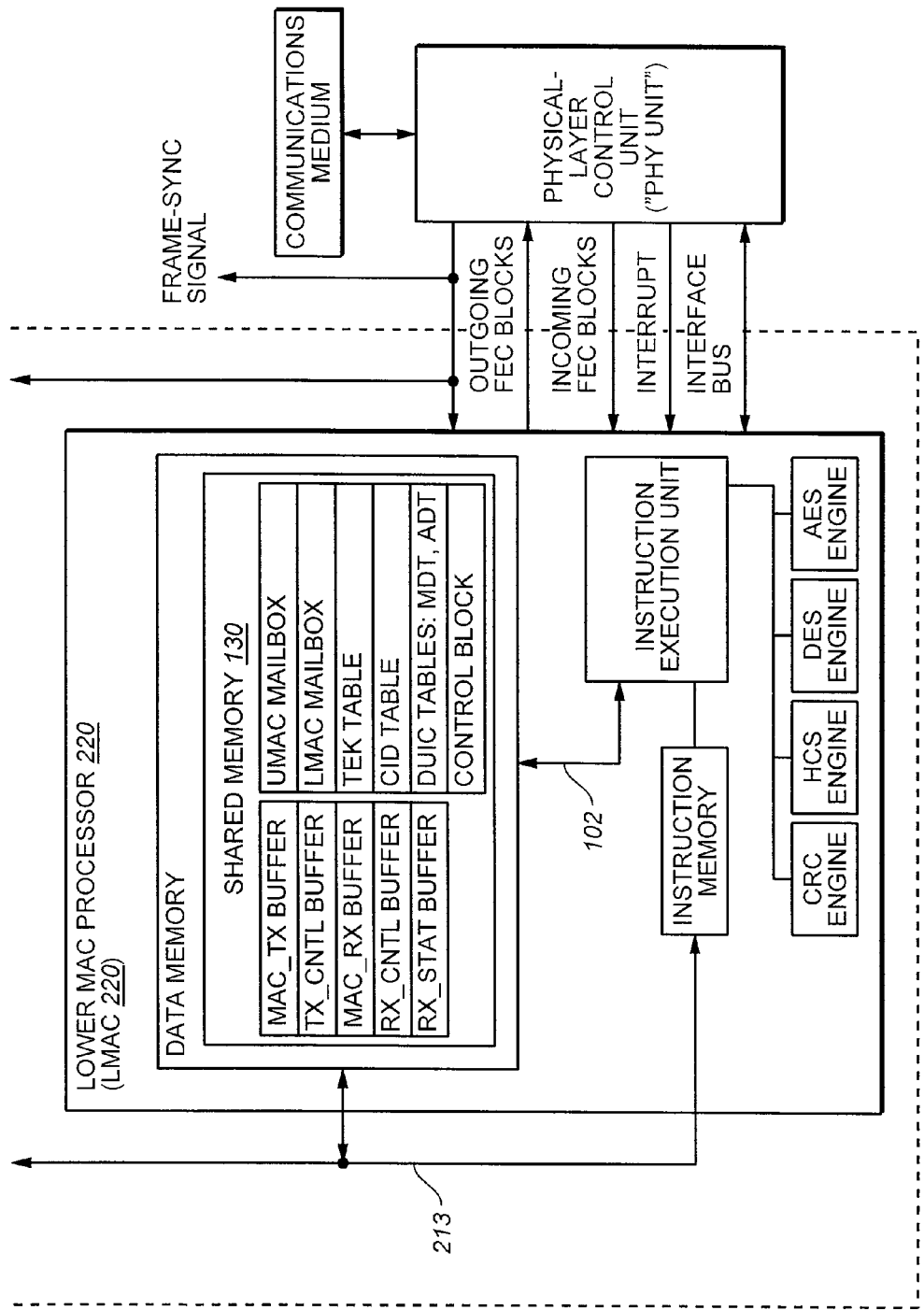
FIG. 10 shows a second exemplary embodiment of a media-access control unit according to an invention of the present application.

Connection to External UMAC. FIG. 10 shows and exemplary media-access control unit 200 which has a feature to selectively connect LMAC 120 to either UMAC 110 or an external UMAC processor, the latter of which is shown at the upper left corner of the figure. To facilitate this coupling, shared memory 130 is incorporated with the data memory of LMAC 120 as shown in the figure. This memory is a dual port memory, have a first bus access port coupled to the bus 102 that goes to the instruction execution unit of LMAC 120, and a second bus access port that is coupled to an internal bus 213, which in turn is as coupled to a bi-directional selector 210. Depending upon the state of a selection signal CMOD, bidirectional selector 210 couples internal bus 213 to either the internal bus 101 that goes to the UMAC 110, or to an external bus port 215 that can be coupled to an external UMAC processor. Bi-directional selector 210 may be as simple as a bidirectional bus multiplexer, or may comprise a multiplexing bus bridge that provides data translation between different bus protocols. Examples of bus bridges are provided below. Internal bus 213 also couples to the instruction memory of LMAC 120 (which can be a dual port memory), which enables the external UMAC to download new sets of instructions to operate LMAC 110. This provides great flexibility in adapting to future changes in the IEEE Wireless Standard. Signal CMOD may be provided as an input to MAC unit 200 by way of a pin connection to the chip on which MAC unit 200 is integrated, or it may be set by LMAC 120 after LMAC 120 samples a signal on a pin connection.

If it is not important to couple internal bus 213 to the instruction memory of LMAC 120, then, referring to FIG. 5, one may simply interpose selector 210 between UMAC 110 and shared memory 130 of MAC Unit 100. In this case, shared memory 130 does not need to be part of the data memory of LMAC 120.

As integrated on an IC chip with LMAC 120, UMAC 110 is more than sufficient to handle subscriber station applications and many base-station applications. However, for large base-station applications, it may be advantageous to use an external computer to implement UMAC 120 for faster execution and data handling speeds, and to provide faster access to the network layer. The architecture of media-access control unit 200 unit enables one provide a single chip that can be used in all of these applications.

In preferred embodiments of MAC unit 200, the bus that is coupled to external bus port 215 comprises an inventive data burst based bus, and selector 210 comprises a bus bridge that translates between the data burst based bus and a conventional memory bus. The inventive bus and bus bridge are next described. In the discussion that follows, the term "burst" relates to a sequence of data transmitted over a bus, not to a transmission bursts on the communications medium that serves a network.

Our inventive interface buses and bridges that may be used with the present inventions disclosed herein can be used to interface two or more electronic devices to one another, allowing efficient communication of information among the devices. In these communications, one of the devices initiates the data transfer operation, and is termed the "requesting device." The device that responds to the request to complete the data transfer operation is termed the "requested device." The interface buses and bridges according to the present application are particularly well suited for interfacing a main processor with one or more secondary processors (generally called "slave processors" in the industry), where the main processor requests the secondary processor to perform specialized tasks. To better facilitate the interaction between the main and secondary processors, the inventors have found that it is advantageous for the main processor to read and write data directly to the memory unit(s) of the secondary processor. The data that is written to the secondary processor can comprise both data and instructions (e.g., requests). The data that is read from the secondary processor can comprise data, and in some cases instructions as well.

It may be appreciated that bus and bridge embodiments of the present application may be constructed where the secondary processor reads and writes data to the memory unit(s) of the main processor, or where each of the main and second processors read and/or write data in the memory units of the other processor. It may also be appreciated that the secondary processor may be shared with two or more main processors over buses according to the present application, that a main processor may communicate with two or more secondary processors over buses according to the present application. It may also be appreciated that a plurality of main processors may each request that tasks be performed by a plurality of secondary processors over buses according to the present application.

The inventors have also found that many devices, particularly predesigned and customizable processors that can be integrated onto a semiconductor chip, transfer data in different sizes, such as words (32 bits), half words (16 bits), and bytes (8 bits). As one advantageous effect, the buses and bridges of the present application enable devices that handle data in different sizes to communicate with one another. As another advantageous effect, the buses and bridges of the present application enable devices to transmit or receive bursts of data to speed up transfer operations, which compensates for instances where a byte-oriented device is transferring data to a word-oriented device (i.e., it compensates for data size mismatches). For providing these advantageous effects, preferred exemplary interface buses comprise the following signal lines: address lines for conveying address signals, data lines for conveying data signals, at least one read/write line for conveying at least one read/write signal, one or more group-enable lines for conveying group-enable signals, one or more burst-length lines for conveying burst-length signals, a clock line for conveying a clock signal, a data-transfer enable line, and a read-ready line. The bus lines are coupled to each of the devices on the bus, as illustrated in FIG. 1. Each of the devices is permitted to read the values present on the lines and, when needed by a data transfer operation, permitted to set the values of one or more of the lines (such as by way of a tri-state connection or the like). The signal lines are described below in greater detail. Depending upon particular implementation requirements, some of the lines may not be needed, or may not need to be coupled to all of the devices.

Address lines. One or more memory units are distributed among the devices coupled to the bus, with each memory unit having one or more memory locations that can receive, store, and/or provide data. A device, such as a primary processor, need not have a memory unit addressable by the address lines of the bus (this case is illustrated by Device #1 in FIG. 1). Each memory location is assigned a unique address (i.e., number). A set of m address lines (A[m−1:0]) conveys a selection of one of the memory locations as a selected memory location for a data-transfer operation on the bus. The selection is based on an address value presented on the address lines by a device coupled to the bus, typically a device that is initiating or requesting a data transfer operation. A number m of address lines is capable of selecting up to $2^m$ memory locations, each of which typically holds a byte in constructed embodiments, but which may hold more or less (e.g., word or nibble). The address lines may be ordered from most-significant bits to least-significant bits, which is a standard convention. The memory locations may be congregated at one memory unit at one device (e.g., a secondary processor), or may be divided among two or more memory units at one device or multiple devices. In the latter case, which is illustrated by Devices #2 and #3 in FIG. 1 for generality, selective bit patterns in the most significant bit(s) may be used to select among the various memory units. For example, in the case of a single secondary processor having two memory units (Device #2), one for data and another for instructions, the most significant bit can be used to distinguish between the two by using "0" to identify the instruction memory unit and "1" to identify the data. As another example, where four memory units are distributed among a number of devices, bit patterns in the two most significant bits may be used to distinguish the four as follows: "00" for the first memory unit, "01" for the second memory unit, "10" for the third memory unit, and "11" for the fourth memory unit. Recognition of the bit pattern by a device or memory unit may be accomplished by decoding logic coupled to the most significant address line(s), the design of which is well-known in the art.

Data Lines. There are n data lines (D[n−1:0]) for conveying the data to be transferred in a data-transfer operation involving at least the memory location selected by way of the address lines. The data lines are apportioned into N groups of data lines, preferably with the same number p of data lines in each group, and with N being at least two. In typical applications, n is equal to 32, and N is equal to 4, with eight data lines in each group (i.e., byte wide). The group organization of the data lines, in combination with the group-enable lines described below, enables word-oriented devices, half-word-oriented devices, and byte-oriented devices to communicate with one another over the interface bus.

Group-Enable lines. In preferred embodiments, there is a group-enable line (GE[g−1:0]) for every group of data lines. Each group-enable line conveys a signal indicating whether its corresponding group of data lines is to be used in a data transfer operation. In preferred embodiments, the number g of group-enable lines is equal to the number N of groups of data lines. So for example, when there are 32 bit lines grouped as four groups, one byte per group, there are four group-enable lines. In these embodiments, the group-enable lines may be called "byte-enable lines" since the signal on each such line indicates whether its corresponding byte in the data lines is to be read or written to, depending on the setting of the read/write line(s). In exemplary embodiments, the signals on the group-enable lines have the active-low orientation, with a "0" value indicating that the corresponding group of data lines is to be used, and with a "1" value indicating that the corresponding group is not to be used. But in general, the group-enable lines may have either the active-high or the active-low orientation. Below, Table I lists the states (active-low orientation) of the group-enable lines that are commonly used in preferred embodiments for N=g=4, and p=8, along with the amount of data enabled for each burst of a transfer operation. The value on the address lines and the value on the group-enable lines determines which memory locations are read or written to, depending on the state of the read/write line(s). This is explained in greater detail below after the other bus lines are described.

TABLE I

| GE[0] | GE[1] | GE[2] | GE[3] | Amount of Data Enabled for Transfer |
|-------|-------|-------|-------|--------------------------------------|
| 0 | 0 | 0 | 0 | Whole word |
| 0 | 0 | 1 | 1 | Upper half word (most significant HW) |
| 1 | 1 | 0 | 0 | Lower half word (least significant HW) |
| 0 | 1 | 1 | 1 | Leftmost byte (most significant byte) |
| 1 | 0 | 1 | 1 | Middle left byte |
| 1 | 1 | 0 | 1 | Middle right byte |
| 1 | 1 | 1 | 0 | Rightmost byte (least significant byte) |

In preferred embodiments, each group of data lines and its corresponding group-enable line are associated with a unique bit pattern on the two least significant bits of the address lines. Specifically, referring to FIG. 2, the most significant byte of the data lines and group-enable line GE[0] are associated with memory addresses ending in "00"; the second most significant byte and group-enable line GE[1] are associated with memory addresses ending in "01"; the third most significant byte and group-enable line GE[2] are associated with memory addresses ending in "10"; and the least significant byte of the data lines and line GE[3] are associated with addresses ending in "11." Furthermore, in these preferred embodiments, when writing or reading a byte of data, the requesting device activates the group-enable line that is associated with the bit pattern that it has placed on the two least-significant address lines. The data for the transfer operation is placed on the group of bit lines associated with the address bit pattern and the activated group-enable line, by either the requesting device in the case of a write operation or the requested device in the case of a read operation. When writing or reading a half-word of data, the requesting device places the address of the most significant byte of the half-word on the address lines, and activates the group-enable lines for that byte and the other byte in the half-word. Specifically, when writing or reading a half-word starting at an address location whose address has the least significant bits "00," group-enable lines GE[0] and GE[1] are active; when writing or reading a half-word starting at an address location whose address has the least significant bits "10," group-enable lines GE[2] and GE[3] are active. The data is provided on the two groups of data lines corresponding to the two activated group-enable lines. In preferred embodiments, half-words are not written at memory locations whose starting addresses have the least significant bits of "01" and "11." However, such actions may be done in more general embodiments of the interface-buses according to the present application. Finally, when writing or reading a word of data, the requesting device places an address that has the least significant bits of "00" on the address lines, and activates all group-enable lines. In preferred embodiments, writing words starting at an address location whose address has the least significant bits "01," "10," or "11" is not done, but may be done in more general embodiments.

While we have associated group-enable line GE[0] with the most-significant byte of the data lines and GE[3] with the least-significant byte, it may be appreciated that the assignments may be reversed, with GE[0] associated with the least-significant byte and GE[3] associated with the most-significant byte. Also, while preferred embodiments use one group-enable line GE[x] for every group of data lines, it may be appreciated that an indication of which groups of data lines are to be used in the data transfer operation may be conveyed in encoded form on a fewer number of group-enable lines. For example, the seven common selections of groups shown in TABLE I may be encoded onto three group-enable lines as a unique binary number for each common selection. The encoded binary number on the group-enable lines may then be decoded by conventional decoding circuitry. In either case, the group-enable lines convey an indication of which groups of data lines are to be used in a data-transfer operation.

Read/Write line(s). The one or more read/write lines convey corresponding read/write signal(s) that may be configured according to any standard convention. Typically, only one line is used, usually named as R'/W, with a "0" state indicating that a read operation is to be done, and a "1" state indicating that a write operation is to be done. As another approach, two separate lines may be used, one to indicate a read operation and another to indicate a write operation, with each line having either the active-high or active-low orientation. In instances where two or more devices need to initiate read and/or write operations, each of the devices may have tri-state output ports that are connected to the one or more read/write lines (wired-OR configurations, while less preferred, may also be used).

Clock Line. The clock line conveys a bus-clock signal (BUSCLK) that alternates between two logic states in a periodic manner, with two adjacent logic states being a clock cycle. The bus-clock signal serves several purposes. First, the requesting device (the device initiating a data transfer) can use the states and/or edges of the clock signal to coordinate the generation and provision of the signals to the address lines, read/write line(s), data lines (in case of a write operation), group-enable lines, burst-length line(s), and data-transfer enable line. (A clock edge occurs when the clock signal transitions from one state to another.) Second, the requested device (the device being read or written to) can use the states and/or rising/falling edges of the clock signal to coordinate the tasks it needs to do to complete the data transfer operation at its end. Third, in a read operation, the states and/or edges of the clock may be used to indicate when the requested device is to provide stable and valid signals on the data lines, and to indicate when the requesting device can obtain this data from the data lines. Fourth, during burst-mode operations (described below), the cycles of the clock signal can be used to delineate the individual bursts of data in a burst sequence. Fifth, for those devices which require more than one clock cycle to obtain the data requested by a read operation, the clock can be used by such devices to build in wait states on the bus (in coordination with the read-ready signal described below).

Data-Transfer Enable Signal. The data-transfer enable (DTE) line conveys a signal indicating when a data-transfer operation is ready to begin. The DTE signal has a first state to indicate that the operation is ready, and a second state to indicate that the operation is not ready. The DTE signal may have the active-high or the active-low orientation. For the purpose of illustration, and without loss of generality, the DTE signal will be shown with the active-low orientation (first state is "0," second state is "1"). After the prior data-transfer operation is completed, the signals on the address lines, data lines, the group-enable lines, the read/write line(s), and the burst-length lines (described below) will have to switch to new states to prepare for the next data-transfer operation. Except for the data lines when the next transfer operation is a read operation, these signals are to be stable by the time the DTE signal enters its first state or shortly thereafter (usually before the next clock edge), and the DTE signal serves to notify the devices on the bus that the input signals needed for the next data-transfer operation are stable and valid. As an example of one implementation, the DTE signal may enter its active state shortly after the rising edge of the bus-clock signal, indicating that the bus lines needed for the next transfer operation will be valid and stable by the next falling edge of the bus-clock signal.

In those embodiments of the buses where two read/write lines are used, one to indicate a read operation and another to indicate a write operation, the DTE function may be incorporated into these read/write signals, and the DTE line and DTE signal may be omitted. Specifically, each of the read/write signals may enter its respective active state to indicate that the above-mentioned bus signals are stable and valid, or will be by the next clock edge, and the devices on the bus may look to the read/write signals to determine when the above-mentioned signals are to be stable and valid.

Read-Ready Line. The read-ready line (RDRY) conveys a read-ready signal from the requested device to indicate to the requesting device that the data is ready and will be available on the next clock edge or clock state that has been designated for reading data from the data lines.

Burst-length lines. Data can be read or written over the bus one burst of data at a time, which is called the standard mode, or in a sequence of several bursts, which is called the burst mode. Each burst can involve one or more groups of the data lines, or all of the groups. To enable the burst mode, exemplary interface buses of the present application have a number l of one or more burst-length lines (BL[l−1:0]) for conveying burst-length signals that indicate the desired length L of the burst sequence. The desired burst length L is indicated by setting the burst-length signals to corresponding logic states. For example, the logic states of three burst-length signals have eight unique state combinations, and can therefore indicate up to eight different values for the desired burst length. Three exemplary assignments of burst-lengths L to logic states are given below in TABLE II, with the understanding that more assignments are possible. The first exemplary assignment provides a linear increase in the burst length over the eight unique state combinations, while the second exemplary representation provides a logarithmic increase. The third exemplary representation only makes use of three of the eight state combinations, with an active-high state only occurring on one of the three burst-length lines at a time, with each line representing a corresponding burst length (e.g., 1, 4, or 8). An advantage of this assignment is that the device's circuitry for interpreting the burst-length lines can be simplified.

TABLE II

| States of the Burst-Length Signals | First Exemplary Assignment of Burst Lengths | Second Exemplary Assignment of Burst Lengths | Third Exemplary Assignment of Burst Lengths |
|---|---|---|---|
| 0 0 0 | 1, Standard | 1, Standard | Not Used |
| 0 0 1 | 2 | 2 | 1, Standard |
| 0 1 0 | 3 | 4 | 4 |
| 0 1 1 | 4 | 8 | Not Used |
| 1 0 0 | 5 | 16 | 8 |
| 1 0 1 | 6 | 32 | Not Used |
| 1 1 0 | 7 | 64 | Not Used |
| 1 1 1 | 8 | 128 | Not Used |

Mapping of Burst Data to Memory Locations. As indicated above, in typical embodiments, each memory location holds a byte of data. In general, the number of data bits held by a memory location, which we call $b_{ML}$, should be a common denominator of the data sizes used by the devices coupled to the bus. In other words, the data sizes used by the devices (e.g., word, half-word, byte) should each be an integer multiple of the data size of the memory location. For example, if the bus hosts devices that are word-, half-word-, and byte-oriented, then it is preferred that each address location hold a byte of data. As another example, if the bus hosts only devices that are word- and half-word-oriented, then each address location should hold a half-word of data or a byte of data. The number p of data lines in each group of data lines should be equal to $b_{ML}$ (as measured in bits) or an integer multiple thereof. In addition, there is preferably an association between the group-enable lines and the bit patterns in the least significant bits of the memory's addresses, an example of which was previously discussed above with reference to FIG. 2.

Figure 3:
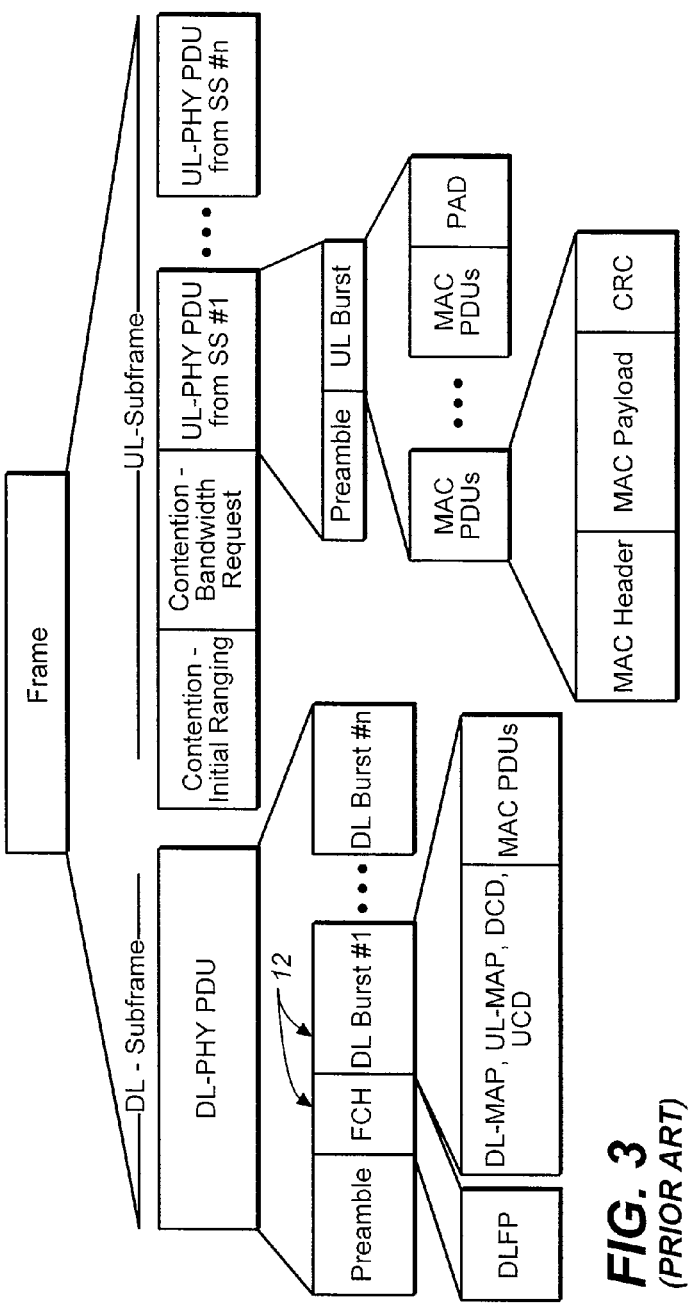
FIG. 3 is a detailed schematic diagram of a network communications frame according to the prior art.

In a read operation where L bursts of data are requested with G groups of data lines being enabled, a number of $T_{ML}$ memory locations from the memory unit (the one having the memory location selected by the address value on the address signals) are read in sequential order, including the selected memory location, where $T_{ML}=L*G*(p/b_{ML})$. The burst-read operation (and also the burst-write operation described below) typically starts the sequence at the selected memory address and ends at a memory location that is $(T_{ML}-1)$ memory locations above or below the selected memory location. The read data is output on the data lines in L bursts of G enabled groups of data lines, with the data being presented in accordance with the association between the group-enable lines and the values in the least significant bits of the memory's addresses from which the data came. When G=g (G=N), all of the group-enable lines are active, and there is a continuous mapping of read memory locations to the burst data. This is illustrated in FIG. 3 for the case of g=4, L=3, $T_{ML}=12$, p=8, and $b_{ML}=8$ (one word per burst). When G<g (G<N), there are gaps in the mapping of the read data to the burst data, and the requested device changes the values of the group-enable lines for each burst in order to maintain the association between the least-significant-bit address values of the read memory locations and group-enable lines. This is illustrated in FIG. 4 for the case of g=2, L=3, $T_{ML}=6$, p=8, and $b_{ML}=8$ (half-word per burst), and in FIG. 5 for the case of g=1, L=3, $T_{ML}=3$, p=8, and $b_{ML}=8$ (one byte per burst). In the examples shown in FIGS. 3-8, the starting address is the selected address presented on the address lines by the requesting device at the beginning of the read operation in FIGS. 3-5 and at the beginning of the write operation in FIGS. 6-8 (discussed next).

In a write operation where L bursts of data are written with G groups of data lines enabled, the data is extracted from the bursts according to the group-enable lines and written in sequential order to a number of $T_{ML}$ memory locations in the memory unit that holds the address selected by the address signals, including the selected memory address. The mapping of data during a write operation is similar to that during a read operation. When G=g (G=N), all of the group-enable lines are active, and there is a continuous mapping of the burst data to the memory locations. This is illustrated in FIG. 6 for the case of g=4, L=3, $T_{ML}=12$, p=8, and $b_{ML}=8$ (one word per burst). When G<g (G<N), there are gaps in the mapping of the write data to the memory locations, and the requesting device changes the values of the group-enable lines for each burst in order to maintain the association between the group-enable lines and the least-significant-bit address values of the memory locations to be written. This is illustrated in FIG. 7 for the case of g=2, L=3, $T_{ML}=6$, p=8, and $b_{ML}=8$ (half word per burst), and in FIG. 8 for the case of g=1, L=3, $T_{ML}=3$, p=8, and $b_{ML}=8$ (byte per burst).

Exemplary Timing Diagrams. FIG. 9 shows an exemplary timing diagram of a burst write operation of L bursts of data using an exemplary timing protocol for the bus signals. In the timing diagram, a plurality of cycles in the bus clock signal (BUSCLK) are shown at the top, with the cycles identified by numbers 1 through L+1. At the beginning of Cycle 1 (rising clock edge), the requesting device activates the DTE signal (active low) and sets the R'/W signal to indicate a write operation, and further generates valid values for the address lines, the group-enable lines, the burst-length lines, and the data lines by the time of the falling clock edge of the first cycle. On the falling clock edge, other devices on the bus latch in the bus signals and determine if the requested transaction pertains to them. The bus protocol allows one clock cycle (Cycle 2) for the requested device to make this determination and prepare for the write operation. On the rising edge of Cycle 3, the requesting device outputs the first burst of write data, and on the falling edge of Cycle 3, the data lines are valid and the requested device latches in the first burst of data. On the rising edge of Cycle 4, the requesting device outputs the second burst of write data and an updated set of group-enable signals, if needed, and on the falling edge of Cycle 4, the data lines are valid and the requested device latches in the second burst of data. The tasks done during Cycle 4 are repeated for the remaining bursts in the burst sequence, with the last burst being processed in Cycle L+1.

By the end of Cycle L+1, the requesting device removes its signals from the bus lines, with the DTE line being placed in its inactive state. A new data transfer request can then begin at the next clock cycle, either by the previous requesting device or a new requesting device. Various protocols may be established beforehand to assign slices of time to the devices on the bus to prevent two devices requesting a data transfer operation at the same time. As one simple example for the case of three devices, the DTE line may have a low-current pull-up load coupled to it to keep it in a high state (inactive state) when none of the devices is requesting a transfer operation, and each device may track the number of clock cycles that the DTE line has been held inactive since the completion of the last data transfer operation. Device #2 can be designated to initiate a data-transfer request after the occurrence of one inactive cycle, and at every third consecutive inactive cycle thereafter (e.g., 1, 4, 7, . . . ). Device #3 can be designated to initiate a data-transfer request after the occurrence of two consecutive inactive cycles, and at every third consecutive inactive cycle thereafter (e.g., 2, 5, 8, . . . ). Device #1, which can be designated as having primary control over the bus, can be designated to initiate a data-transfer request immediately after the completion of the previous data-transfer request, and after the occurrence of three consecutive inactive cycles and at every third consecutive inactive cycle thereafter (e.g., 3, 6, 9, . . . ). In addition, Device #1 is limited to a finite number of consecutive bus operations so as to give some time to Devices #2 and #3 to initiate requests, and is preferably designated to initiate a read operation to an arbitrary address on the bus after a large number of consecutive inactive cycles so as to ensure that the devices are synchronized in the counting of the inactive cycles. It may be appreciated that various dynamic slot allocation protocols may be developed for the interface bus where active polling of the devices is done. This may be facilitated by allocating a common address to all of the devices to receive configuration messages and status inquiries from a device that has primary control over the bus.

FIG. 10 shows an exemplary timing diagram of a burst read operation of L bursts of data using an exemplary timing protocol for the bus signals. As in the previous timing diagram, a plurality of cycles in the bus clock signal (BUSCLK) are shown at the top, with the cycles identified by numbers 1 through L+8. At the beginning of Cycle 1 (rising clock edge), the requesting device activates the DTE signal (active low) and sets the R'/W signal to indicate a read operation, and further generates valid values for the address lines, the group-enable lines and the burst-length lines by the time of the falling clock edge of the first cycle. On the falling clock edge, other devices on the bus latch in the bus signals and determine if the requested transaction pertains to them. The bus protocol allows one clock cycle (Cycle 2) for the requested device to make this determination and prepare for the read operation. A read operation typically takes several cycles to obtain the requested data and prepare it for transmission on the bus. In this example, we use the example of the device needing 7.5 clock cycles, starting from the falling edge in Cycle 1, to obtain and prepare the requested data for transmission. Therefore, the requested device places the read-ready signal line in an inactive state from the falling edge of Cycle 1 to the rising edge of Cycle 9. At the start of Cycle 9 (rising clock edge), the requested device sets the read-ready line in an active state (active low) and outputs the first burst of data on the data lines, along with an appropriate activation of group-enable lines for the burst. On the falling edge of Cycle 9, the data lines are valid and the requesting device reads the first data burst from the data lines, and reads the states of the group-enable lines. The requested device then maintains the read-ready line in an active state until the last burst is processed at Cycle L+8, and the other tasks done during Cycle 9 are repeated again for each of Cycles 10 through L+8 to transfer the remaining bursts in the burst sequence. By the end of Cycle L+8, the requesting device removes its signals from the bus lines, with the DTE line being placed in its inactive state.

Bus Bridges. An exemplary bus bridge for coupling an interface bus directly to the memory unit of a device is shown at 1000 in FIG. 11. Bus bridge has the ability of being selectively coupled to either a first interface bus "A" or a second interface bus "B," depending upon the logic state of a mode bit CMOD, which will be discussed in greater detail below. Bus bridge 1000 is also coupled to a memory unit MU, which in turn is coupled to circuitry that is specific to the device being served by bus bridge 1000. The interface buses "A" and "B," the memory unit MU, and the device-specific circuitry are not part of bus bridge 1000, per se. In constructed uses of the bus-bridges, the interface bus described above with reference to FIGS. 1-10 is provided as Bus "A," and the AHB system bus ARM corporation is provided as Bus "B."

Bus bridge 1000 comprises a first bus-interface manager 1010, a second bus-interface manager 1020, a transaction buffer 1030, a write buffer 1040, a read buffer 1050, a memory-interface manager 1060, and a plurality of multiplexers 1071-1075. As an initial overview of the operation of bus bridge 1000, the mode bit CMOD and the multiplexers 1071-1075 select one of the bus-interface managers to be actively used by the bridge. This effectively couples the bus bridge 1000 to one of buses "A" and "B," depending upon the state of signal CMOD. The selected bus-interface manager monitors its corresponding interface bus for the type of operation being requested. If a read operation is requested, the bus-interface manager generates a transaction request (usually the size of a word or less), and sends it to the buffer input of transaction buffer 1030. Memory-interface manager 1060 reads the transaction request from the buffer output of transaction buffer 1030, and generates a sequence of electrical signals to memory unit MU to extract the requested data. Memory-interface manager 1060 then sends the requested data to the buffer input of read buffer 1050. In turn, the selected bus-interface manager reads the requested data from the output buffer of read buffer 1050 and outputs it on its corresponding interface bus. For a write operation request, the bus-interface manager generates a transaction request and stores the write data from its corresponding bus to the buffer input of write buffer 1040. After the data has been written, the bus-interface manager sends the transaction request to the buffer input of transaction buffer 1030. Memory-interface manager 1060 reads the transaction request from the buffer output of transaction buffer 1030, reads the data from the buffer output of write buffer 1040 and generates a sequence of electrical signals to memory unit MU to store the data.

The buffers 1030, 1040, and 1050 are next described. Transaction buffer 1030 comprises a first-in-first-out (FIFO) buffer having a buffer input (coupled to lines TR_IN_DATA (32) in the figure) to receive data words to be stored in a FIFO order, an input-enable port (coupled to line TR_IN_EN) to receive a signal indicating that data is ready at buffer input (TR_IN_DATA(32)) to be latched in, an output-enable port (coupled to line TR_OUT_EN) to receive a signal requesting it to output the oldest data word stored in the FIFO buffer, and a buffer output (coupled to lines TR_OUT_DATA(32)) to provide the oldest-stored data word in response to a request to output it. The input side and the output side of the FIFO buffer work asynchronously. That is, a first circuit (e.g., a bus-interface manager) inputs data to the buffer input using the input-enable port (TR_IN_EN) at a first schedule/clock-rate, and a second circuit (e.g., the memory-interface manager) reads out the stored data using the output-enable port (TR_OUT_EN) at a second and different schedule/clock-rate. In constructed embodiments, the output side and memory-interface manager 1060 work at a clock rate of 160 MHz; and the input side and the bus-interface managers 1010 and 1020 work at a clock rate that ranges between 30 MHz and 80 MHz. The number of data words stored in the FIFO buffer therefore varies with time because of the differences in the scheduling and clock rates at the input and output sides. To assist the circuits that feed data to and extract data from the FIFO buffer, transaction buffer 1030 further comprises a full-buffer output (coupled to line TR_FL) to indicate to other circuitry that the buffer is full and currently cannot accept more data, and an empty-buffer output (coupled to line TR_EMP) to indicate that the buffer is empty and has no more data to be read out. The FIFO buffer may be implemented as an addressable memory with a number of memory locations equal to a power of two (e.g., 4, 8, 16, etc.), a first register for holding an input pointer, a second register for holding an output pointer, and some control logic. The FIFO buffer is initialized with the input and output pointers pointing to the same memory location. When data is input to the buffer, it is written to the current location pointed to by the input pointer, and the input pointer is subsequently incremented. When data is read out of the buffer, it is read from the location pointed to by the output pointer, and the output pointer is subsequently incremented. When a pointer reaches the end of the memory space, it resets back (e.g., rolls over) to the beginning of the address space. When the input and output pointers have the same value, a signal at the empty-buffer output (line TR_EMP) is generated to indicate an empty state, otherwise the signal at the output indicates that data is available to be read out from the buffer (non-empty state). If the input pointer rolls over and advances to the address just below the address pointed to by the output pointer, a signal at the full-buffer output (line TR_FL) is generated to indicate a full state; otherwise, a signal at the full-buffer output indicates that the buffer has space to accept more data words (not full state).

Read buffer 1050 has substantially the same construction as transaction buffer 1030, but typically can hold more data words. Specifically, read buffer 1050 comprises a first-in-first-out (FIFO) buffer having a buffer input (coupled to lines RD_IN_DATA(32) in the figure) to receive data words to be stored in a FIFO order, an input-enable port (coupled to line RD_IN_EN) to receive a signal indicating that data is ready at buffer input (via lines RD_IN_DATA(32)) to be latched in, an output-enable port (coupled to line RD_OUT_EN) to receive a signal requesting it to output the last data word stored in the FIFO buffer, and buffer output (coupled to lines RD_OUT_DATA(32)) to provide the last-stored data word in response to a request to output it. Read buffer 1050 further comprises a full-buffer output (coupled to line RD_FL) to provide a signal indicating to other circuitry that the buffer is full and currently cannot accept more data, and an empty-buffer output (coupled to line RD_EMP) to provide a signal indicating that the buffer is empty and has no more data to be read out.

The construction of write buffer 1040 may be the same as that of read buffer 1050, but in preferred embodiments it comprises two FIFO buffers configured in a "ping-pong" arrangement: the two buffers being identified as ping-pong buffer #1 and ping-pong-buffer #2 in the figure. As each write transaction occurs, the associated write data is written to the two buffers in alternating fashion, with data for odd-numbered write transactions being placed in ping-pong buffer #1, and data for even-numbered write transactions being placed in ping-pong buffer #2, or vice-versa. When bus-interface manager 1010 writes a data word to write buffer 1040, it provides an additional signal indicating which ping-pong buffer is to be used. This signal is provided along with a convention signal to enable the input of data to the buffer. Likewise, when data is requested from the output, an additional signal is provided to the output side to indicate which ping-pong buffer to use. With that general background, write buffer 1040 has a buffer input (coupled to lines WR_IN_DATA(32)) to receive data words to be stored in FIFO order in one of the ping-pong buffers, a first input-enable port (coupled to line WR_IN_EN[0]) to receive a signal indicating that data is ready at buffer input (lines WR_IN_DATA(32)) to be latched in, a second input-enable port (coupled to line WR_IN_EN[1]) to receive a signal indicating which ping-pong buffer the data is to be written to, a first output-enable port (coupled to line WR_OUT_EN[0]) to receive a signal requesting it to output the last data word stored in a selected one of the ping-pong buffers, a second output-enable port (coupled to line WR_OUT_EN[1]) to receive a signal identifying the selected ping-pong buffer, and a buffer output (coupled to lines WR_OUT_DATA(32)) to provide the last-stored data word from the selected ping-pong buffer. Bus-interface managers 1010 and 1020 are responsible for alternating the selection of the ping-pong buffers by alternating the signal state presented on line WR_IN_EN[1], and by including a data bit in the transaction word indicating which ping-pong buffer has been used to store the write data. Write buffer 1040 further comprises two empty-buffer signals (coupled to lines WR_EMP[1:0], respectively) to indicate that the buffer is empty and has no more data to be read out. In practice, each ping-pong buffer has a buffer size equal to or greater than the maximum burst length (e.g., eight words of buffer space in the case where the maximum burst length is eight). As will be clear from the description below, if there are several write requests in succession, a filled ping-pong buffer will be emptied by the time the other ping-pong buffer is filled, and there will not be a risk of the ping-pong buffers being overfilled. Accordingly, in practice, there is not a need for the write buffer 1040 to have full-buffer outputs to indicate to other circuitry whether the ping-pong buffers are full and currently cannot accept more data. However, to provide a general description of all possible embodiments of the interface buses of the present application, such full-buffer outputs are shown in the figure (coupled to lines WR_FL[1:0], respectively). While complex, this buffer topology enables two successive write operations to occur with few or no wait states between the operations.

Multiplexers 1071-1075 and Mode Signal CMOD. The signals at the input side of buffers 1030, 1040, and 1050 are either coupled to respective outputs of first bus-interface manager 1010 or respective outputs of second bus-interface manager 1020, depending upon the value of mode signal CMOD. The selected coupling is provided by multiplexers 1071-1075, each of which is responsive to the state of mode signal CMOD and may be of conventional construction. Each of the multiplexers has two inputs, each being coupled to an output of a respective bus-interface manager, and an output coupled to a respective input of one of the buffers, as shown in the figure. When mode signal CMOD has a logic value of "0," the top inputs of the multiplexers are coupled through to the outputs of the multiplexers, thereby coupling first bus-interface manager 1010 to buffers 1030, 1040, and 1050. When mode signal CMOD has a logic value of "1," the bottom inputs of the multiplexers are coupled through to the outputs of the multiplexers, thereby coupling second bus-interface manager 1020 to buffers 1030, 1040, and 1050. Mode signal CMOD may be generated by conventional digital circuitry, or may be provided on an input pin to the semiconductor chip on which bus bridge 1000 is formed.

First Bus-Interface Manager 1010. For the purposes of illustration, and without loss of generality, first bus-interface manager 1010 is constructed to interface to the interface bus described above with reference to FIGS. 1-10. Bus-interface manager 1010, which can be implemented as a hardware state machine, mini-microprocessors, and the like, monitors the signals on the bus lines for requests for data transfer operations. Bus-interface manager 1010 preferably stores the values of the lines of Bus "A" in respective latches in response to the DTE signal entering its active state, with the storing preferably occurring on the clock edge of signal BUSCLK that followed the DTE signal entering its active state. Manager 1010 can reset the latches when the DTE signal enters its inactive state. Once the data has been latched, and if there is more than one memory unit addressable on bus "A," bus-interface manager 1010 determines if the address value provided on the address lines is for a memory location within memory unit MU. A particular bit pattern in the most significant address lines may be assigned beforehand to indicate memory unit MU, such as addresses starting with the most-significant bits of "01," and bus-interface manager 1010 can include a register to hold this value and a comparison circuit to compare the most significant bits of the latched address value with the bit values stored in the register to detect a match. The register may be volatile or nonvolatile. Instead of using a register, the comparison circuit may be hardwired to have the bit pattern for the most significant bits. The above tasks can be performed during the last part of Cycle 1 of clock signal BUSCLK shown in each of FIGS. 9 and 10.

If the address value on the bus does not belong to memory unit MU, bus-interface manager 1010 enters a waiting state until the DTE signal enters its inactive state. Otherwise, bus-interface manager 1010 begins to generate a transaction word that will be sent to the transaction buffer 1030. An exemplary format of the transaction word is shown below in TABLE III. The transaction word can be generated by logic circuitry having inputs coupled to the latched values of the bus signals and outputs directly coupled to the buffer input of transaction buffer 1030 (lines TR_IN_DATA(32)) through multiplexer 1074. The first 16 bits of the exemplary transaction word, TW[31:16], comprise an address value for memory unit MU, which may be taken directly from the latched states of the interface bus signals. The next four bits TW[15:12] indicate the burst length of the burst sequence, and can have up to 16 different designations of the burst length. However, as an example, only three burst lengths are used in the illustrated embodiment: a single burst, four bursts, and eight bursts, each being identified by a unique bit pattern in TW[15:12]. These three burst lengths are the same three burst lengths used in the last column of the above TABLE II. Using BL[2], BL[1], and BL[0] to designate the three burst-length lines of interface bus "A," transaction-word bits TW[15:12] can be generated as follows: TW[15]=BL[2], TW[14]=BL[1], TW[13]=0, TW[12]=BL[0]. This is a direct mapping of individual burst-length lines of the interface bus, and does not require any logic circuitry to implement. However, in general, a logic circuit can be used to effect any type of mapping that may be needed for other implementations. Transaction-word bits TW[11], TW[7], and TW[4:0] are reserved for possible future uses. Transaction-word bits TW[10:8] indicate the data size of the transaction, which may be byte, half-word, or word. These bits are generated from the states of the group enable lines GE[g−1:0] by conventional logic circuitry, as can be determined by the information presented in TABLE I above. Transaction-word bit TW[5] indicates whether a read operation or write operation is to be done on the selected memory addresses of memory unit MU. This value may be directly taken from the latched value of the read-write R'/W signal of the interface bus. Finally, if a write operation is to be done, transaction-word bit TW[6] indicates which ping-pong buffer to use, with a "0" value indicating ping-pong buffer #1 and a "1" value indicating ping-pong buffer #2. The value for bit TW[6] is read from a single-bit toggle 1005, which is toggled between its binary states each time it is read. Toggle 1005 has output port O to indicate its current state, and a toggle input T to receive a clock signal that instructs it to toggle its state. Bus-interface manager 1010 has an input coupled to output O, and uses the logic value of output O for transaction word bit TW[6]. Bus-interface manager 1010 also has an output coupled to the toggle input T, and sends an active signal to this input upon writing a transaction word to buffer 1030 that designates a write operation to memory unit MU. Accordingly, the transaction word TW[31:0] can be generated by simple logic circuitry within the last half of clock Cycle 1, and coupled to the buffer input of transaction buffer 1030 via multiplexer 1074 and lines TR_IN_DATA(32).

TABLE III

| Bits of the Transaction Word | Contents | |
| --- | --- | --- |
| TW[31:16] | Address value for Memory Unit MU | |
| TW[15:12] | Burst Length | 0001 = Single Burst |
|  |  | 0100 = Four Bursts |
|  |  | 1000 = Eight Bursts |
| TW[11] | Reserved | |
| TW[10:8] | Data Size | 000 = Byte Transaction |
|  |  | 001 = Half-word Transaction |
|  |  | 010 = Word Transaction |
| TW[7] | Reserved | |
| TW[6] | R'/W | 0 = Read Transaction |
|  |  | 1 = Write Transaction |
| TW[5] | Ping-Pong Select | 0 = Ping-Pong FIFO #1 |
|  |  | 1 = Ping-Pong FIFO #2 |
| TW[4:0] | Reserved | |

In the case of a read operation (as determined by the value of TW[5]), bus-interface manager 1010 inputs the generated transaction word TW[31:0] into transaction buffer 1030 by generating an active signal on the buffer's input-enable port via line TR_IN_EN at the rising edge or the falling edge of Cycle 2 of clock signal BUSCLK (shown in FIG. 10). Bus-interface manager 1010 then waits for memory-interface manager 1060 to obtain the requested data and input it into the buffer input and input-enable port of read buffer 1050 via lines RD_IN_DATA(32) and RD_IN_EN, respectively. For this, bus-interface manager 1010 enters a waiting state (base state) where it monitors the empty-buffer signal of read buffer 1050 (via line RD_OUT_EMP), which will indicate an empty state until memory-interface manager 1060 inputs the first data word into read buffer 1050. Preferably, bus-interface manager 1010 monitors the signal on the empty-buffer line RD_EMP at the rising or falling edges of clock signal BUSCLK. During the waiting time, bus-interface manager 1010 maintains an inactive state on the read-ready line of interface bus "A."

Upon detecting a non-empty state, bus-interface manager 1010 reads the buffer output of read buffer 1050 by sending an active signal to the buffer's output-enable port via line RD_OUT_EN at the next rising edge of clock signal BUS-CLK, which occurs at the start of Cycle 9 shown in FIG. 10. Also on the rising edge of clock Cycle 9, manager 1010 places the read-ready line of interface Bus "A" in an active state. The data read from read buffer 1050 is also routed to the data lines of interface bus "A" by bus-interface manager 1010, where it can be read by other devices on interface bus "A" at the falling edge of Cycle 9 or the rising edge of Cycle 10. Then, as long as the empty-buffer output of read buffer 1050 remains in an inactive state (indicating the presence of data words in the buffer), bus-interface manager 1010 repeats the following steps: sending an active signal to the output-enable port of read buffer 1050 via the RD_OUT_EN line at the next rising edge of the BUSCLK clock, thereafter reading out the data from lines RD_OUT_DATA(32) and routing it to the data lines of interface bus "A". When the last burst has been processed in this manner, bus-interface manager 1010 places the read-ready line in its inactive state and returns to its waiting state (base state).

When bus-interface manager 1010 outputs the data onto interface bus "A," it is preferred that it provide signals on the group-enable lines GE[g−1:0] during cycles 9 through L+8 (FIG. 10) indicating which bytes of the data lines BL[1−1:0] have valid data. The state of these lines can be determined from the values of the two least-significant bits of the address lines, as stored in bits TW[17:16] of the transaction word, and the data size as stored in bits TW[10:8] of the transaction word that were initially generated by bus-interface manager in Cycle 1 (FIG. 10). We take the example of g=4, and where the bits TW[10:8] indicate a data size from the following group: word, half-word, and byte. If bits TW[10:8] indicate a word as the data size, then bus-interface manager 1010 activates all group-enable lines GE[3:0] during Cycles 9 through L+8. If bits TW[10:8] indicate a half-word as the data size, then bus-interface manager 1010 alternately activates group-enable lines GE[1:0] on one cycle and group-enable lines GE[3:2] on the next cycle, starting with the activation of group-enable lines GE[1:0] at Cycle 9 if the bits TW[17:16]= "00", or starting with the activation of group-enable lines GE[3:2] at Cycle 9 if the bits TW[17:16]="10." If TW[10:8] indicate a byte as the data size, then bus-interface manage 1010 sequentially activates each group-enable line GE[x] from low value of x (e.g., 0) to high values of x (e.g., 3), starting with an initial value $x_I$ that is determined from the values of bits TW[17:16] as follows: $x_I$=0 for TW[17:16]= "00", $x_I$=1 for TW[17:16]="01", $x_I$=2 for TW[17:16]="10", and $x_I$=3 for TW[17:16]="11". Bus bridge 1000 can be implemented without bus-interface 1010 providing this function, in which case, the function is done by the requesting device, and may be done according to the above-described sequence of actions.

As a simple way of performing the above process, memory-interface manager 1060 can execute the following sequence of actions using a temporary register DI_TEMP[15:0]:

1. Load the contents of the transaction word bits TW[31:16], or the bit values of the address lines A[m−1:0] into temporary register DI_TEMP[15:0] before Cycle 9.
2. Execute actions #3 and #4 at each cycle from Cycle 9 through Cycle L+8 for the number of bursts L specified by transaction word bits TW[15:12].
3. Generate values for GE[3:0] as a function of TW[10:8] (data size) and the two least significant bits in temporary register DI_TEMP[1:0] according to the mapping shown in TABLE IV below before the falling edge of the cycle. This can be done by conventional logic circuitry.

4. After the falling edge of the cycle, increment the value of temporary register DI_TEMP[15:0] by one if TW[10:8] specifies "byte" as the data size, by two if TW[10:8] specifies "half-word" as the data size, or by four if TW[10:8] specifies "word" as the data size.

These actions can be integrated with the actions that bus-interface manager 1010 does to obtain the data bursts from read buffer 1050 and to provide them to the data lines D[n−1:0] of interface bus "A".

TABLE IV

| TW[10:8] | TW[17:16] | GE[0] | GE[1] | GE[2] | GE[3] |
|---|---|---|---|---|---|
| 0 0 0 | 0 0 | 0 | 1 | 1 | 1 |
| 0 0 0 | 0 1 | 1 | 0 | 1 | 1 |
| 0 0 0 | 1 0 | 1 | 1 | 0 | 1 |
| 0 0 0 | 1 1 | 1 | 1 | 1 | 0 |
| 0 0 1 | 0 0 | 0 | 0 | 1 | 1 |
| 0 0 1 | 0 1 | -- Not permitted -- | | | |
| 0 0 1 | 1 0 | 1 | 1 | 0 | 0 |
| 0 0 1 | 1 1 | -- Not permitted -- | | | |
| 0 1 0 | All values | 0 | 0 | 0 | 0 |

In the case of a write operation, bus-interface manager 1010 does not need to immediately input the transaction word into transaction buffer 1030, but can hold off until it can store some or all the write data from bus "A" into write buffer 1040. In constructed embodiments where memory-interface manager 1060 works at a faster clock rate than bus-interface manager 1010, the transaction word is input into transaction buffer 1030 after all of the data from bus "A" has been stored. To store the first data burst D0 for interface bus "A," bus-interface manager 1010 routes the latched state of the data lines on lines WR_IN_DATA(32) to the buffer input of write buffer 1040, couples the value of transaction-word bit TW[6] (ping-pong select) to write-enable line WR_IN_EN[1], and then generates an active signal on the input-enable port of buffer 1040 (line WR_IN_EN[0]) at one of the clock edges in Cycle 2, or at the rising edge of clock Cycle 3 (FIG. 9). Then, bus-interface manager 1010 latches in a new set of values of the data lines of bus "A" at the falling edge of clock Cycle 3 (to capture data word D2), couples the captured values to the buffer input of write buffer 1040, maintains the value of transaction word bit TW[6] on write-enable port via line WR_IN_EN[1], and subsequently generates an active signal on write-enable port via line WR_IN_EN[0] at the rising edge of clock Cycle 4. These four actions are repeated for the rest of the burst data to be received, which has been indicated with the values on the burst length lines BL[2:0] and the transaction-word bits TW[15:12]. Bus-interface manager 1010 may use a countdown register to process the burst data and the cycles, with the countdown register loaded with a value related to the burst length at the start of processing and decremented as each burst is stored. In constructed embodiments, bus-interface manager 1010 then clocks the write transaction word TW[31:0] into transaction buffer 1030 by generating an active signal on line TR_IN_EN at the next rising edge of Cycle L+2 of clock signal BUSCLK (FIG. 9), and the task of completing the transaction is handed off to memory-interface manager 1060. However, in general embodiments, the inputting of the transaction word may be done anytime between clock Cycles 2 and L+1. Bus-interface manager 1010 returns to its base state at Cycle L+2. The use of the ping-pong FIFO generally eliminates the possibility of over-writing data to write buffer 1040, and there is not a need for bus-interface manager 1010 to monitor the buffer-empty outputs of write buffer 1040 (via lines WR_FL[1:0]). However, some embodiments of bus-interface manager may do this monitoring, and may queue incoming data from Bus "A" if a full condition is detected on a ping-pong buffer.

Bus-interface manager 1010 can process additional write operations or a read operation without waiting for memory-interface manager 1060 to complete the previous write operation. However, in preferred embodiments, bus-interface manager 1010 monitors the full-buffer output of transaction buffer 1030 (via line TR_FL) to make sure there is room in the buffer before writing the next transaction word.

Bus-interface manager 1020 works in substantially the same way as bus-interface manager 1010, but operates with interface bus "B", which may be the same as, or different from, interface bus "A" in structure. From the above description of bus-interface manager 1010, one of ordinary skill in the art can construct bus-interface manager 1020 to work with the bus signals protocols of any interface bus "B."

Memory-Interface Manager 1060. Memory interface manager 1060 communicates with memory unit MU using a conventional memory bus, but with the separation of the data lines into write-data lines M_WR_D[31:0] and read-data lines M_RD_D[31:0], and with the addition of four byte-enable lines M_BE[3:0]. For the purposes of illustration, and without loss of generality, memory unit MU stores a word of 32 bits at each of its memory locations, and each address value provided on its address lines M_ADDR[13:0] selects one memory location. In contrast, the address provided in the transaction word bits TW[31:16] address individual bytes of data rather than words of data. Therefore, only the 14 most significant bytes of TW[31:16] are needed to address a word in memory unit MU, and thus there are 14 memory address lines M_ADDR[13:0] rather than 16. The byte-enable lines M_BE[3:0] convey signals to indicate which bytes of the selected memory location of memory unit MU are written to during a write operation. The M_BE[3:0] signals are ordered such that M_BE[3] is assigned to the least-significant byte of the selected memory location, M_BE[2] is assigned to the next more significant byte compared to M_BE[3], M_BE[1] is assigned to the next more significant byte compared to M_BE[2], and M_BE[0] is assigned to the most-significant byte of the selected memory location. As described below in greater detail, memory-interface unit 1060 has a task of mapping the data bytes between the burst sequences and the byte locations in memory unit MU, as was previously illustrated in the examples of FIGS. 3-8. Finally, the other signals of the conventional memory bus include memory request line M_REQ, which has an active state to indicate a memory read or write operation, and a read-write line M_R/W to indicate either a read operation (M_R/W=0) or a write operation (M_R/W=1) to memory unit MU. Memory interface manager 1060 has an input coupled to receive the memory's read-word lines M_RD_D[31:0], and a plurality of respective outputs coupled to the above input lines of memory unit MU. For brevity, we will refer to the signals on these bus lines with names taken from the names given to the lines (e.g., the M_REQ signal is the signal conveyed on the M_REQ line, etc.).

As a side note, the device served by bus bridge 1000 has additional circuitry that is specific to the device's functions. This circuitry is identified in FIG. 11 as "DEVICE SPECIFIC CIRCUITRY," and is shown with general connections to memory unit MU. In many uses of bus bridge 1000, the DEVICE SPECIFIC CIRCUITRY will comprise a microprocessor or RISC processor that is connected to the memory bus for memory unit MU in the same manner that memory-interface manager 1060 is connected to the memory bus. In this case, the microprocessor or RISC processor may need more memory than that needed by bus-bridge 1000 or memory-interface manager 1060. For this, more address lines may be added to the address lines M_ADDR to increase the address space for the memory bus. To prevent memory-interface manager 1060 from accessing the added address space, manager 1060 may output a preset bit pattern on the added address lines that uniquely select memory unit MU instead of other memory units on the memory bus. Also, additional address decoding circuitry can be added to memory unit MU to detect the presence of the preset bit pattern on the added address lines so that memory unit MU knows when it is being addressed by memory interface manager 1060.

Figure 11:
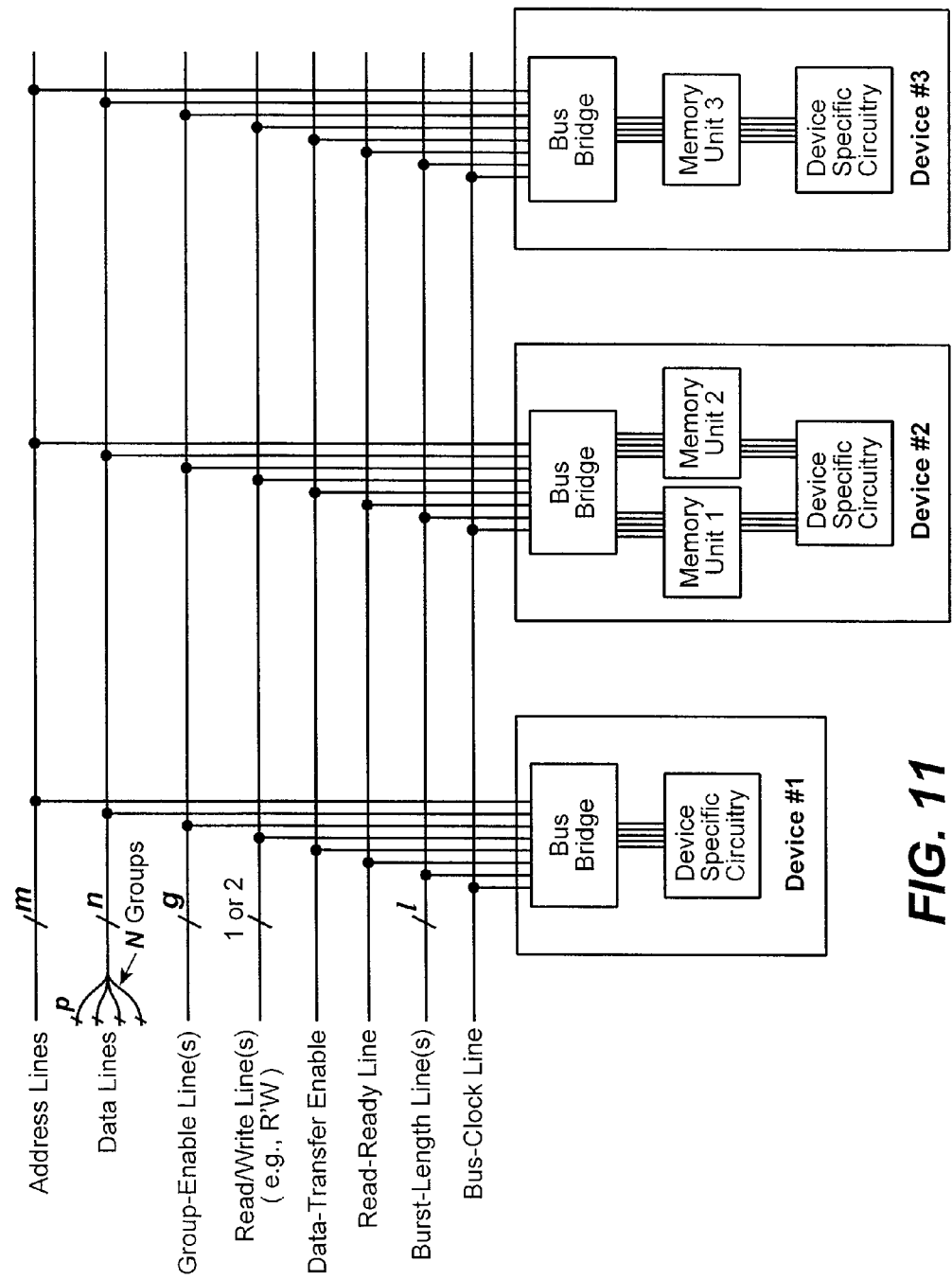
FIG. 11 shows a plurality of devices coupled together for communications by an exemplary interface bus according to exemplary interface-buses of the present application.
Figure 12:
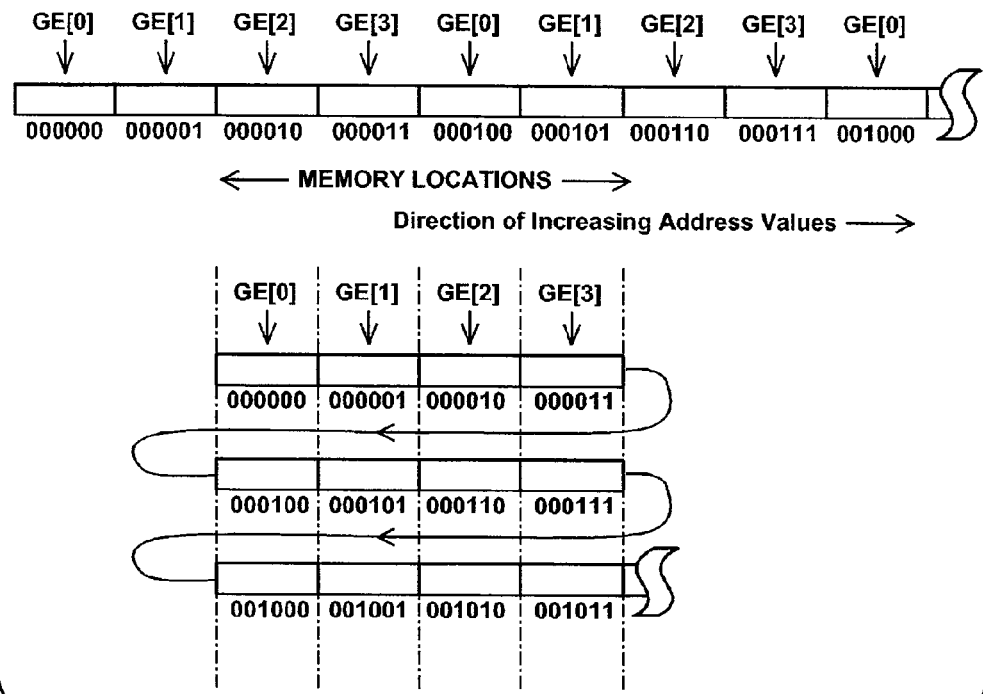
FIG. 12 shows an exemplary association between memory locations and group-enable lines according to exemplary interface-buses of the present application.
Figure 13:
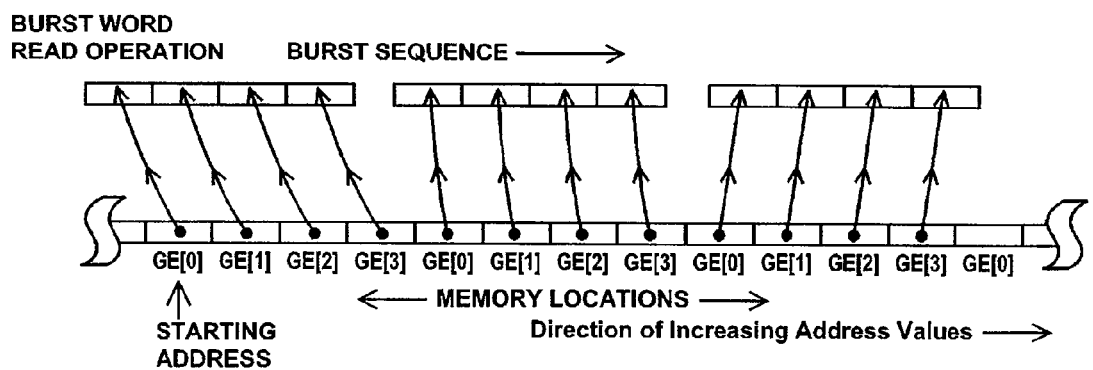
FIGS. 13-18 illustrate various exemplary mappings of burst data and memory locations of a memory unit being processed according to signals conveyed on the burst-length lines and group-enable lines according to exemplary interface-buses of the present application.
Figure 14:
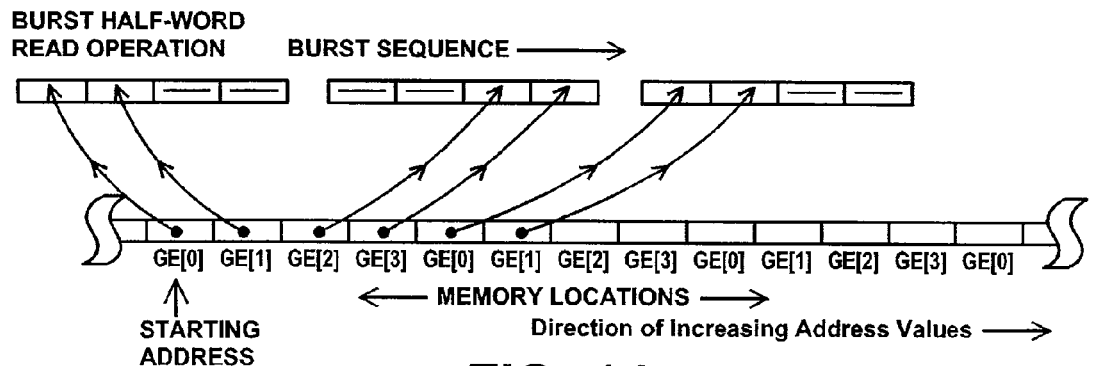
Figure 15:
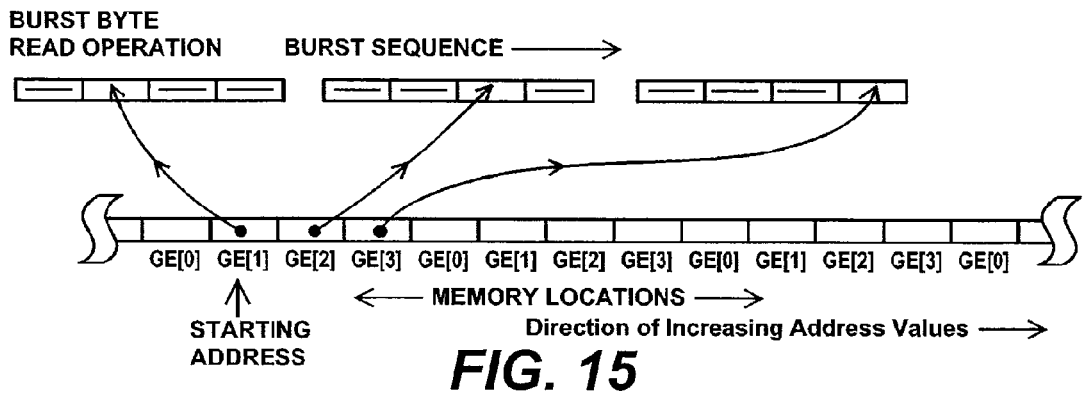
Figure 16:
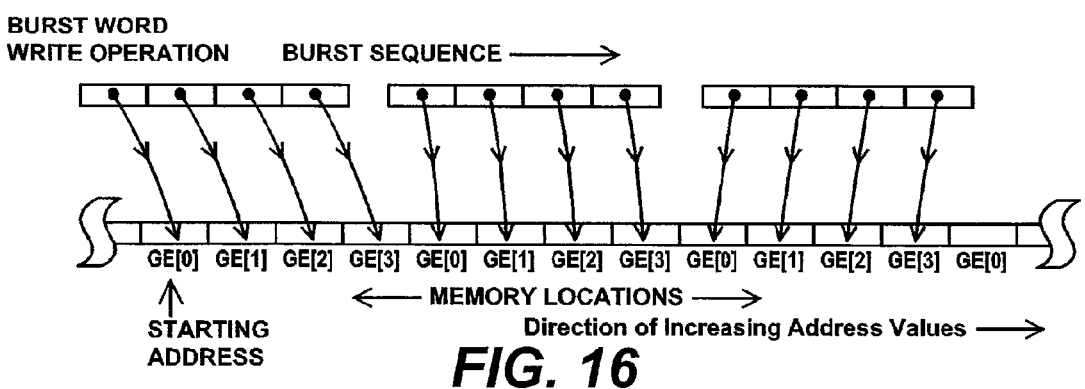
Figure 17:
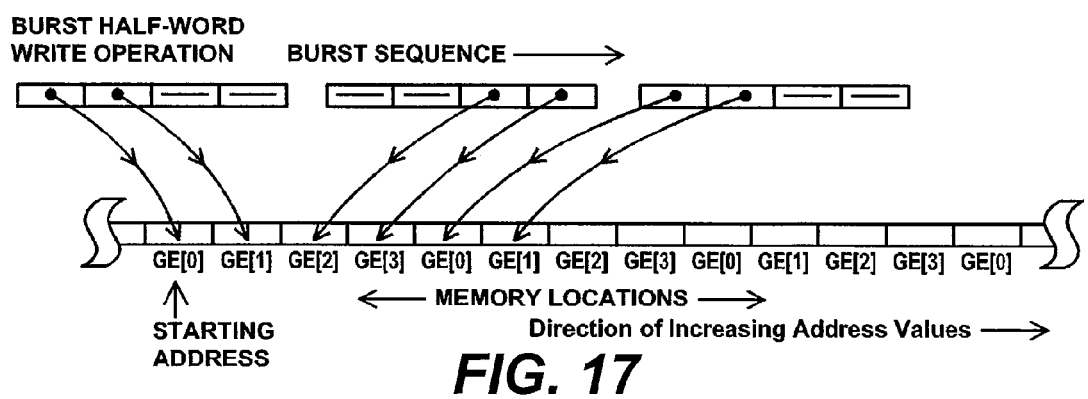
Figure 18:
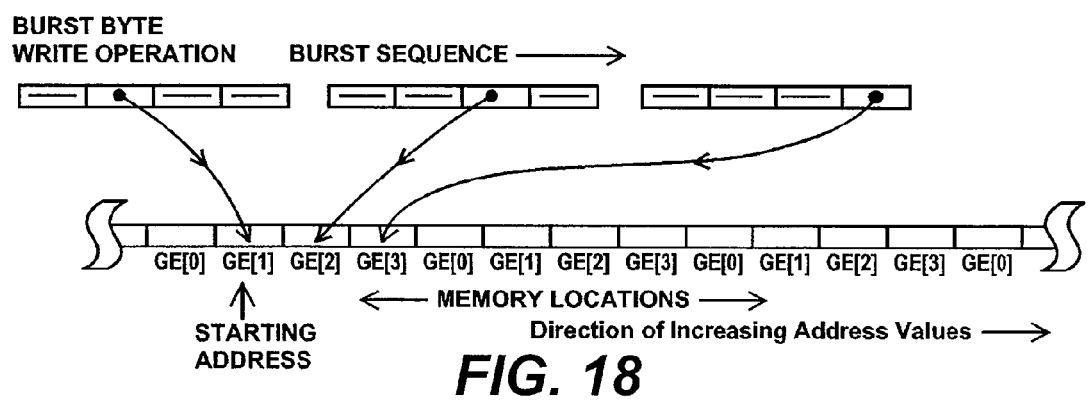
Figure 19:
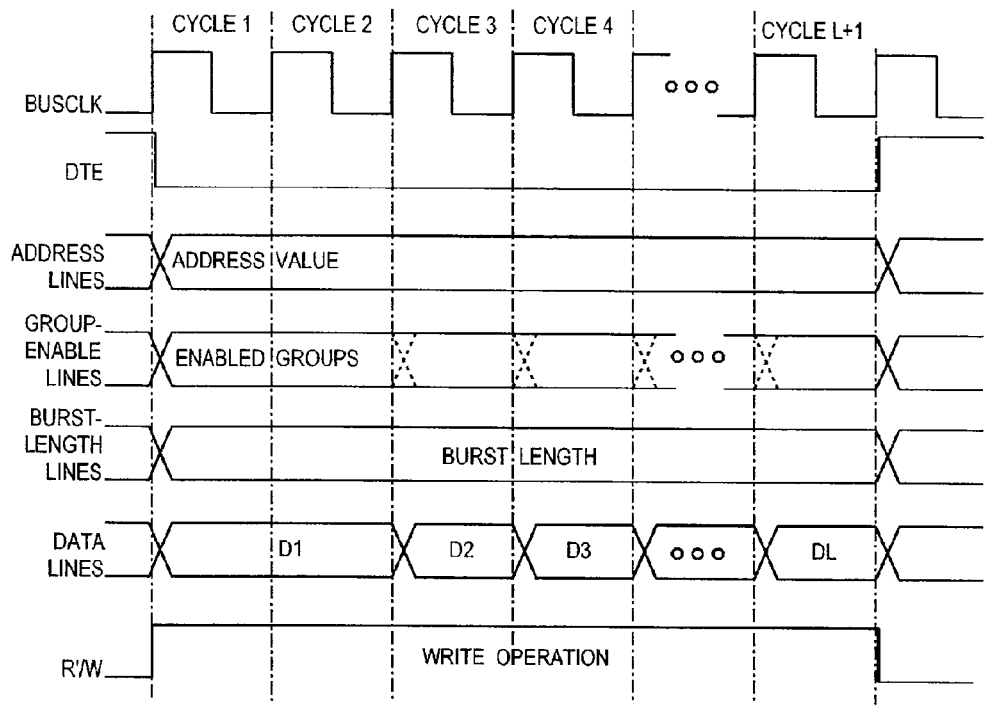
FIG. 19 illustrates a timing diagram of bus signals during a write operation for an exemplary interface-bus of the present application.
Figure 20:
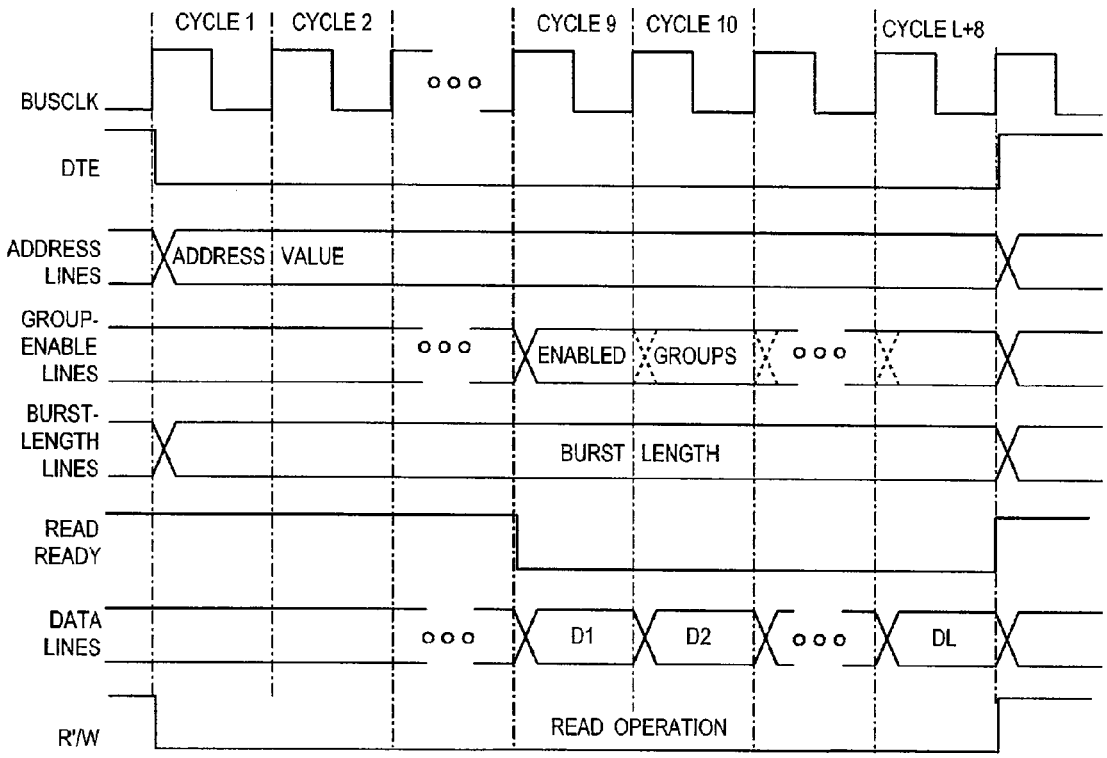
FIG. 20 illustrates a timing diagram of bus signals during a read operation for an exemplary interface-bus of the present application.
Figure 21:
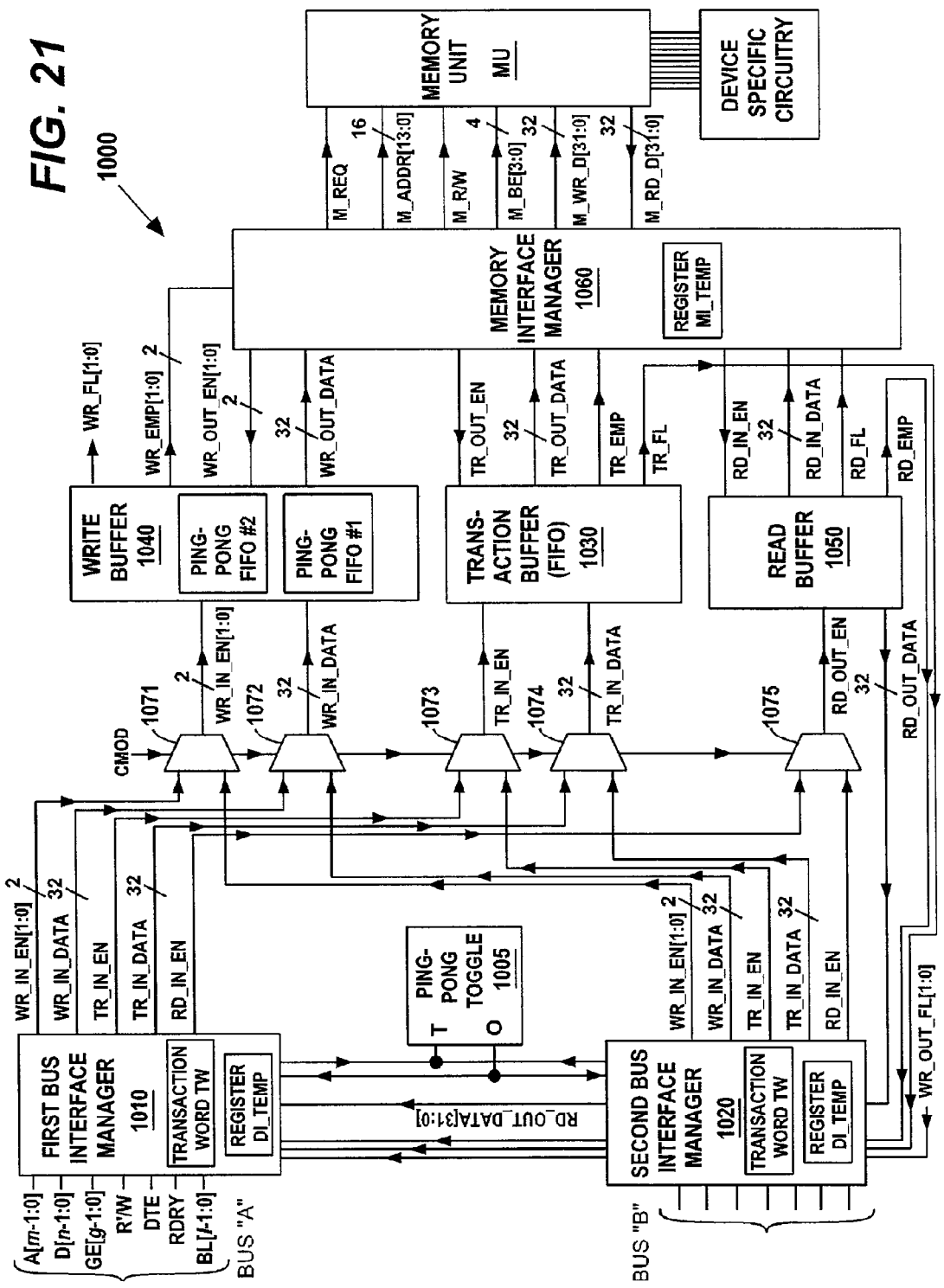
FIG. 21 is a schematic diagram of an exemplary bus bridge of the present application.

Memory-interface manager 1060, which can be implemented as a hardware state machine, mini-microprocessors, and the like, idles in a base state monitoring the empty-buffer output of transaction buffer 1030 (via line TR_EMP) for an indication that a transaction word is present in the buffer. Once a transaction word is detected, manager 1060 reads the word by sending an active signal to the output-enable port of transaction buffer 1030 via line TR_OUT_EN and reading buffer 1030's buffer output via lines TR_OUT_DATA(32). Memory-interface manager 1060 thereafter processes the transaction word, as described below in greater detail. To accomplish its tasks, memory-interface manager 1060 has inputs and outputs coupled to the output sides of buffers 1030, 1040, and 1050, as shown in FIG. 11.

When memory-interface manager 1060 reads a "read" transaction word, as determined by bit TW[6] being "0," it accesses the memory location in memory unit MU specified by the address stored in bits TW[31:16] and any subsequent memory locations as needed to fulfill the requested data size and burst length. Memory-interface manager 1060 then inputs the read data into read buffer 1050, after which bus-interface manager 1010 takes it and outputs it on interface bus "A," as described above. To read data from memory unit MU in accordance with a read transaction word, memory-interface manager 1060 can execute the following sequence of steps using a temporary register MI_TEMP[15:0]:

1. Load the contents of the transaction word bits TW[31:16] into temporary register MI_TEMP[15:0].
2. Execute actions #3 through #5 for the number of bursts L specified by transaction word bits TW[15:12].
3. Execute a read operation (M_R/W=1 and M_REQ active) of memory unit MU with the contents of temporary register MI_TEMP[15:2] provided to address lines M_ADDR[13:0].
4. Transfer the read word from lines M_RD_D[31:0] to the buffer input of read buffer 1050 via lines RD_IN_DATA(32) and generate an active signal to buffer 1050's input-enable port via line RD_IN_EN.
5. Increment the value of temporary register MI_TEMP[15:0] by one if TW[10:8] specifies "byte" as the data size, by two if TW[10:8] specifies "half-word" as the data size, or by four if TW[10:8] specifies "word" as the data size.

After the sequence of actions is completed, memory-interface manager 1060 returns to its base state. Each of the actions #3-#5 can be done during the internal clock cycle used by memory-interface manager 1060, the internal clock typically being different from the cycles of clock signals BUSCLK. Above action #4 may also include checking the full-buffer output of read buffer 1050 (via line RD_FL) to make sure there is room to write data; if not, memory-interface manager 1060 can enter some wait states until a word is removed from read buffer 1050 by bus-interface manager 1010. The above sequence of actions can be readily implemented in a state machine. We note that if TW[10:8] specifies a byte data size or half-word data size, the data bursts of several adjacent words stored into read buffer 1050 will be duplicative. However, the requesting device will sort out the duplications, and/or bus-interface manager 1010 will sort out the duplications when it outputs the bursts onto interface bus "A" by setting the group-enable lines to indicate which bytes of the burst are to be used by the requesting device, as described above.

When memory-interface manager 1060 reads a "write" transaction word, as determined by bit TW[6] being "1," it obtains the write data stored in write buffer 1040 (from the ping-pong FIFO indicated by transaction-word bit TW[5]), and writes the data to memory unit MU with the appropriate settings of the byte-enable lines M_BE[3:0]. To do this, memory-interface manager 1060 can execute the following sequence of actions using a temporary register MI_TEMP[15:0]:

1. Load the contents of the transaction word bits TW[31:16] into temporary register MI_TEMP[15:0].
2. Execute actions #3 through #6 for the number of bursts L specified by transaction word bits TW[15:12].
3. Obtain a word of write data stored in write buffer 1040 from its buffer output via lines WR_OUT_DATA(32) by generating an active signal on buffer 1040's first enable-output port via line WR_OUT_EN[0], and by sending the value of the transaction-word bit TW[5] to buffer 1040's second enable-output port via line WR_OUT_EN[1] to select the ping-pong FIFO that has the data.
4. Generate values for M_BE[3:0] as a function of TW[10:8] (data size) and the two least significant bits in temporary register MI_TEMP[1:0] according to the mapping shown in TABLE V below.
5. Execute a write operation (M_R/W=0 and M_REQ active) of memory unit MU with the contents of temporary register MI_TEMP[15:2] provided to address lines M_ADDR[13:0], with the word of write data obtained from write buffer 1040 provided to write-data lines M_WR_D[31:0], and with the generated values for the byte-enable lines provided on the M_BE[3:0] lines.
6. Increment the value of temporary register MI_TEMP[15:0] by one if TW[10:8] specifies "byte" as the data size, by two if TW[10:8] specifies "half-word" as the data size, or by four if TW[10:8] specifies "word" as the data size.

After the sequence of actions is completed, memory-interface manager 1060 returns to its monitoring state. The actions #3-#6 can be done during one or more of the internal clock cycles used by memory-interface manager 1060, the internal clock typically being different from the cycles of clock signals BUSCLK. Action #3 may further include checking the selected ping-pong buffer to make sure that it has data to output before it is read. This may be done by monitoring the value of the WR_EMP signal for the selected ping-pong buffer. Wait states can be included to wait for data to appear in the FIFO. However, this is generally not needed when bus-interface manager 1010 writes the write data to write buffer 1040 before writing the write transaction word to transaction buffer 1030. The above sequence of actions can be readily implemented in a state machine.

TABLE V

| TW[10:8] | MI_TEMP [1:0] | M_BE[0] | M_BE[1] | M_BE[2] | M_BE[3] |
|---|---|---|---|---|---|
| 0 0 0 | 0 0 | 0 | 1 | 1 | 1 |
| 0 0 0 | 0 1 | 1 | 0 | 1 | 1 |
| 0 0 0 | 1 0 | 1 | 1 | 0 | 1 |
| 0 0 0 | 1 1 | 1 | 1 | 1 | 0 |
| 0 0 1 | 0 0 | 0 | 0 | 1 | 1 |
| 0 0 1 | 0 1 | -- Not permitted -- | | | |
| 0 0 1 | 1 0 | 1 | 1 | 0 | 0 |
| 0 0 1 | 1 1 | -- Not permitted -- | | | |
| 0 1 0 | All values | 0 | 0 | 0 | 0 |

Given the above description of structure and actions, it is well within the ability of one of ordinary skill in the art to construct electrical circuitry, state machines, mini-microprocessors, and the like to implement each of the components of bus bridge 1000, including bus-interface managers 1010 and 1020, memory interface manager 1060, and buffers 1030, 1040, and 1050.

While the present inventions have been particularly described with respect to the illustrated embodiments, it will be appreciated that various alterations, modifications and adaptations may be made based on the present disclosure, and are intended to be within the scope of the present inventions. While the inventions have been described in connection with what are presently considered to be the most practical and preferred embodiments, it is to be understood that the present inventions are not limited to the disclosed embodiments but, on the contrary, are intended to cover various modifications and equivalent arrangements included within the scope of the appended claims.

What is claimed is:

1. A media-access control (MAC) unit that processes the flow of data a first processor and a physical-layer control unit of a network communications component, the physical-layer control unit interfacing with a communications medium and having an input port to receive data in the form of forward error correction (FEC) blocks to be transmitted to the communications medium and an output port to provide data in the form of FEC blocks that has been received from the communications medium, the first processor processes the flow of data between a higher protocol-layer unit and said media-access control unit, the first processor receiving high-level data units from the higher protocol-layer unit and generating outgoing MAC protocol-data units therefrom to be sent to said media-access control unit, the first processor assigning connection identifiers to each outgoing MAC protocol-data unit, said media-access control unit comprising:

a connection port adapted to couple to the first processor;
a second processor that receives outgoing MAC protocol-data units generated by the first processor from the connection port and generates outgoing FEC blocks therefrom for outputting to the input port of the physical-layer control unit, the second processor having an instruction execution unit, an instruction memory, a data memory, an output port to provide outgoing FEC blocks to the physical-layer control unit, and an input port to receive incoming FEC blocks from the physical-layer control unit, wherein the second processor is adapted to generate incoming MAC protocol-data units from incoming FEC blocks received at its input port and to output them on the connection port;
wherein the media-access control unit is configured to process a first type of MAC protocol-data unit that comprises at least a header and payload, the header comprising at least a type field, a connection identifier field, and a header-check sequence field and wherein the second processor encrypts the outgoing MAC protocol-data unit of the first type with an encryption key.

2. The media-access control unit of claim 1 wherein the second processor passes at least one of the incoming MAC protocol-data units to the connection port adapted to couple to the first processor.

3. The media-access control unit of claim 1 wherein the physical-layer control unit generates an interrupt signal to indicate the presence of incoming FEC blocks for the second processor to read, and wherein the second processor further comprises a interrupt input port to receive the interrupt signal of the physical-layer control unit and is responsive to an active interrupt signal thereon to read the incoming FEC blocks.

4. The media-access control unit of claim 1 further comprising a MAC-PDU transmission buffer accessible by the connection port and the second processor, outgoing MAC protocol-data units being stored in the MAC-PDU transmission buffer by way of the connection port, and the second processor reading outgoing MAC protocol-data units from the MAC-PDU transmission buffer.

5. The media-access control unit of claim 4 wherein the second processor generates a low-watermark signal indicating that the data size of the MAC protocol-data units stored in the MAC-PDU transmission buffer is below a first amount, and wherein the low-watermark signal can be accessed from the connection bus.

6. The media-access control unit of claim 4 wherein the MAC protocol-data units are transmitted over the communications medium in a plurality of transmission bursts, wherein the media-access control unit further comprises a transmission control buffer accessible by the second processor and by way of the connection port, the transmission control buffer capable of storing transmission control tags, and the second processor reading transmission control tags from the transmission control buffer, each transmission control tag providing information on generating the transmission burst for a group of one or more outgoing MAC protocol-data units.

7. The media-access control unit of claim 4 wherein the outgoing MAC protocol-data units are stored in groups in MAC-PDU transmission buffer, each group of MAC protocol-data units to be transmitted with the same modulation format.

8. The media-access control unit of claim 7 wherein the transmission control tag for a group is in the transmission control buffer after the group is stored in the MAC-PDU transmission buffer.

9. The media-access control unit of claim 6 wherein each transmission control tag comprises a burst-type field to indicate whether a corresponding group of bytes stored in the MAC-PDU transmission buffer comprises a frame control header or a group of one or more MAC protocol-data units, wherein the burst-type field is set to indicate a frame control header when a corresponding group of bytes stored in MAC-PDU transmission buffer comprises a frame control header, wherein the burst-type field is set to indicate a group of MAC protocol-data units when the corresponding groups of bytes comprise a group of one or more MAC protocol-data units, and wherein the second processor looks at the burst-type field when processing transmission control tags.

10. The media-access control unit of claim 1 wherein the MAC-PDU transmission buffer comprises a circular buffer with an associated input pointer and output pointer, wherein the input pointer to the MAC-PDU transmission buffer is updated when a group of bytes is stored therein, and wherein the second processor updates the value of the output pointer to the MAC-PDU transmission buffer when it reads an outgoing MAC protocol-data unit.

11. The media-access control unit of claim 1 further comprising a MAC-PDU reception buffer accessible by the second processor and by way of the connection port, the second processor storing incoming MAC protocol-data units in the MAC-PDU reception buffer, and incoming MAC protocol-data units capable of being read from the MAC-PDU reception buffer by way of the connection port.

12. The media-access control unit of claim 11 wherein the second processor generates a high-watermark signal indicating that the data size of the MAC protocol-data units stored in the MAC-PDU reception buffer is above a first amount, and wherein the high-watermark signal can be accessed from the connection bus.

13. The media-access control unit of claim 11 further comprising a reception control buffer accessible by the connection port and the second processor, the reception control buffer being adapted to receive a plurality of reception control tags, the second processor reading reception control tags from the reception control buffer, each reception control tag providing a reception time and a modulation format of an expected incoming burst having a group of one or more incoming MAC protocol-data units.

14. The media-access control unit of claim 13 wherein at least one reception control tag further comprises an indication of the connection identifiers of a group of one or more incoming MAC protocol-data units of the expected incoming burst.

15. The media-access control unit of claim 14 wherein the indication of the connection identifiers comprises an indication of an address location in a table memory of connection identifiers.

16. The media-access control unit of claim 11 wherein the MAC-PDU reception buffer comprises a circular buffer with an associated input pointer and output pointer, wherein the second processor updates the value of the input pointer to the MAC-PDU reception buffer when it stores an incoming MAC protocol-data unit therein, and wherein the value of the output pointer to the MAC-PDU reception buffer is updated when a group of bytes is read therefrom.

17. The media-access control unit of claim 1 wherein the MAC protocol-data units are transmitted over the communications medium in a plurality of transmission bursts, and wherein the media-access control unit further comprises a reception status buffer accessible by the second processor and by way of the connection port, the second processor storing a plurality of blocks of burst-status information in the reception status buffer, each block of burst-status information corresponding to an incoming burst, each block of burst-status information having at least one characteristic related to the reception of its corresponding burst.

18. The media-access control unit of claim 17 wherein the second processor further stores a plurality of blocks of MAC-PDU status information in the reception status buffer, each block of MAC-PDU status information corresponding to an incoming MAC protocol-data unit, each block of MAC-PDU status information having at least one characteristic related to the reception of its corresponding MAC protocol-data unit.

19. The media-access control unit of claim 1 further comprising a table memory capable of storing a plurality of connection identifiers, the table memory comprising a plurality of memory locations that can be accessed by the second processor and by way of the connection port, the table memory capable of storing a connection identifier at each memory location.

20. The media-access control unit of claim 19 wherein a lock indication is set when data held in the table memory is modified, and wherein the second processor checks the lock indication prior to searching for connection identifiers in the table memory.

21. The media-access control unit of claim 19 wherein the second processor checks the connection identifier of an incoming MAC protocol-data unit against the identifiers stored in the table memory and makes the incoming MAC protocol-data unit accessible by way of the connection port only when it finds the connection identifier in the storage memory.

22. The media-access control unit of claim 1 further comprising a first table memory capable of storing a plurality of traffic-encryption key entries, each entry having at least one traffic-encryption key, the first table memory comprising a plurality of memory locations that can be accessed by the second processor and by way of the connection port, the first table memory capable of storing a traffic-encryption key entry at each of its memory locations;

wherein the media-access control unit further comprises a second table memory capable of storing a plurality of connection identifiers and associated key indexes, the second table memory comprising a plurality of memory locations that can be accessed by the second processor and by way of the connection port, the second table memory capable of storing a connection identifier and an associated key index at each of its memory locations, at least one key index of the second table indicating the identity of a memory location in the first table memory.

23. The media-access control unit of claim 22 wherein the second processor checks the connection identifier of an incoming MAC protocol-data unit against the identifiers stored in the second table memory and obtains the associated key index to the first table memory.

24. The media-access control unit of claim 22 wherein the second table memory is further capable of storing a flag at each of its memory locations, the flag indicating whether the memory location stores a connection identifier or a connection-identifier mask, and wherein each memory location of the second table memory is capable of storing a connection-identifier mask and an associated key index to the first table memory, wherein the second processor checks the connection identifier of an incoming MAC protocol-data unit against at least one connection-identifier mask stored in the second table memory and obtains the associated key index to the first table memory if a portion of the connection identifier of the incoming MAC protocol-data unit matched to the at least one connection-identifier mask.

25. The media-access control unit of claim 19 wherein the table memory is further capable of storing a flag at each memory location, the flag indicating whether the memory location stores a connection identifier or a connection-identifier mask, and wherein each memory location is capable of storing a connection-identifier mask.

26. The media-access control unit of claim 25 wherein the second processor checks the connection identifier of an incoming MAC protocol-data unit against at least one connection-identifier mask stored in the table memory.

27. The media-access control unit of claim 25 wherein the second processor checks the connection identifier of an incoming MAC protocol-data unit against at least one connection-identifier mask stored in the table memory and thereafter checks it against the connection identifiers stored in the table memory only if a portion of the connection identifier of the incoming MAC protocol-data unit matched a connection-identifier mask stored in the memory table.

28. The media-access control unit of claim 1 further comprising a table memory capable of storing a plurality of traffic-encryption key entries, each entry having at least one traffic-encryption key, the table memory comprising a plurality of address locations that can be accessed by the second processor and by way of the connection port, the table memory capable of storing a traffic-encryption key entry at each memory address.

29. The media-access control unit of claim 1 wherein each MAC protocol-data unit comprises a header, the header having a header-check-sequence field to hold a header-check-sequence, and wherein the media-access control unit further comprises a key table memory that stores encryption keys that can be accessed by providing corresponding key indices, each key index providing an indication of the address location that can be used to access the encryption key, the key table memory being write-accessible by way of the connection port and read-accessible by at least the second processor; and wherein an outgoing MAC protocol-data unit of the first type is passed to the second processor by way of the connection port with a key index placed in the header-check sequence field of the header of the outgoing MAC protocol-data unit; and wherein the second processor obtains the key index from the header-check sequence field of the header of the outgoing MAC protocol-data unit, accesses the key table memory to read the encryption key corresponding to the obtained key index, and encrypts the outgoing MAC protocol-data unit with the encryption key read from the key table memory.

30. The media-access control unit of claim 1 wherein the outgoing MAC protocol-data unit is passed without the payload of the outgoing MAC protocol-data unit being encrypted by the encryption key read from the key table memory.

31. The media-access control unit of claim 1 further comprising a key table memory that stores encryption keys that can be accessed by providing corresponding key indices, each key index providing an indication of the address location that can be used to access the encryption key, the key table memory being write-accessible by way of the connection port and read-accessible by at least the second processor; and wherein the media-access control unit is capable of processing a first type of MAC protocol-data unit that comprises at least a header and payload, the header comprising at least an encryption-control field, a type field, a connection identifier field, and a header-check sequence field, the encryption-control field bearing either a first indication that the payload is not encrypted or a second indication that the payload is encrypted;

wherein, when an outgoing MAC protocol-data unit is not to be encrypted, the first indication is placed in the encryption-control field of the outgoing MAC protocol-data unit prior to being provided at the connection port; and wherein, when an outgoing MAC protocol-data unit is to be encrypted, the second indication is placed in the encryption-control field of the outgoing MAC protocol-data unit, and a key index is placed in the header-check sequence field of the header of the outgoing MAC protocol-data unit prior to being provided at the connection port.

32. The media-access control unit of claim 31 wherein the second processor reads the encryption-control field of the outgoing MAC protocol-data unit and does not encrypt of the payload when it finds the first indication in the encryption-control field.

33. The media-access control unit of claim 31 wherein the second processor reads the encryption-control field of the outgoing MAC protocol-data unit;

wherein, when the second processor finds the second indication in the encryption-control field, the second processor obtains the key index from the header-check sequence field of the header of the outgoing MAC protocol-data unit, accesses the key table memory to read the encryption key corresponding to the obtained key index, and encrypts the outgoing MAC protocol-data unit with the encryption key read from the key table memory.

34. The media-access control unit of claim 1 wherein the media-access control unit is capable of processing a first type of MAC protocol-data unit that comprises a header and a cyclic-redundancy-check field to hold a cyclic-redundancy-check field value, and capable of processing a second type of MAC protocol-data unit that comprises a header, payload, and a cyclic-redundancy-check field to hold a cyclic-redundancy-check field value, the cyclic-redundancy-check value of a MAC protocol-data unit of the first type being a function of the header of the MAC protocol-data unit, the cyclic-redundancy-check value of a MAC protocol-data unit of the second type being a function of the header and payload section of the MAC protocol-data unit;

wherein an outgoing MAC protocol-data unit is provided to the second processor by way of the connection port without a cyclic-redundancy-check value in the cyclic-redundancy-check field of the outgoing MAC protocol-data unit, the outgoing MAC protocol-data unit being one of the first and second types; and wherein the second processor generates a cyclic-redundancy-check value for the outgoing MAC protocol-data unit and places it in the cyclic-redundancy-check field of the outgoing MAC protocol-data unit.

35. The media-access control unit of claim 1 wherein each MAC protocol-data unit comprises a header, the header having a header-check-sequence field to hold a header-check-sequence;

wherein an outgoing MAC protocol-data unit is passed to the second processor by way of the connection port without a value for the header-check-sequence field of the outgoing MAC protocol-data unit; and wherein the second processor generates a header-check sequence for the outgoing MAC protocol-data unit and places it in the header-check sequence field of the outgoing MAC protocol-data unit.

36. The media-access control unit of claim 1 wherein the MAC protocol-data units are transmitted over the communications medium in a plurality of transmission bursts, wherein each burst is assigned one of a plurality of downlink interval usage codes, and wherein each downlink interval usage code has a respective burst profile assigned to it, and wherein the media-access control unit further comprises a first table memory having a plurality of address locations, each address location corresponding to a downlink interval usage code and capable of storing a burst profile assigned to the corresponding downlink interval usage code; and wherein the first table memory is accessible to the second processor.

37. The media-access control unit of claim 36 further comprising a second table memory having a plurality of address locations, each address location corresponding to a downlink interval usage code and capable of storing a burst profile assigned to the corresponding downlink interval usage code; and wherein the second table memory is accessible to the second processor and by way of the connection port.

38. The media-access control unit of claim 37 wherein downlink maps are transmitted in selected transmission bursts, a plurality of the downlink maps each having a downlink-channel descriptor (DCD) message and a DCD count that indicates the version downlink-channel descriptor message in use at the time of the transmission burst containing the downlink-channel descriptor message, and wherein the second processor monitors the value of the DCD count provided in the plurality of downlink maps, and copies the contents of the second table memory to the first table memory when it detects a change in value of the DCD count provided in the plurality of downlink maps.

39. The media-access control unit of claim 1 further comprising a first mailbox storage assigned to receive a message for the first processor and a second mailbox storage assigned to receive a message for the second processor.

40. The media-access control unit of claim 39 further comprising a first lock indicator having a first state to indicate that the first mailbox storage can receive a message and a second state to indicate that the first mailbox storage cannot receive a message; and a second lock indicator having a first state to indicate that the second mailbox storage can receive a message and a second state to indicate that the second mailbox storage cannot receive a message.

41. The messaging system of claim 40 wherein, when the second processor places a message in the first mailbox storage, the second processor changes the first lock indicator to its second state and generates a first message-waiting signal that alerts the first processor of the presence of a message in the first mailbox storage; and wherein the second processor changes the second lock indicator to its second state after reading a message from the second mailbox storage.

42. The messaging system of claim 41 wherein the second processor checks the state of the first lock indicator before writing a message to the first mailbox storage, and writes a message only if the first lock indicator is in its first state.

43. The messaging system of claim 1 wherein the second processor comprises an idle state where it does not process MAC protocol-data units; a scan mode where it sends configuration commands to the physical-layer control unit and receives information therefrom that is representative of the degree of its synchronization to the frames of a base station, and a run mode where it processes MAC protocol-data units.

44. The media-access control unit of claim 1 wherein data appearing on the communications medium is organized according to frames, each frame having a plurality of transmission bursts, the transmission burst of at least one frame comprising a downlink map having indications of the start times and modulation formats of one or more subsequent transmission bursts in the frame; and wherein, when the second processor reads an incoming FEC block having a downlink map of an incoming frame, it obtains therefrom the indications of the start times and modulation formats of one or more subsequent transmission bursts in the incoming frame and outputs the indications of the start times and modulation formats to the physical-layer control unit.

\* \* \* \* \*